(12) United States Patent
Ohira et al.

(10) Patent No.: US 6,208,689 B1
(45) Date of Patent: *Mar. 27, 2001

(54) METHOD AND APPARATUS FOR DIGITAL IMAGE DECODING

(75) Inventors: Hideo Ohira; Kenichi Asano; Toshiaki Shimada; Kohtaro Asai; Tokumichi Murakami, all of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/806,668

(22) Filed: Feb. 26, 1997

(30) Foreign Application Priority Data

| Mar. 4, 1996 | (JP) | 8-046346 |
| Jul. 31, 1996 | (JP) | 8-202492 |
| Dec. 27, 1996 | (JP) | 8-350305 |

(51) Int. Cl.⁷ .................................................. H04B 1/66
(52) U.S. Cl. .......................... 375/240.12; 375/240.03
(58) Field of Search .................... 348/405, 415, 348/420, 410, 419, 404, 406, 407, 408, 421, 27; 395/114, 115; 382/251; 375/240.12, 240.03, 240.24

(56) References Cited

U.S. PATENT DOCUMENTS

| 5,414,527 | * | 5/1995 | Koshi et al. | 348/420 |
| 5,432,891 | * | 7/1995 | Onodera | 395/114 |
| 5,663,763 | * | 9/1997 | Yagasaki et al. | 348/405 |
| 5,699,117 | * | 12/1997 | Uramoto et al. | 348/390 |
| 5,701,158 | * | 12/1997 | Ohira et al. | 348/410 |
| 5,724,097 | * | 3/1998 | Hibi et al. | 348/405 |

* cited by examiner

Primary Examiner—Chris S. Kelley
Assistant Examiner—Gims Philippe

(57) ABSTRACT

A method and apparatus of digital image decoding is provided for reducing compression-related deterioration of an image to a minimum with a reduced storage capacity. The digital image decoding apparatus is equipped with a compression rate judging section for judging an optimal rate of compression for effecting the least deterioration to the image based upon the size of image in connection with the storage capacity of a frame memory. A compressing section compresses decoded data based upon the optimal rate of compression and sends the compressed data to a predictive/display frame memory for storage. An expanding A section expands the compressed data based upon the optimal rate of compression and sends the expanded data to a decoding section when the expanded data is required. An expanding B section reads out the compressed data of a display frame from the predictive/display frame memory and expands the compressed data based upon the optimal rate of compression and sends the expanded data to a display unit for display.

19 Claims, 49 Drawing Sheets

$$H = \begin{bmatrix} 1 & 1 & 1 & 1 & 1 & 1 & 1 & 1 \\ 1 & 1 & 1 & 1 & -1 & -1 & -1 & -1 \\ 2 & 2 & -2 & -2 & 0 & 0 & 0 & 0 \\ 0 & 0 & 0 & 0 & 2 & 2 & -2 & -2 \\ 2 & -2 & 0 & 2 & 0 & 0 & 0 & 0 \\ 0 & 0 & 2 & -2 & 0 & 0 & 0 & 0 \\ 0 & 0 & 0 & 0 & 2 & -2 & 0 & 0 \\ 0 & 0 & 0 & 0 & 0 & 0 & 2 & -2 \end{bmatrix}$$

HARR CONVERSION

BIDIRECTIONAL PREDICTION

FORWARD PREDICTION

Fig.46

781 : CHARCTERISTIC QUANTIZATION TABLE

| DATA RANGE | REP. VALUE | QUANTIZED VALUE |
|---|---|---|
| -255~(-A3) | AD0 | S0 |
| (-A3)~(-A2) | AD1 | S1 |
| (-A2)~(-A1) | AD2 | S2 |
| (-A1)~(-A0) | AD3 | S3 |
| (-A0)~ 0 | AD4 | S4 |
| 0 ~ A0 | AD5 | S5 |
| A0 ~ A1 | AD6 | S6 |
| A1 ~ A2 | AD7 | S7 |
| A2 ~ A3 | AD8 | S8 |
| A3 ~ 255 | AD9 | S9 |

Fig.47

782 : SELECT TABLE

| | QUANTIZED MAX VALUE | | | | | | | | | |
|---|---|---|---|---|---|---|---|---|---|---|
| | S0 | S1 | S2 | S3 | S4 | S5 | S6 | S7 | S8 | S9 |
| S0 | q3 | q3 | q3 | q3 | q3 | q15 | q15 | q15 | q15 | q15 |
| S1 | - | q1 | q1 | q1 | q1 | q7 | q11 | q14 | q14 | q15 |
| S2 | - | - | q1 | q6 | q6 | q6 | q10 | q13 | q14 | q15 |
| S3 | - | - | - | q12 | q12 | q12 | q12 | q8 | q9 | q15 |
| S4 | - | - | - | - | q12 | q12 | q12 | q4 | q5 | q15 |
| S5 | - | - | - | - | - | q12 | q12 | q4 | q0 | q2 |
| S6 | - | - | - | - | - | - | q12 | q4 | q0 | q2 |
| S7 | - | - | - | - | - | - | - | q13 | q0 | q2 |
| S8 | - | - | - | - | - | - | - | - | q0 | q2 |
| S9 | - | - | - | - | - | - | - | - | - | q2 |

QUANTIZED MIN VALUE (row axis, 771)

Sx : QUANTIZED VALUE
qx : QUANTIZER

METHOD AND APPARATUS FOR DIGITAL IMAGE DECODING

BACKGROUND OF THE INVENTION

1. Field of the Invention

The present invention relates to digital image decoding, and more specifically to image compression in digital image decoding, in order to reduce the required storage capacity of a frame memory, and further to reduce the deterioration of the output image which may be caused by the compression algorithm by adaptively applying compression based upon the size of the image data. The digital image decoding should be implemented in a digital image system such as digital CATV and digital broadcasting.

2. Discussion of the Prior Art

FIGS. 54 and 55 show the block diagram and external memory map of a prior art image processing apparatus, namely the SGS-Thomson, STi3500, described in a manual issued by SGS-Thomson Microelectronics.

In FIG. 54, reference numeral 501 denotes a microcomputer interface; 502 an FIFO (First-in First-out) memory; 503 a start code detection unit; 504 a memory I/O (Input/Output) unit; 505 a variable-length decoder unit; 506 a decoder unit; 507 a display processing unit; 508 an external memory; 550 a micro-computer interface line; 551 a micro-computer bus; 552 data lines; 553 data lines; 554 an external memory bus; and 555 an input/output line.

In FIG. 55, reference numeral 601 denotes a bit buffer; 602 an on-screen display (OSD) memory; 603 a first predictive frame memory; 604 a second predictive frame memory; and 605 a display frame memory.

The operation of the prior art apparatus will now be described. Encoded data accumulated in the bit buffer 601 of the external memory 508 is fed to the start code detection unit 504 through the external memory bus 554 wherein the start code of the encoded data is detected. After the start code has been detected, the encoded data portion following the start code is supplied to the variable-length decoder unit 505 through the FIFO memory 502, wherein the encoded data portion is subjected to variable-length decoding. The variable-length decoded data is then processed and subjected to image decoding by the decoder unit 506. The decoded image is written into the external memory 508 through the memory I/O unit 504.

The external memory 508 includes the first predictive frame memory 603, the second predictive frame memory 604 and the display frame memory 605. Each of the memories 603, 604, 605 stores decoded images. Image data used to predict the other frames is written into the first or second predictive frame memory 603, 604. Image data used only for driving the display is written into the display frame memory 605.

The data written into the display frame memory 605 is then read out in synchronism with signals such as the horizontal/vertical synchronizing signals in TV scenes and outputted to the display processing unit 507 through the external memory bus 554.

Alphanumeric character data to be displayed in the OSD (on-screen display) memory 602 of the external memory 508 may be accessed as in the display frame memory area 605 and then supplied to the display processing unit 507 through the external memory bus 554. If the data in the OSD memory 602 is valid, the display processing unit 507 overlays the data from the OSD memory 602 onto the data read out from the display frame memory 605 and externally outputs the overlaid data.

In such a manner, the prior art displays an image on the display data that has been stored in the external memory 508.

In the aforementioned digital image decoding apparatus of the prior art, the external memory 508 must store all the data required by the decoding step. More particularly, if data that spans adjacent frames is to be encoded, all the data of other related frames used to encode the one frame have to be stored in the external memory 508 to successfully decode the image data of that frame.

Therefore, the prior art decoding technique requires a huge data storage device to store the related frames. The large capacity required by the external memory 508 is a clear disadvantage because of the large size and cost of constructing such a memory.

SUMMARY OF THE INVENTION

In order to overcome the problems mentioned above, an object of the present invention is to provide a digital image decoding apparatus and method which can realize a reduction in hardware by efficiently using memory capacity.

Another object of the present invention is to provide a method and apparatus for digital image decoding with a memory having the least possible storage capacity, and to reduce image deterioration to a minimum.

This and other objects are accomplished by the present invention as hereinafter described in further detail.

In accordance with one important aspect of the present invention, a digital image decoding apparatus for decoding encoded data of an image with a given size may include a frame memory having a capacity for storing the encoded data on a frame basis, a decoding section for decoding the encoded data on the frame basis and outputting decoded data, a compressing section for compressing the decoded data and outputting compressed data, and an expanding section for reading out and expanding the compressed data stored in the frame memory and outputting expanded data.

The decoding section decodes the encoded data including profile information of a coding method for the encoded data. The digital image decoding apparatus may further include a profile judging section for receiving the encoded data and judging the profile of the coding method. The compressing section, including a plurality of modes of compression, receives the profile information and selects one of the plurality of modes optimal to the coding method.

The compressing section may include a plurality of quantizers, each of which has a table for a unique quantization and outputs a unique quantized result of the decoded data, an optimal table selector for comparing the unique quantized results for selecting a table optimal to the decoded data from among the plurality of tables, and a selector for selecting an output from one of the plurality of quantizers having the optimal table selected by the optimal table selector.

The digital image decoding apparatus may further include a compression rate judging section for receiving image size information for indicating the given size of the image and judging a rate of compression for the compressed data to be stored in the frame memory based upon the given size of the image and the capacity of the frame memory. The compressing section compresses the decoded data based upon the rate of compression and outputs the compressed data to the frame memory. The expanding section reads out the compressed data from the frame memory and expands the compressed data based upon the rate of compression.

The compressing section may be provided with a plurality of modes of compression, and selects one mode from among the plurality of modes. The selected mode produces an amount of compressed data less than the capacity of the frame memory.

The compressing section may include a quantizing section for quantizing the decoded data on a block basis of M×N pixels to output the block-based compressed data. The expanding section may include an expander for dequantizing the block-based compressed data and outputting the expanded data on the block basis of M×N pixels.

The quantizing section may include a plurality of quantizers, each of which has a unique characteristic of quantization. The compressing section may include a characteristic searching section for searching a characteristic of the block-based decoded data of M×N pixel, and a quantizer selector for selecting one of the plurality of quantizers in the quantizing section based upon the characteristic searched by the characteristic searching section and activating the selected quantizer exclusively for quantizing the block-based decoded data of M×N pixels. The quantizer selector may include a maximum value detector for receiving the block-based decoded data of M x N pixels, and calculating a maximum value of a difference between adjacent pixels and outputting a maximum value as a first characteristic, a minimum value detector for receiving the block-based decoded data of M×N pixels and calculating a minimum value of the difference between adjacent pixels and outputting a minimum value as a second characteristic, a characteristic quantization table for quantizing the first characteristic of the maximum value and the second characteristic of the minimum value, respectively, a characteristic quantizer for receiving and quantizing the maximum and minimum values with reference to the characteristic quantization table, and outputting maximum and minimum quantized values, respectively. The quantizer selector may further include a select table for selecting one of the plurality of quantizers in the quantizing section based upon the maximum and minimum quantized values, and a selector for selecting one of the plurality of quantizers optimal to the decoded data based upon the select table.

The expanding section may include a plurality of dequantizers, each of which has a unique characteristic of dequantization corresponding to a respective unique characteristic of quantization of the plurality of quantizers in the quantizing section. The digital image decoding apparatus may further include a controlling section for controlling the unique characteristics of quantization of the plurality of quantizers in the compressing section and the unique characteristics of dequantization of the plurality of dequantizers in the expanding section.

The respective quantizers in the quantizing section modifies the characteristic of quantization adaptively. The respective dequantizers in the expanding section modify the characteristic of dequantization correspondingly to the modification of the characteristic of quantization. The controlling section may include a quantization/dequantization characteristic setting section for setting the respective quantizers to modify the unique characteristic of quantization and setting the respective dequantizers to modify the unique characteristic of dequantization, a select table setting section for setting the quantizer selector to refer to the select table in accordance with the setting of the unique characteristics of quantization/dequantization, and a characteristic quantization table setting section for setting the characteristic quantizer to refer to the characteristic quantization table in accordance with the setting of the unique characteristics of quantization/dequantization.

In accordance with the method of the present invention, the following steps are carried out. The method provides:

(a) decoding encoded data through an inter-/intra-frame coding on a block basis of M×N pixels, compressing the block-based decoded data of M×N pixels through quantization and outputting block-based compressed data;

(b) storing a predictive frame of the block-based compressed data on a frame basis in a predictive frame memory of a frame memory with the predictive frame being used to decode the encoded data through inter-/intra-frame coding;

(c) storing a display frame of the block-based compressed data in a display frame memory of the frame memory with the display frame being used to display an image;

(d) expanding the compressed predictive frame data read out from the predictive frame memory through a dequantization of the compressed predictive frame data and supplying an expanded predictive frame data to the decoding step; and (e) expanding the compressed display data read out from the display frame memory, through the dequantization of the compressed display frame data, and outputting an expanded display frame data as image display data.

The method may further include the step of judging the rate of compression of the block-based decoded data based upon the size of image judged by the encoded data in connection with the storage capacity of the frame memory and providing the compressing step with the rate of compression as compression rate information.

The method may further include the step of controlling the setting and modifying of a quantization characteristic for quantization in the compressing step and the setting and modifying of a dequantization characteristic for the dequantization in the expanding steps.

Further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 46 shows a characteristic qantization table of the present invention;

FIG. 47 shows a select table of the present invention;

DESCRIPTION OF THE PREFERRED EMBODIMENTS

Figure 1:
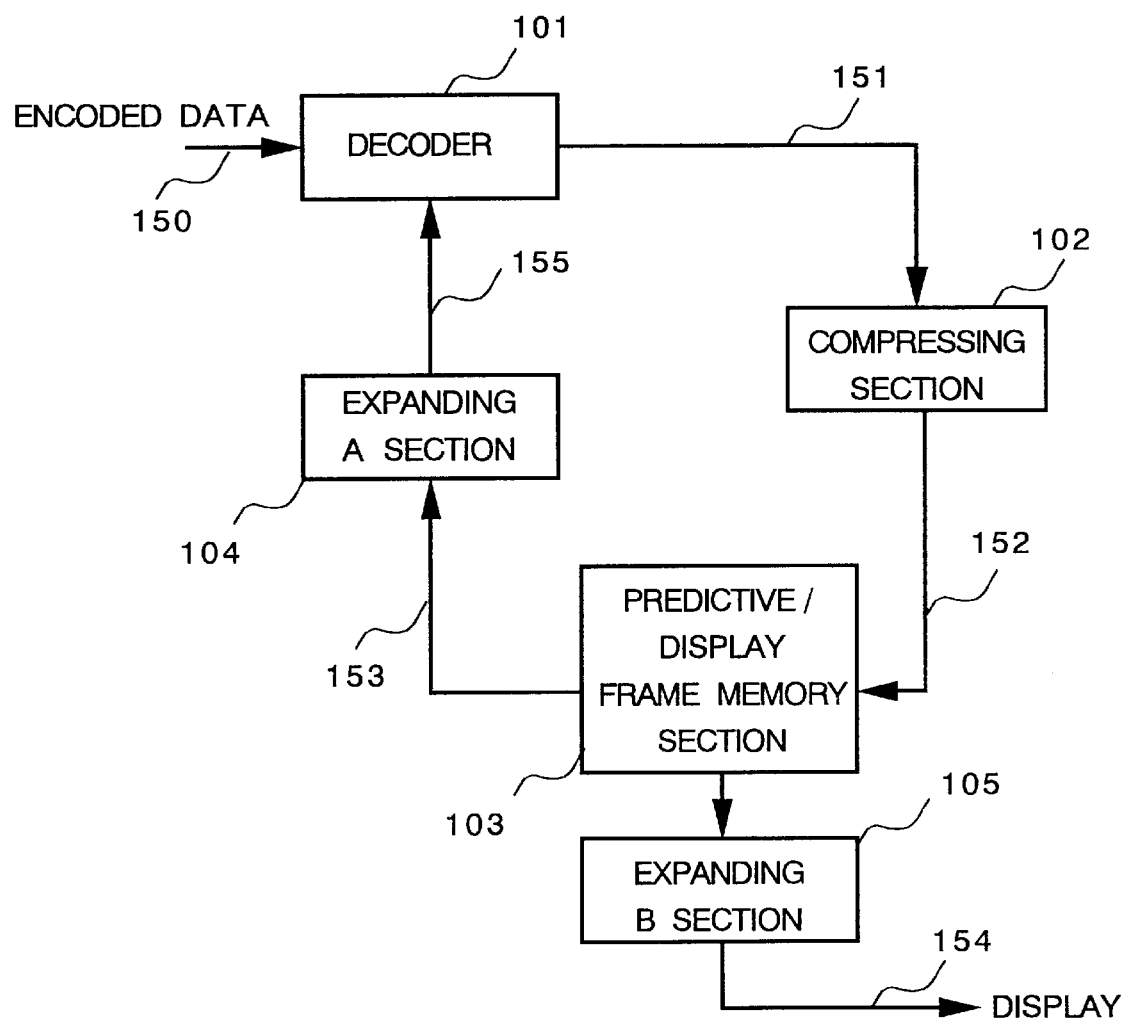
FIG. 1 is a block diagram of a digital image decoding apparatus constructed in accordance with the present invention.

Reference will now be made in detail to the present preferred embodiments of the invention, examples of which are illustrated in the accompanying drawings, wherein like reference numerals indicate like elements through out the several views.

Embodiment 1.

FIG. 1 is a schematic block diagram of one embodiment of a digital image decoding apparatus according to the present invention. Referring to FIG. 1, reference numeral 101 designates a decoder for decoding encoded image data; 102 a compressing section for compressing the decoded data; 103 a predictive/display frame memory section including a predictive frame memory and a display frame memory; 104 an expanding A section for expanding the compressed data of a predictive frame read out from the frame memory (which will also be identified as a predictive data expanding section); and 105 an expanding B section (which will also be identified as a display data expanding section) for expanding the compressed data of a display frame and outputting expanded data to a display unit (not shown here).

Reference numeral 150 represents encoded data; 151 decoded data; 152 compressed data; 153 compressed data; 154 display data (which will also be identified as expanded display data hereinafter); and 155 expanded data (which is also identified as expanded predictive data hereinafter).

The operation of the apparatus shown in FIG. 1 will be described below. The decoding section 101 decodes incoming encoded data 150 using the expanded data 155 as predictive data. The decoded data 151 is then compressed in a lossless or lossy manner by the compressing section 102 to reduce the amount of information therein. Generally, through lossy compression, data cannot recover its original state after compression, whereas data can recover its original state through lossless compression. The compressed data 152 is used as a predictive data for a frame to be decoded in the future and also written into the predictive/display frame memory 103 for displaying. The compressed data of a frame not used for prediction is written into the display frame memory area while the compressed data of a frame used for prediction is written into the predictive frame memory area. All the data are not necessarily compressed, as will be described.

The written compressed data is expanded by the expanding B section 105 for image display. The expanded data is read out and displayed on the display unit in the order of rasters used by the display unit.

On the other hand, the expanding A section 104 accesses the predictive/display frame memory 103. The resulting compressed data is then expanded and supplied to the decoding section 101 as expanded data 155 (predictive data) that is required by the decoding operation in the decoder 101.

The predictive/display frame memory 103 may be structured to have a capacity less than the amount of information that is possessed by image data to be displayed, because the predictive/display frame memory 103 is adapted to store the compressed data.

Figure 2:
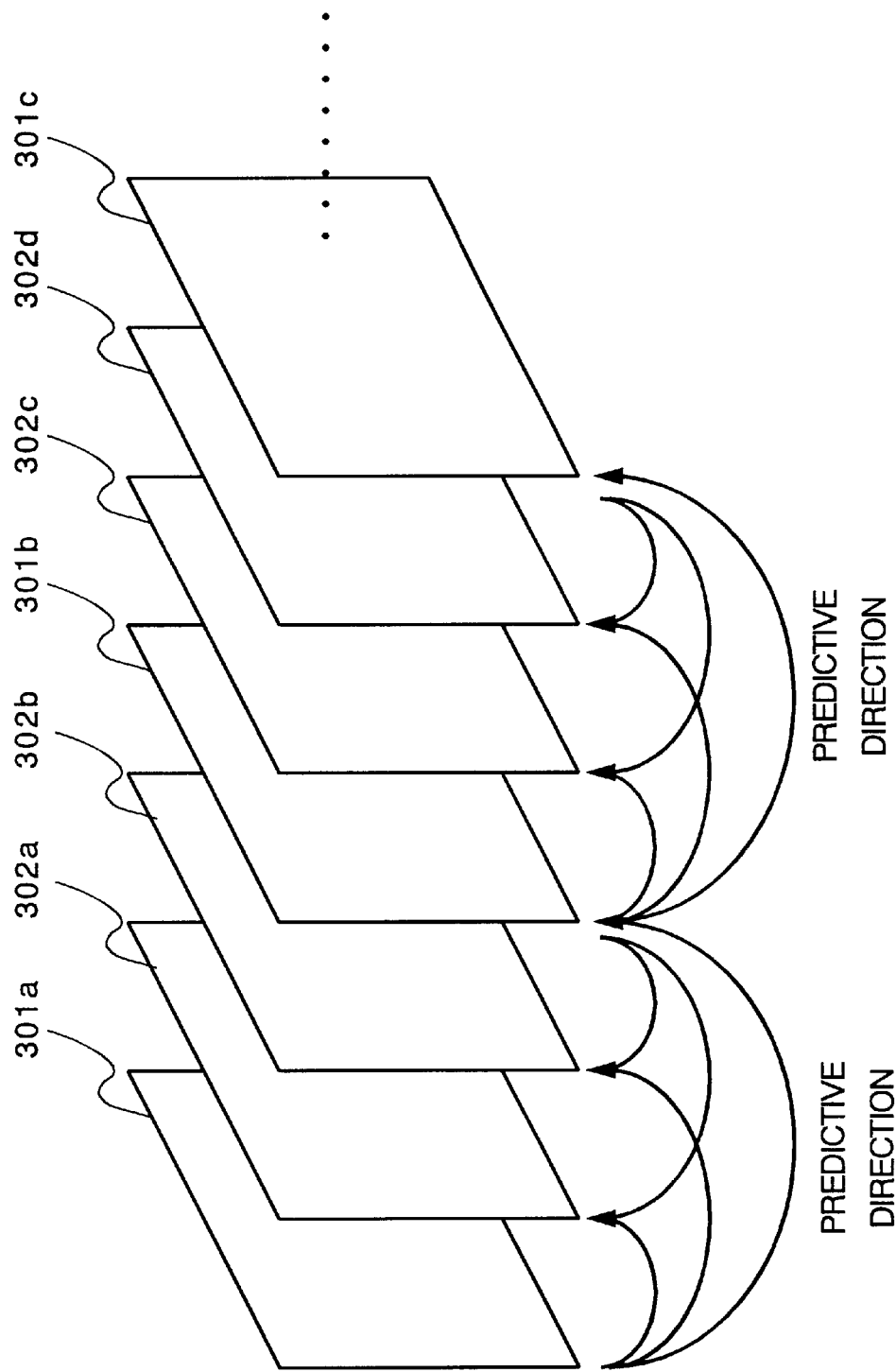
FIG. 2 is a view showing different types of frames.
Figure 3:
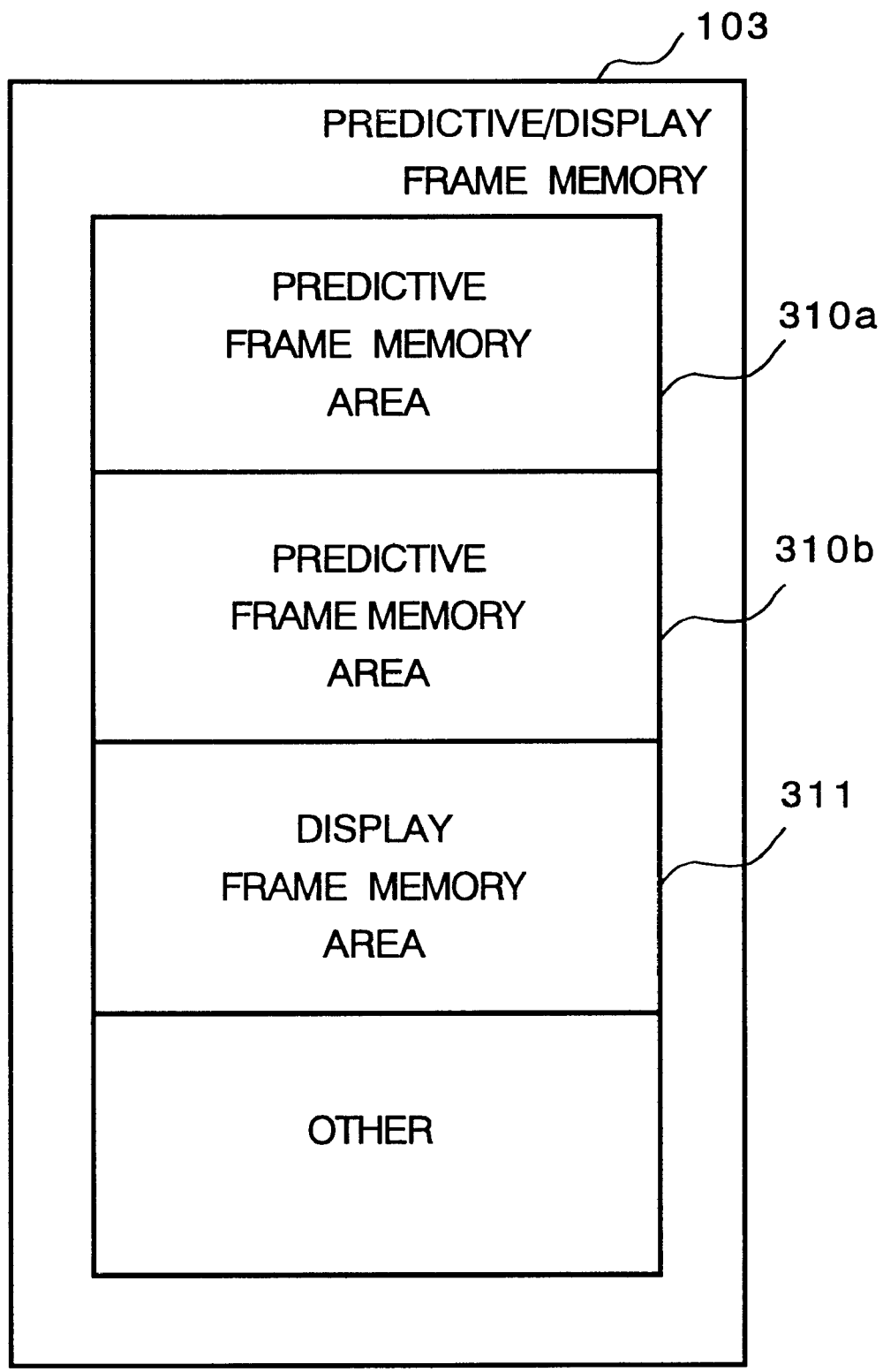
FIG. 3 is a bit map of a frame memory.

Referring now to FIG. 2, reference numerals 301*a* through 301*c* denote predictive frames used to decode other image frames; and 302*a* through 302*d* display frames only used to display the images. Referring further to FIG. 3, reference numeral 310*a* designates a predictive frame memory for storing a first predictive frame; 310*b* a predictive frame memory for storing a second predictive frame; and 311 a display frame memory for storing a display frame.

The following is a generating sequence of the encoded data 150 in an encoding section (not shown here) before being inputted to the decoding section 101:
(1) predictive frame 301*a*
(2) predictive frame 301*b*
(3) display frame 302*a* (predicted with predictive frames 301*a* and 301*b*)
(4) display frame 302*b* (predicted with predictive frames 301*a* and 301*b*)
(5) predictive frame 301*c*
(6) display frame 302*c* (predicted with predictive frame 301*c*)
(7) display frame 302*d* (predicted with predictive frame 301*c*)

Figure 4:
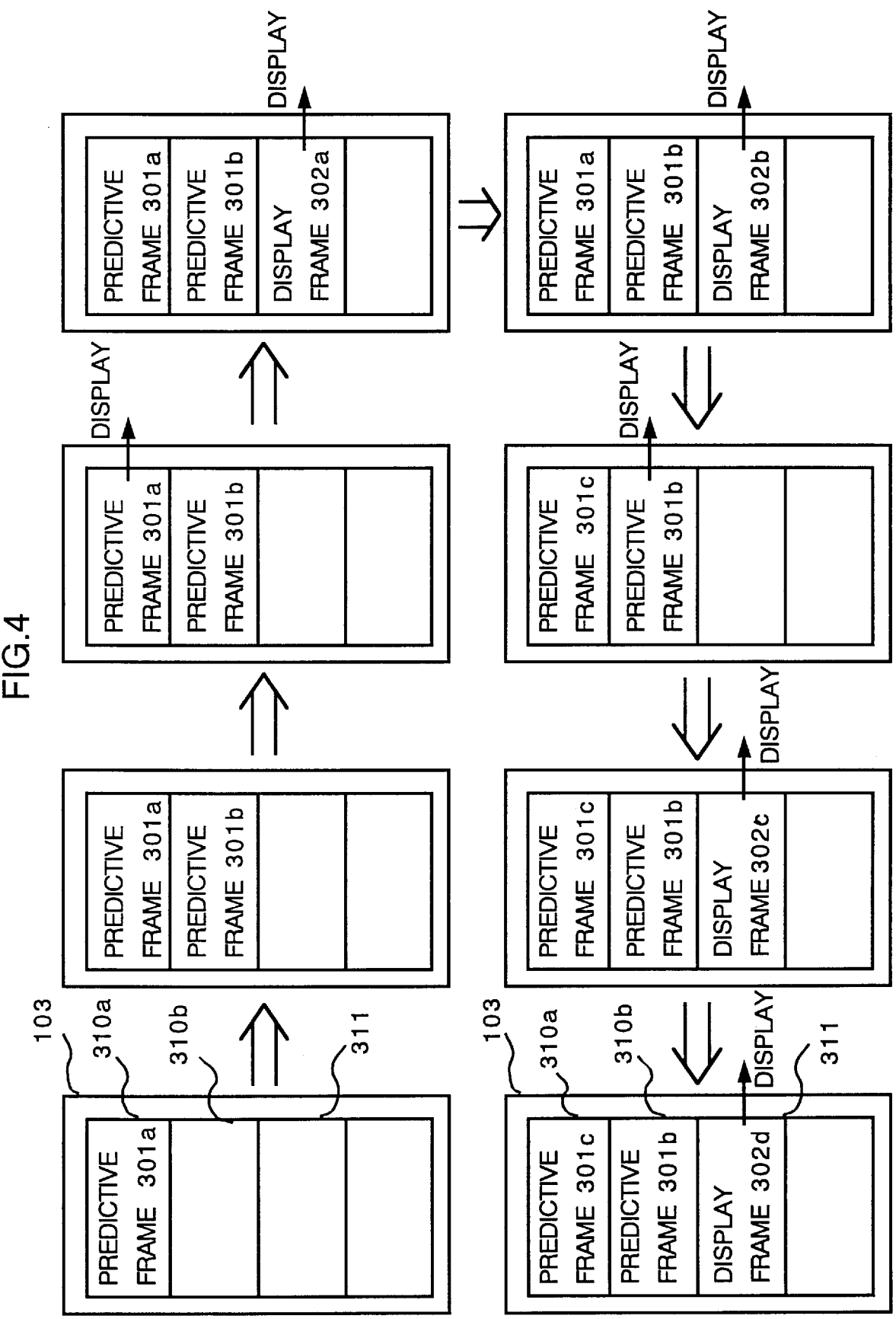
FIG. 4 shows an operation of the frame memory.

The decoded data 151 and the compressed data 152 are inputted to the compressing section 102 and the predictive/display frame memory section 103, respectively, in the same sequence as that above from (1) through (7). FIG. 4 shows a storing sequence of the compressed data 152 into the predictive/display frame memory section 103 including a displaying sequence.

The predictive frames 301*a*, 301*b*, 301*c* are stored in the predictive frame memory area 310*a*, 310*b* and used for displaying, for decoding a predictive frame, and further utilized for decoding the display frames 302*a*, 302*b*, 302*c*, 302*d*. On the other hand, the display frames 302*a*, 302*b*, 302*c*, 302*d* are stored in the display frame memory area 311 of the predictive/display frame memory section 103 and used only for displaying.

The data of the display frame is only used for displaying. Even if any error is generated with pre-compressed display frame data in expansion after the display frame data is compressed by the compressing section 102 of FIG. 1 through the lossy compression system, such an error will not be transmitted to other frames since the display frame 302*a*, 302*b*,302*c*, 302*d* is not referred by any frames. As stated above, through lossy compression, data cannot recover its original state after compression and expansion. In other words, the lossy compression system creates data loss which causes the error of mismatching between data before compression and data after compression.

On the other hand, the data of the predictive frame written in the predictive frame memory area 310*a*, 310*b*, is used to decode the other image frame. Thus, when the predictive frame 301*a*, 301*b*, 301*c* is compressed through the lossy compression system, any error generated by such a compression will be transmitted to the other image frame. With use of the lossy compression system in the compressing section 102, the compression is not performed for the predictive frame 301*a*. 301*b*, 301*c* while the data is accumulated in the predictive frame memory area 310*a*, 310*b*. Therefore, transmission of the error generated by the compression to other frames will be prevented.

On the other hand, when compression is to be performed in the compressing section 102 through the lossless compression system for full restoration of original data through compression, the original pre-compressed data can be perfectly restored. Therefore, the compression is performed for both the predictive frames 301*a* through 301*c* and the display frames 302*a* through 302*d*. This reduces the amount of information.

Figure 5:
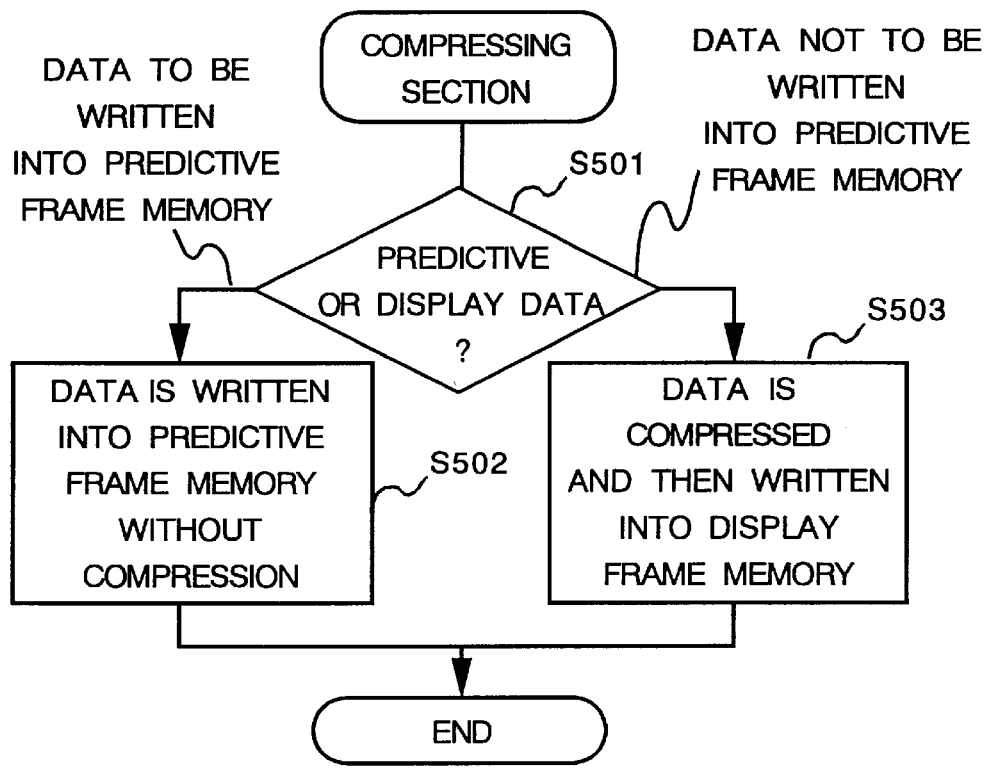
FIG. 5 is a flow chart showing a compressing process.

FIG. 5 is a flow chart showing a compression procedure. First, step S501 determines whether the decoded image frame outputted from the decoder 101 is predictive or display frame data. If the data is predictive frame data, it will be written into the predictive frame memory area 310*a*, 310*b* of the predictive/display frame memory section 103 without being compressed (Step S502). On the other hand, data used for display only is written into the display frame memory area 311 of the predictive/display frame memory section 103 after being compressed (Step S503). This procedure is preferable when the compression will not affect the other frame and if the compressing section 102 uses the lossy compression system.

Figure 6:
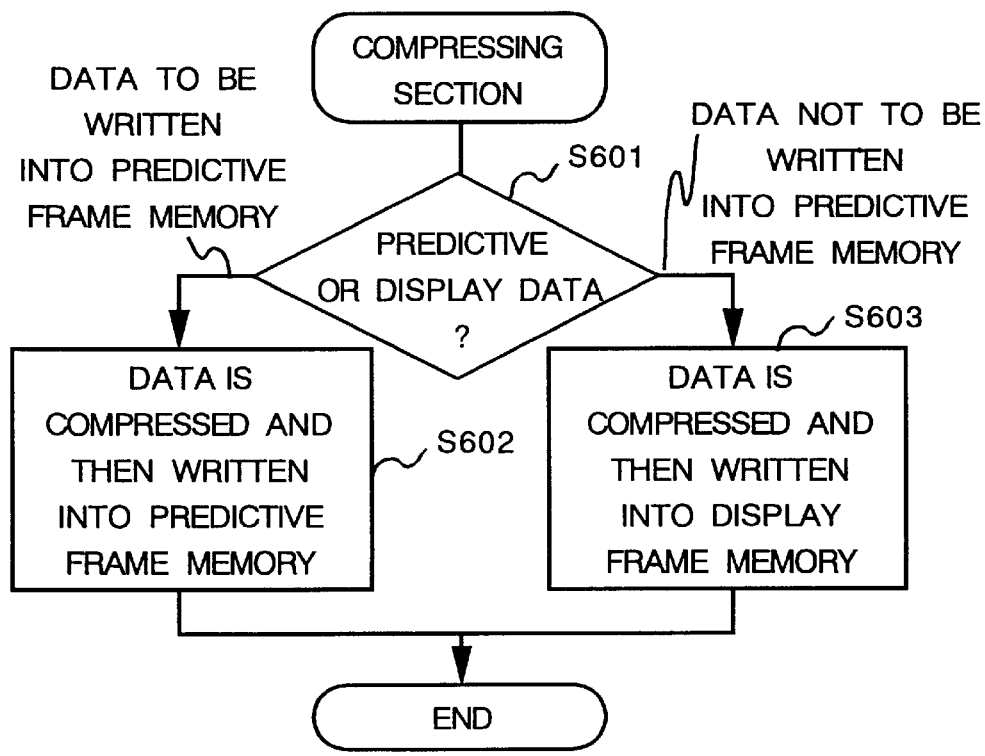
FIG. 6 is a flow chart showing another compressing process.

When the compression performed is lossless as shown in FIG. 6, both the predictive and display frame data area compressed. First, step S601 determines whether the decoded image frame output from the decoder 101 is predictive or display frame data. The predictive frame data is written into the predictive frame area 310*a* (Step S602), 310*b* while the display frame data is written into the display frame memory area 311 (Step S603).

Also, depending on the type of image frame, there is a further case where it is preferable that only the predictive frame data is compressed.

Figure 7:
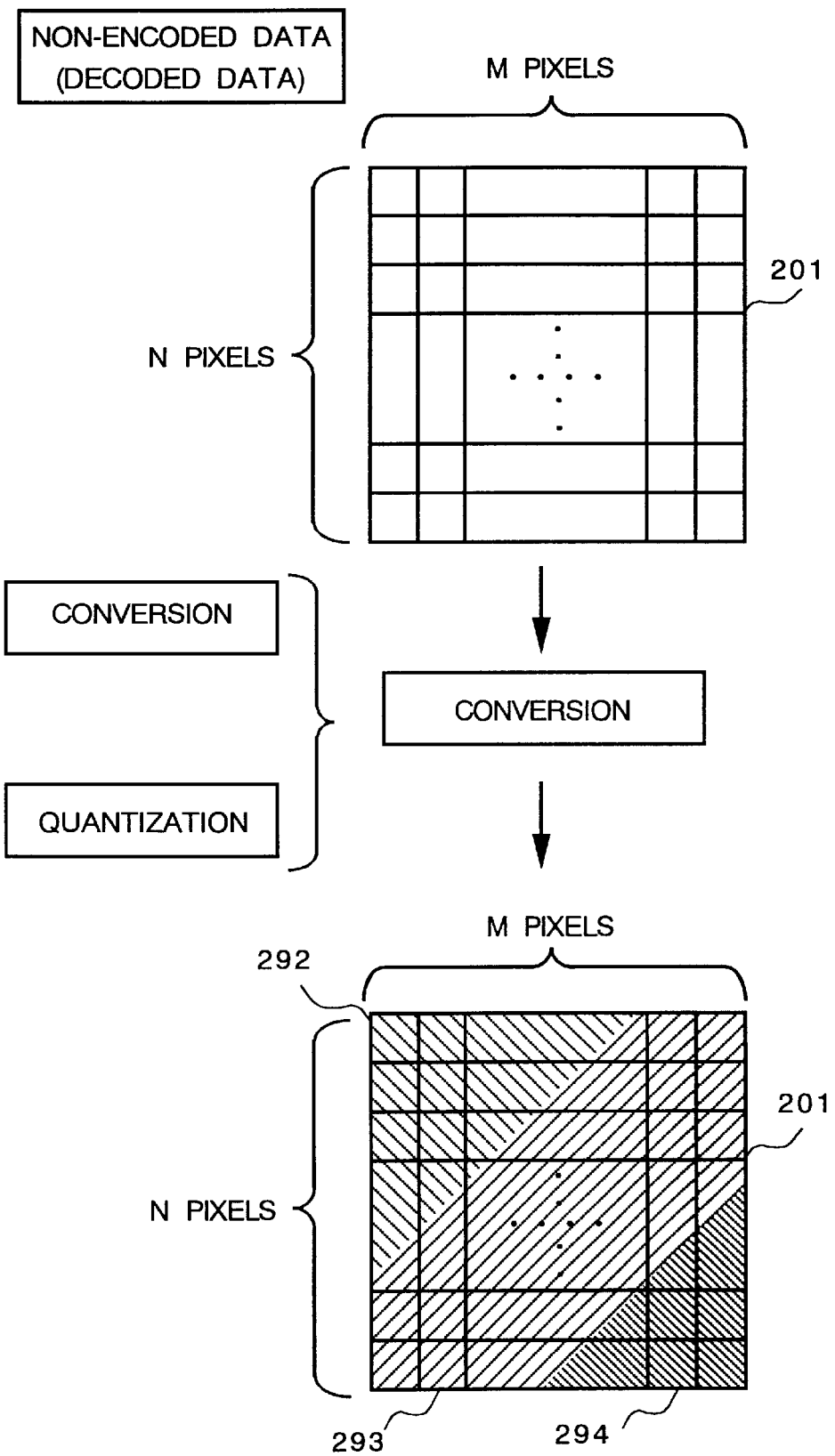
FIG. 7 is a view illustrating quantization.

FIG. 7 schematically shows the procedure of a compression process. Data in a block 201 of M pixels×N lines (pixels) that have been decoded by the decoder 101 of FIG. 1 are subjected to one of a plurality of conversion processes. Since each of the pixels is represented by bits equal in number to r, the amount of information in one block is equal to M×N×r. After the data of M pixels×N lines have been subjected to a conversion process such as Discrete Cosine Transformation (DCT) or other conversion, they will include a low-frequency signal region 292 on the left and upper region, an intermediate-frequency signal region 293 in the center region and a high-frequency signal region 294 on the right and lower region.

Figure 8:
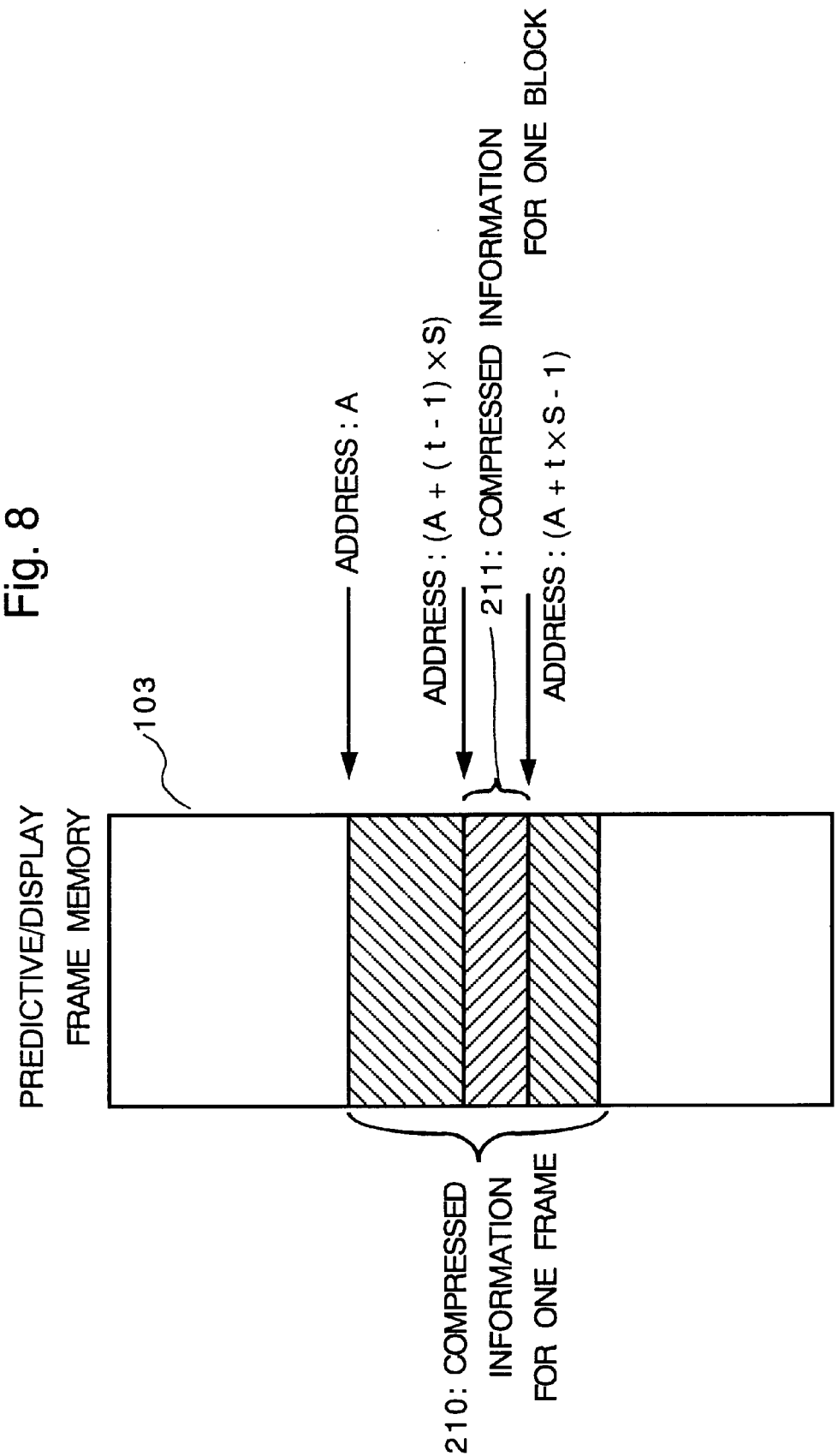
FIG. 8 is a bit map of a predictive/display frame memory section.

FIG. 8 is a memory map of data for one frame compressed at the predictive/display frame memory section 103. In this figure, reference numeral 210 denotes a location in which the information of one compressed frame is stored; and 211 a location in which the information of the t-th block in one compressed frame is stored.

The compressing section 102 converts the block 201 of M×N pixels depending on the characteristics of the image. The converted block is divided into the low-frequency signal region 292, the intermediate-frequency signal region 293 and a high-frequency signal region 294. The allocation is performed such that the number of pixels in the low-frequency signal region is equal to r1 and the allocated number of bits in the low-frequency signal region is equal to s1 bits/pixel; the number of pixels in the intermediate-frequency signal region is equal to r2 and the allocated number of bits in the intermediate-frequency signal region is equal to s2 bits/pixel; and the number of pixels in the high-frequency signal region is equal to r3 and the allocated number of bits in the low-frequency signal region is equal to s3 bits/pixel where s1>s2>s3; and r1+r2+r3=M×N. The allocation of a larger number of bits to the lower-frequency region is because the signals in the lower-frequency region more greatly affect the image. Thus, the effect on to the image can be reduced while the amount of data can be compressed and reduced in size.

If a quantization is performed after such an allocation of the bit number has been carried out, an amount of information S generated in the blocks:
S=r1×s1+r2×s2+r3×s3
will always be maintained constant.

Therefore, the addressing in a block unit can be regularly requested and a desired image frame compressed and accumulated in a memory can be read out from any block. If it is assumed, for example, that a head address in a compressed frame is A as shown in FIG. 8, the address of the t-th block in the compressed frame is between (A+(t−1)×S) and (A+t× S−1). If the t-th block is to be accessed for decoding, any block can be easily accessed since the memory location of any compressed frame is known.

Figures 9, 10:
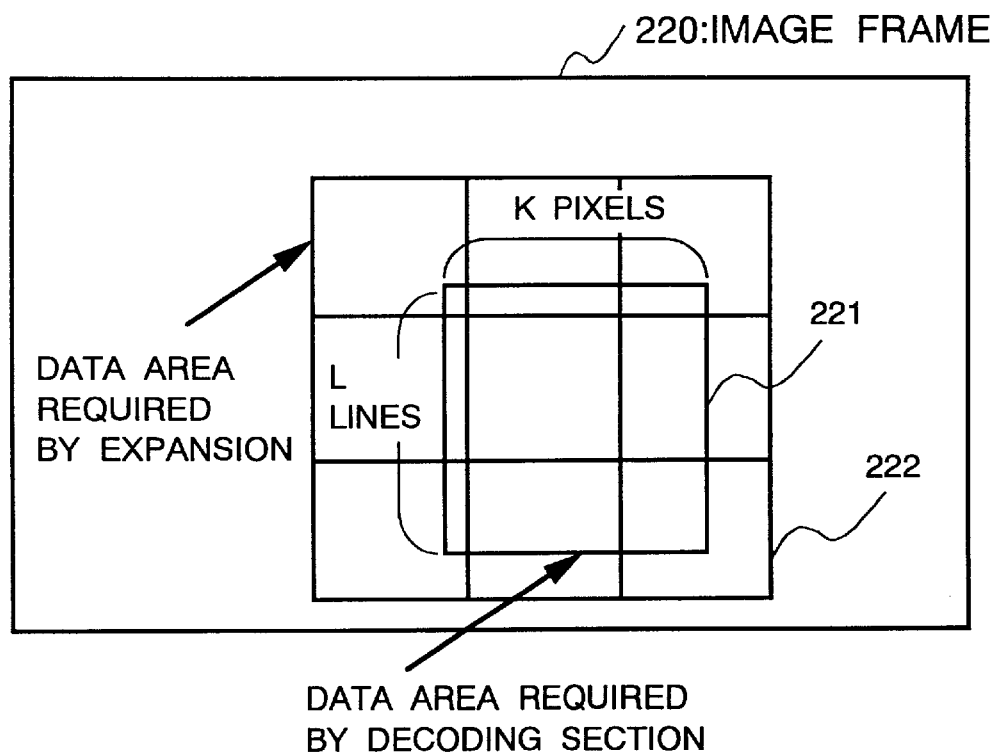
FIG. 9 is a view showing Harr conversion which is one of the compressing systems.
FIG. 10 is a view showing a data area required by the expansion and a data area to be decoded.

FIG. 9 shows a case where Harr conversion, which is one type of lossy conversion, is used as a converting/encoding algorithm. In this figure, H shows a coefficient matrix for eight pixels×eight lines to be converted.

If it is assumed that an image of a block before it being subjected to one-dimensional Harr conversion is X and the converted block is B, then
B=HX.
If the block B becomes B' after it has been quantized and compressed, a block Y obtained after the block B' has been expanded is
Y=H$^{-1}$B'
The compression and expansion can be carried out through such an operation.

Such a process is a lossy compression since the number of bits is reduced through the quantization after conversion. It is to be understood that the present invention is not limited to Harr conversion, but may be similarly applied to any other conversion.

FIG. 10 shows the relationship between different areas in one-frame image data. In this figure, reference numeral 220 denotes an image frame; 221 a decoded predictive block including K×L. pixels required by the decoding operation; and 222 a group of expanding blocks required by the expanding operation.

Referring to FIG. 10 as well as FIG. 1, the decoder 101 uses the decoded predictive block 221 or K×L pixels which is obtained from any point in the image frame 220 decoded as a predicting image data and accumulated in the predictive/display frame memory section 103. On the other hand, the data within the predictive/display frame memory section 103 are compressed and stored in block units. Thus, where the decoded predictive block 221 of K×L pixels spans between adjacent blocks, the necessary data will not be obtained by expanding only one block.

To overcome such a problem, the expanding A section 104 takes out groups of expanding blocks 222 containing the decoded predictive block 221 from the predictive/display from a memory section 103. The expansion is performed for each block. The expanding A section 104 then extracts the data of the decoded predictive block 221 required by the decoding section 101, this data being fed to the decoding section 101. where the expanding A section 104 takes out the compressed data from the predictive/display frame memory section 103, the address of the compressed data within the predictive/display frame memory will be subjected to the aforementioned addressing.

In such a manner, the data of the decoded predictive block can be obtained from any area in the stored data. By accumulating the data of the groups of expanding blocks 222 in an expanded data block memory (not shown) within the expanding A section 104, the predictive image data required when the decoding section 101 is to decode the next block is provided only by updating a new necessary part. Particularly, the location of the decoded predictive block required by the decoding operation is predicted using motion vectors between the frames and therefore more probably re-used between the adjacent blocks. Thus, a predetermined number of expanded blocks have been stored in the expanding A section 104. when the next block requires any other block, the stored data can be updated in block unit. This improves the efficiency of the expanding operation.

It is also preferable that a memory for storing the image data in a plurality of expanded blocks is the same arrangement as in the image frames. The data may be read out in a given sequence, for example, for each horizontal line, the necessary data portion being only extracted by a gate circuit. In such a case, such a memory is preferably of the same structure as that of a block line memory that will be described later.

Alternatively, data within the necessary range may only be read out from a memory in which image data is a plurality of blocks that have been stored, the data read then being supplied to the decoder 101. In other words, only the aforementioned data of K×L pixels may be sequentially read out and supplied to the decoder 101.

Figure 11:
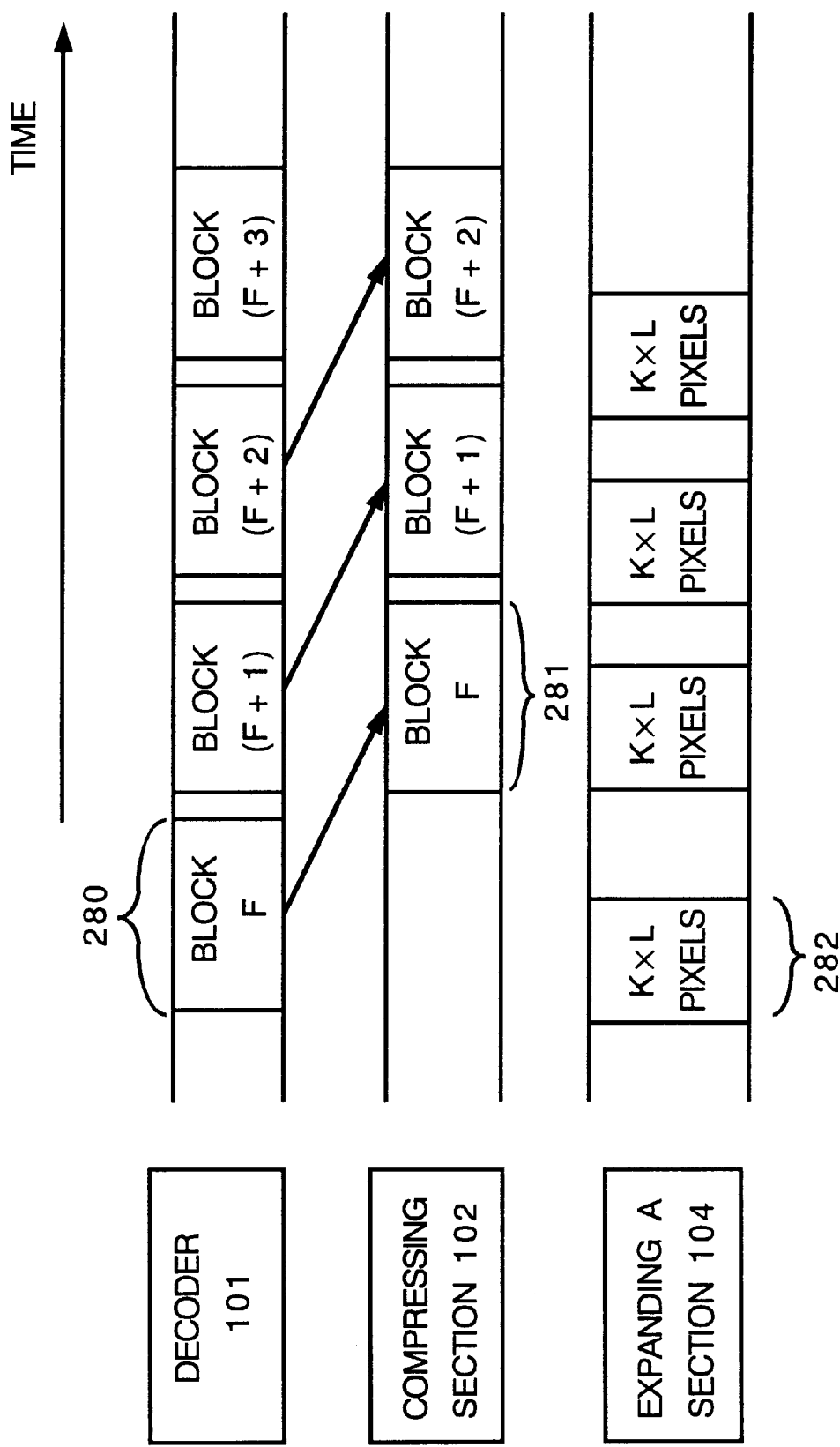
FIG. 11 is a block diagram of an expanding A section.

FIG. 11 is a timing chart for the digital image decoding apparatus of FIG. 1. In this figure, reference numeral 280 designates a block decoding time required to decode one block by the decoder 101; 281 a compressing time required to compress one block at the compressing section 102; and 282 an expanding time required to expand the necessary data (K×L pixels) required by the decoder 101 at the expanding A section 104.

The decoder 101 decodes the data encoded in block unit within the block decoding time 280. At this time, the data of K×L pixels from the predictive/display frame memory section 103 at any start position is required as predictive data. Thus, the expanding A section 104 retrieves necessary data from the predictive/display frame memory section 103 in response to a request from the decoder 101, the data read then being expanded and supplied to the decoder 101. The expanding time 282 is the time required to supply the data to the decoder 101 starting from the request of the decoder 101 to expanding A section 104. The decoded data 151 is transferred from the decoder 101 to the compressing section 102. The transferred data is then completely compressed within a time through which the decoded data 151 of the next block is transferred from the decoder 101 to the compressing section 102. The compressed data is then written into the predictive/display frame memory section 103.

In such a manner, the decoding operation for encoded dynamic images can be accomplished in real time. Even if the decoded images are compressed and written into the frame memory to decrease the amount of information, the system can be operated without problem.

Figure 12:
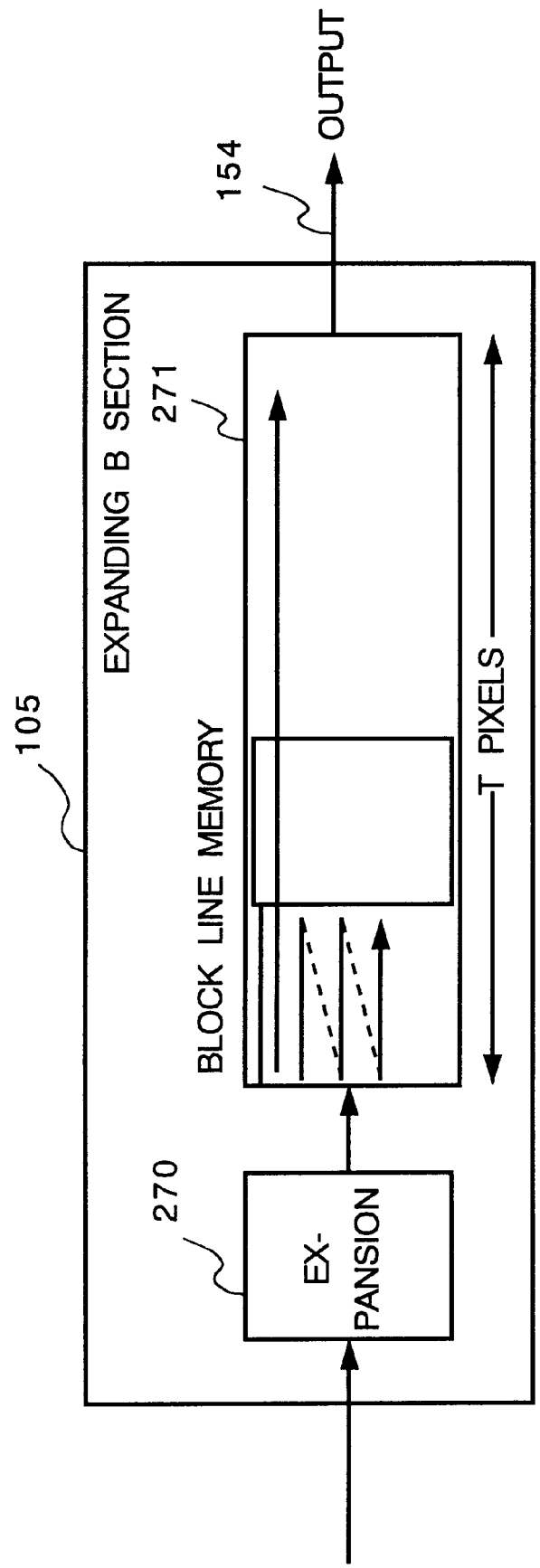
FIG. 12 is a view showing the structure of an expanding B section.

FIG. 12 shows the structure of the expanding B section 105. In this figure, reference numeral 270 represents an expanding section; and 271 a block line memory.

The expanding B section 105 receives the data of each block read out from the predictive/display frame memory section 103. The inputted block data is first expanded by the expanding section 270. The expanded data is then sequentially stored in the block line memory 271 at a given location for each block. The block line memory 271 has a capacity sufficient to accumulate all the horizontal blocks (block line) of the image frame 220. If it is assumed, for example, that the horizontal length of the image frame 220 includes pixels equal in number to T and has blocks that are equal in number to J, the block line memory 271 will have a capacity corresponding to the blocks equal in number to J.

Figure 13:
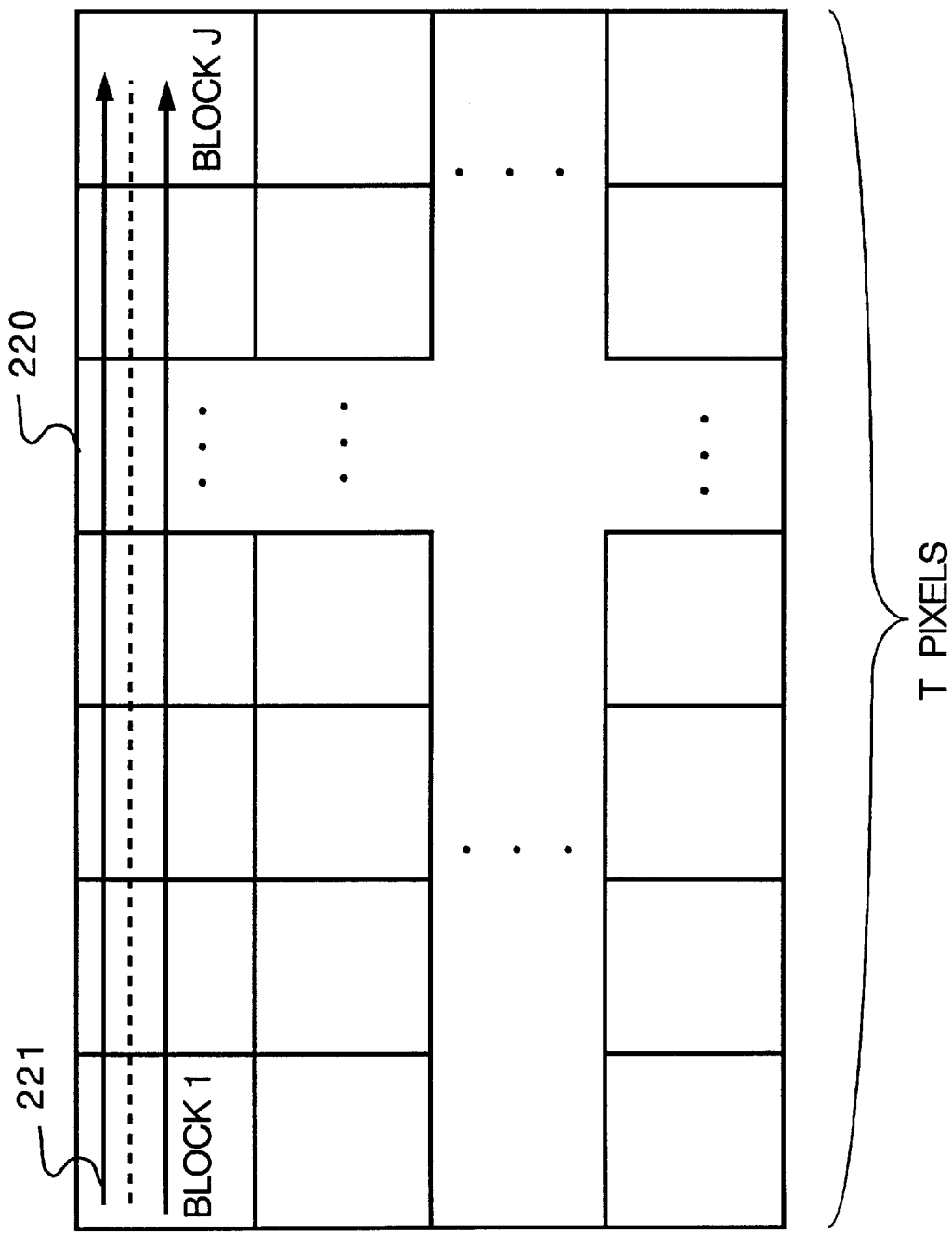
FIG. 13 is a view illustrating the process of the expanding B section.

The reading of blocks is carried out for each pixel along the scan lines forming the image (i.e., in the left-to-right direction spanning between the blocks), rather than in a block unit as shown in FIG. 13. In other words, the data of all the pixels on one horizontal scan line will be read out sequentially. When the reading operation is terminated for one horizontal scan line, the data of all the pixels on the next horizontal scan line will be read out. Such a procedure is then repeated for each scan line.

In such an arrangement, the reading operation can be carried out in the direction of raster by accumulating the data compressed in block units by one block line at a time. This data will be outputted for displaying an image. The displaying signal can be provided, for example, by reading out the data on one horizontal scan line in synchronism with a horizontal synchronizing signal that defines one horizontal scan line for a displayed scene.

Figure 14:
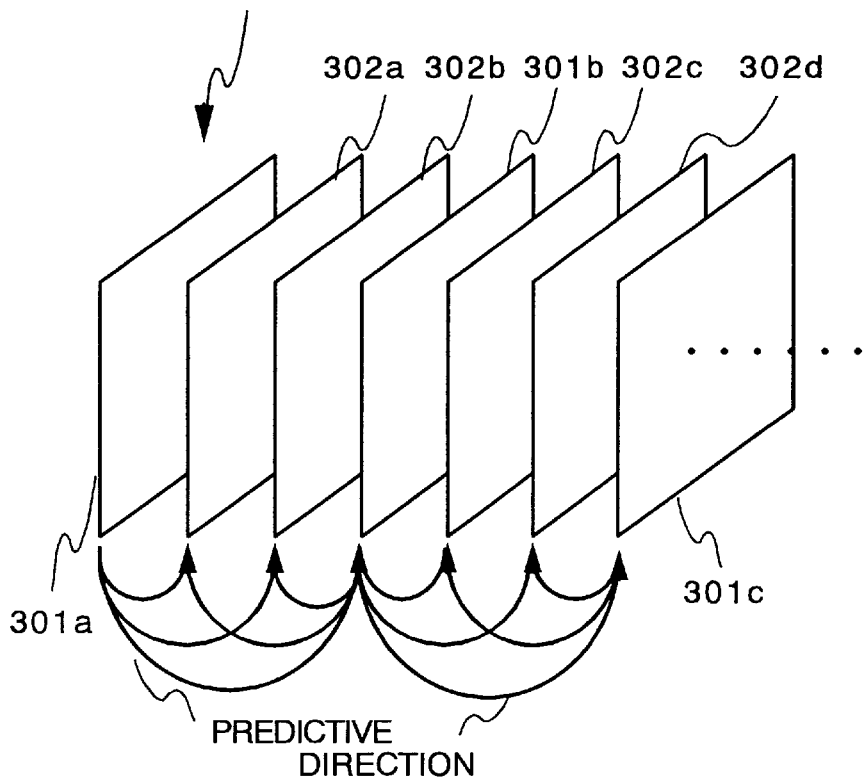
FIG. 14 is a view showing different types of encoded trains.
Figure 15:
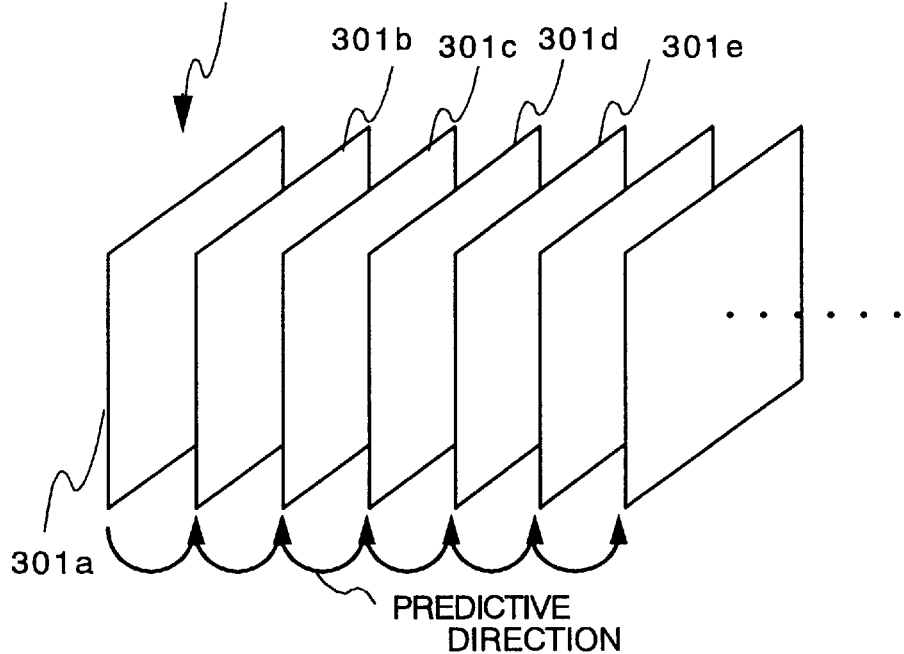
FIG. 15 is another view showing different types of encoded trains.
Figure 16:
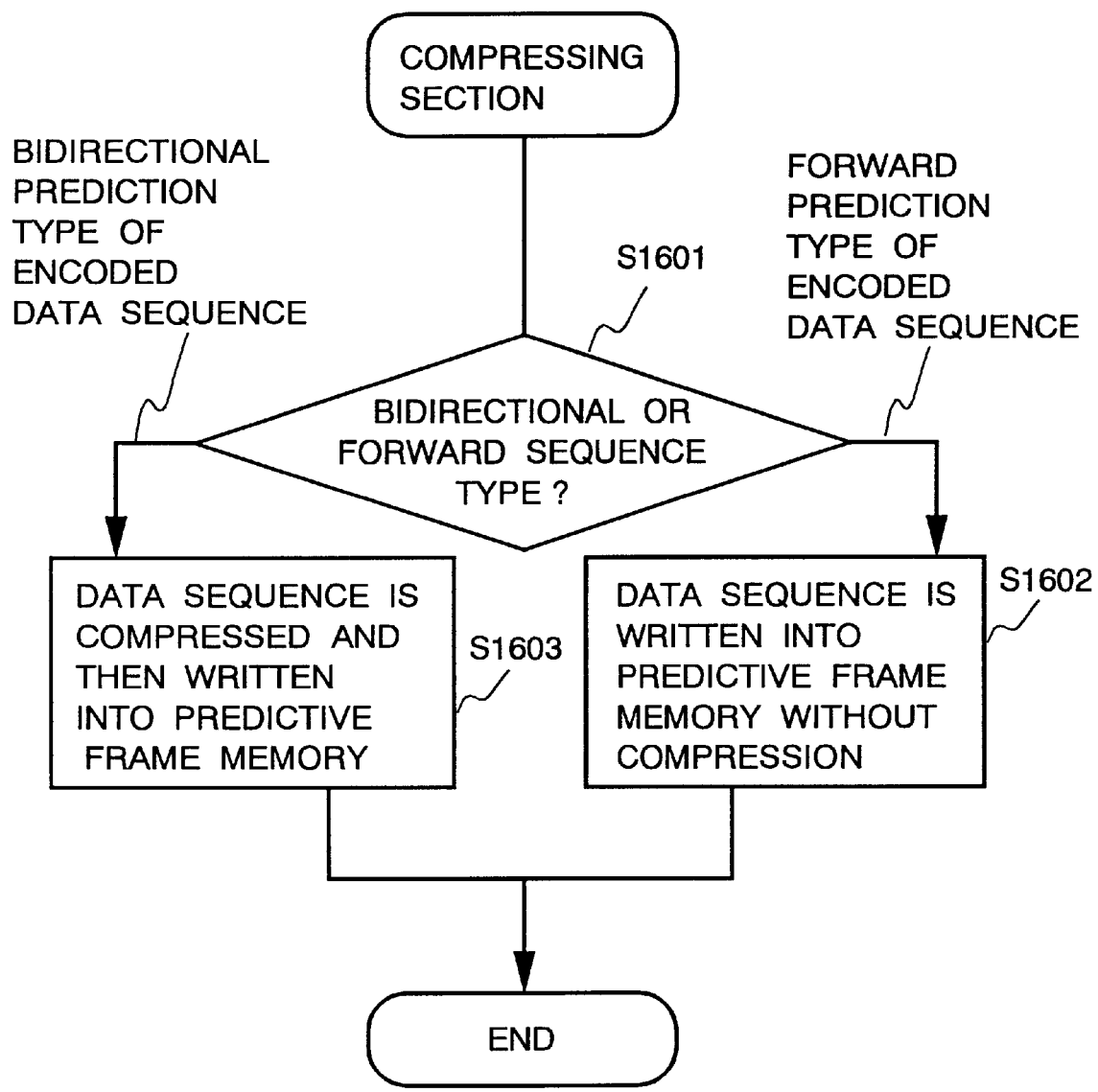
FIG. 16 is a flow chart illustrating the compressing operation.

FIGS. 14 and 15 show different types of encoded data sequences; FIG. 16 is a flow chart illustrating the operation of the compressing section 102; and FIG. 17 is a schematic bit map of a predictive frame memory that holds the compressed data.

As shown in FIGS. 14 and 15, the encoded data sequences are of a bidirectional prediction type and a forward prediction type. More particularly, the bidirectional prediction type encoded data sequence is adapted to decode an image by using the data in both the forward and backward frames as predictive data. The forward prediction type encoded data sequence is adapted to decode an image by the use of the data in only the forward frame as predictive data.

As shown in FIG. 16, the type of encoded data sequence is judged (Step S1601). If it is a forward prediction type encoded data sequence, the decoded data are sequentially written into the predictive frame memory areas 310a and 310b without being compressed by the compressing section 102 (Step S1602). On the other hand, if the encoded data sequence is of the bidirectional prediction type, the data are compressed into two compressed frames of data which are in turn written into the predictive frame memory areas 310a and 310b, respectively (Step S1603).

Figure 17:
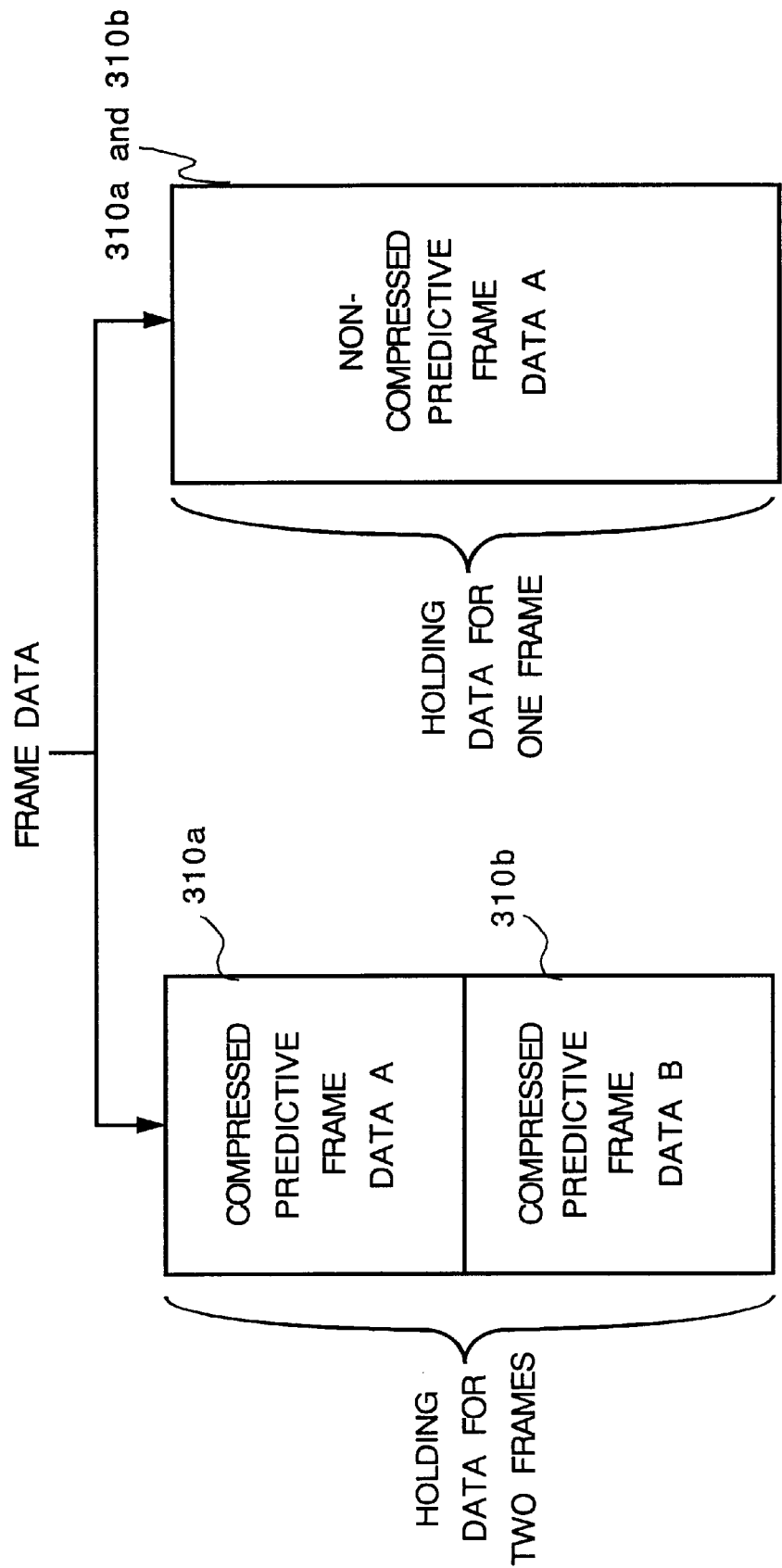
FIG. 17 is a schematic bit map of a predictive frame memory.

In such a manner, the data will be stored as shown in FIG. 17. More particularly, the compressed data of the two frames used for prediction are respectively stored in the predictive frame areas 310a and 310b of the predictive/display frame memory section 103 if the encoded data sequence is of the bidirectional prediction type. This is used to perform the decoding operation at the decoder 101. If the encoded data sequence is of the forward prediction type, the decoding operation is made using the data of one frame which is stored in the predictive frame memory area 310a, 310b.

Since the decoding operation can be carried out without compression if the encoded data sequence is of the forward prediction type, the image will not be degraded due to the compression. If the encoded data sequence is of the bidirectional prediction type, two predictive frames can be used to predict and encode the other frames between these two frames. This enables the encoding operation to be more efficient. When the data compressed by the compressing section 102 are stored in the predictive/display frame memory section 103, a smaller capacity for that memory can be maintained.

Embodiment 2.

Image compression, if performed without considering the size of image, may cause irreparable deterioration of the image. A poorly restored image may be the result from such an indiscriminate compressing practice especially with an image too small to be suitable for compression in connection with the storage capacity of a frame memory. Suppose that an image of 1.1 times as large in size as that of a frame memory is subjected to compression at an indiscriminate rate of 50% for example. The comparatively small image may consequently be reduced unnecessarily and inappropriately in half to be stored in the comparatively large frame memory. The half-size compressed image would then appear in a state of catastrophic damage when being displayed.

In light of the discussion above, a digital image decoding apparatus of a second embodiment of the present invention introduces an adaptive approach of image size sensitive compression added to the first embodiment, in pursuit of reduction of compression-related deterioration of image to a minimum. With this approach, an image is compressed with an adaptive rate of compression modified optimally to the size of image in connection with the storage capacity of a frame memory. Image size or the size of image is included in the encoded data as a piece of image information. The size of image is identified as the number of pixels by bit width per pixel in an image. In other words, the size of image is defined as: T pixels/line×U lines/frame×r bits/pixel.

Figure 18:
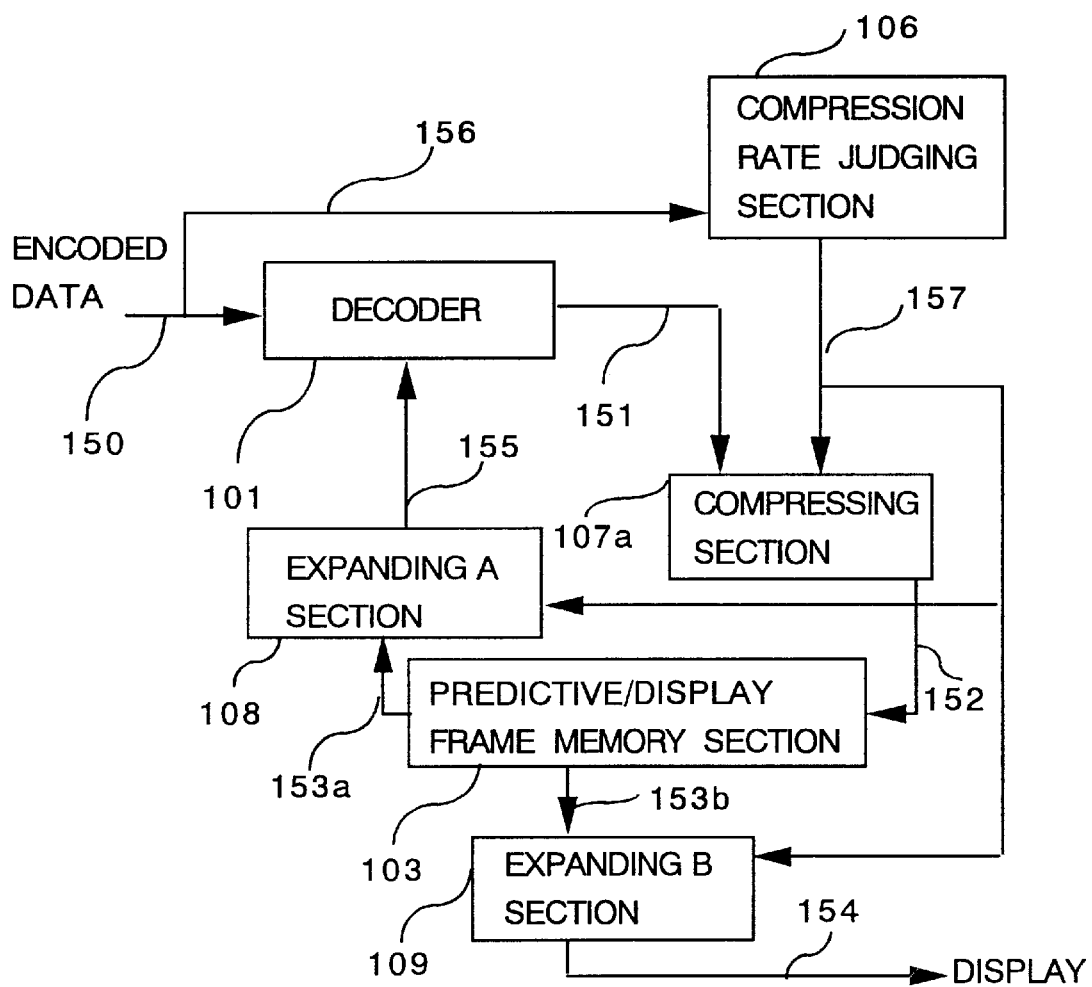
FIG. 18 shows a block diagram of a digital image decoding apparatus according to a second embodiment of the present invention.

FIG. 18 shows a block diagram of a digital image decoding apparatus according to this second embodiment. The digital image decoding apparatus of FIG. 18 includes a compression rate judging section 106 for receiving image size information 156 and outputting compression rate information 157, a compressing section 107a for compressing decoded data 151 and outputting compressed data 152, an expanding A section 108 for expanding compressed predictive data read out from a predictive frame memory and outputting expanded predictive data 155, an expanding B section 109 for expanding compressed display data read out from a display frame memory and outputting expanded display data 154 sequentially according to the raster display order illustrated in FIGS. 12 and 13. The digital image decoding apparatus further includes functional elements equivalent to those of FIG. 1 such as decoder 101 for decoding encoded data 150 with reference to the expanded predictive data 155, and predictive/display frame memory 103 having predictive frame memory areas, 310a, 310b and display frame memory area 311.

Referring to the inventive aspects of the digital image decoding apparatus of this embodiment, the decoder 101 decodes the encoded data 150, which is a piece of encoded information of an image including the size of the image, on a frame basis to provide frame based decoded data 151. The predictive/display frame memory section 103 including frame memory, being assigned a predetermined storage capacity stores image data on a frame basis. The compression rate judging section 106 receives the image size information 156 including the size of image of the encoded data 150. The compression rate judging section 106 judges a rate of the decoded data 151 to be compressed and stored in the frame memory based upon the size of the image in connection with the storage capacity of the frame memory. The compression rate judging section 106 selects a compression mode from among a plurality of compression modes based upon the rate of compression. The image size information 156 may be not limited to the size of image defined above, but be any identifier for identifying the size of image defined above. The image size information 156 may not necessarily be included in the encoded data, but be provided externally to the compression rate judging section 106.

The compressing section 107a compresses the decoded data 151 decoded in the decoder 101 on a block basis based upon the rate judged by the compression rate judging section 106 and then sends compressed decoded data as the compressed data 152 (which is a generalized term which includes compressed predictive data 153a and compressed display data 153b) to the frame memory 103 to be stored.

The expanding A and B sections 108 and 109 (which may be generalized as expanding sections) read out the compressed data 152 stored in the frame memory 103 and expand the compressed data 152 based upon the rate judged by the compression rate judging section 106.

The frame memory may include a predictive frame memory for storing decoded data of a predictive frame to be used as a predictive reference for decoding the encoded data 150 in the decoder 101. The compressing section 107a compresses the decoded predictive frame data to be stored in the predictive frame memory. The expanding section includes the expanding A section 108 for expanding the compressed decoded predictive frame data or compressed predictive data 153a stored in the predictive frame memory and send expanded decoded predictive frame data as expanded predictive data 155 to the decoding section 101.

The frame memory may also include a display frame memory for storing decoded data of a display frame to be used for display. The compressing section 107a compresses decoded display frame data to be stored in the display frame memory. The expanding section includes the expanding B section 109 for expanding the compressed decoded display frame data or compressed display data 153b stored in the display frame memory and output expanded decoded display frame data as display data 154.

Figure 19:
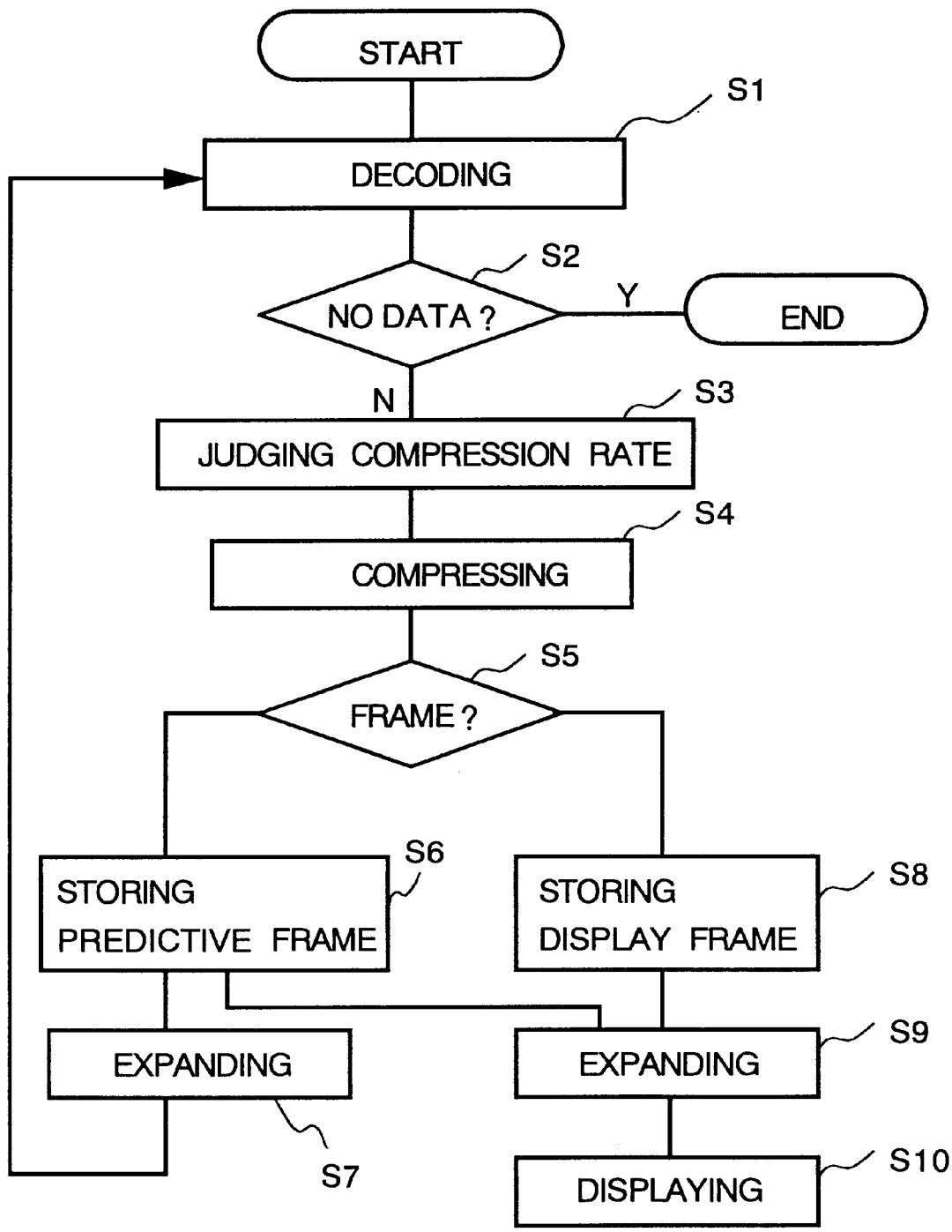
FIG. 19 shows a flowchart of the digital image decoding apparatus of FIG. 18.

FIG. 19 is a flow chart illustrating an operating sequence of digital image decoding implemented in the digital image decoding apparatus of FIG. 18. A series of the operating steps of FIG. 19 begins with the encoded data 150 being decoded in the decoder 101 in step Si with the expanded predictive data 155 as a reference if there is any. The encoded data 150 are, at the same time, sent to the compression rate judging section 106, where the image size information 156 included in the encoded data 150 is used for judging the rate of compression in connection with the storage capacity of the predictive/display frame memory 103 in step S3.

With this embodiment, the rate of compression $l_m$ is defined as (amount of pre-compressed data)/(amount of post-compressed data). For adaptive and optimal compression to different image data in size, n number of values $l_1$ through $l_n$ of the rate of compression $l_m$ are provided as choices when $l_m \geq 1$ and $1 \leq m \leq n$ (n: natural number). For example, an expression $T \times U \times r / l_m \leq Z$ is given with an image frame having $T \times U$ pixels and r bits per pixel, and with the respective predictive/display frame memory areas 310a, 310b, 311 of the predictive/display frame memory 103 having Z bits for the storage capacity. From among the plurality of choices of $l_m$, the least value of $l_m$ should be defined as the rate optimal to the image frame to be compressed.

In step S4, the decoded data 151 from the decoding section 101 are compressed in the compressing section 107a based upon the compression rate information 157 from the compression rate judging section 106. The compression rate information 157 may be any other form identifying or representing the rate, degree, or intensity of compression. It may be selected from among values representing ranges of compression rates divided into different ranges, and identifiers or information identifying the ranges of compression rates and the like. The rate, value, or information, representing or identifying the degree or intensity of compression should correspond as well as the compression rate information 157 to a compression mode implemented in the compressing section 107a discussed below. Then the compressed data 152 are sent to the predictive/display frame memory 103 from the compressing section 107a to be stored. The compressed data 152 are sorted out in step S5 to be written into the predictive frame memory area, 310a, 310b in step S6, with a predictive frame, and to be written into the display frame memory area 311 in step S8, with a display frame. The compressed data 152 stored in the display frame memory area 311 are read out as compressed display data 153b when required and expanded in the expanding B section 109 based upon the compression rate information 157 in step S9. Then expanded display frame data are read out sequentially as the display data 154 in accordance with the raster display order in step SIO.

The compressed data 152 stored in the predictive frame memory area 310a, 310b are read out as compressed predictive data 153a from the predictive/display frame memory 103 when required in the decoding section 101 for decoding the encoded data, and expanded in the expanding A section 108 based upon the compression rate information 157 in step S7. When the decoding section 101 receives no encoded data in step S2, the digital image decoding apparatus terminates the operation.

The digital image decoding apparatus of this embodiment contributes greatly to downsizing of the predictive/display frame memory section 103 through reduction of data bits of image data to be stored in a frame memory included therein. Besides, the image size sensitive compression with the compression rate judging section 106 and the image size information 156 allows a digital image decoding apparatus to reduce compression-related deterioration of image to a minimum by means of adaptive rate of compression modified optimally to the size of image to be compressed.

Figure 22:
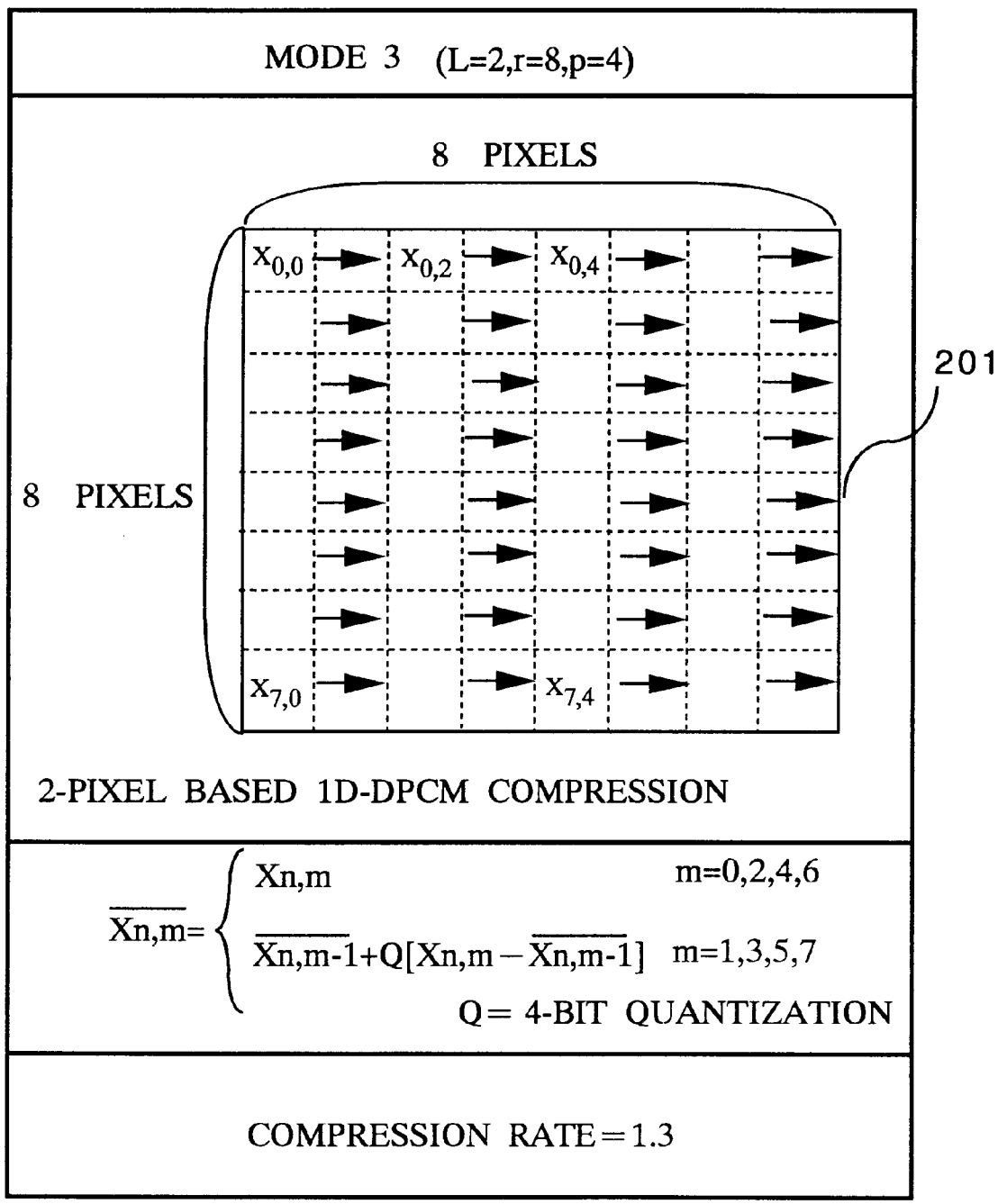
FIG. 22 shows yet another compression method implemented in the compressing section of the digital image decoding apparatus of FIG. 18.
Figure 23:
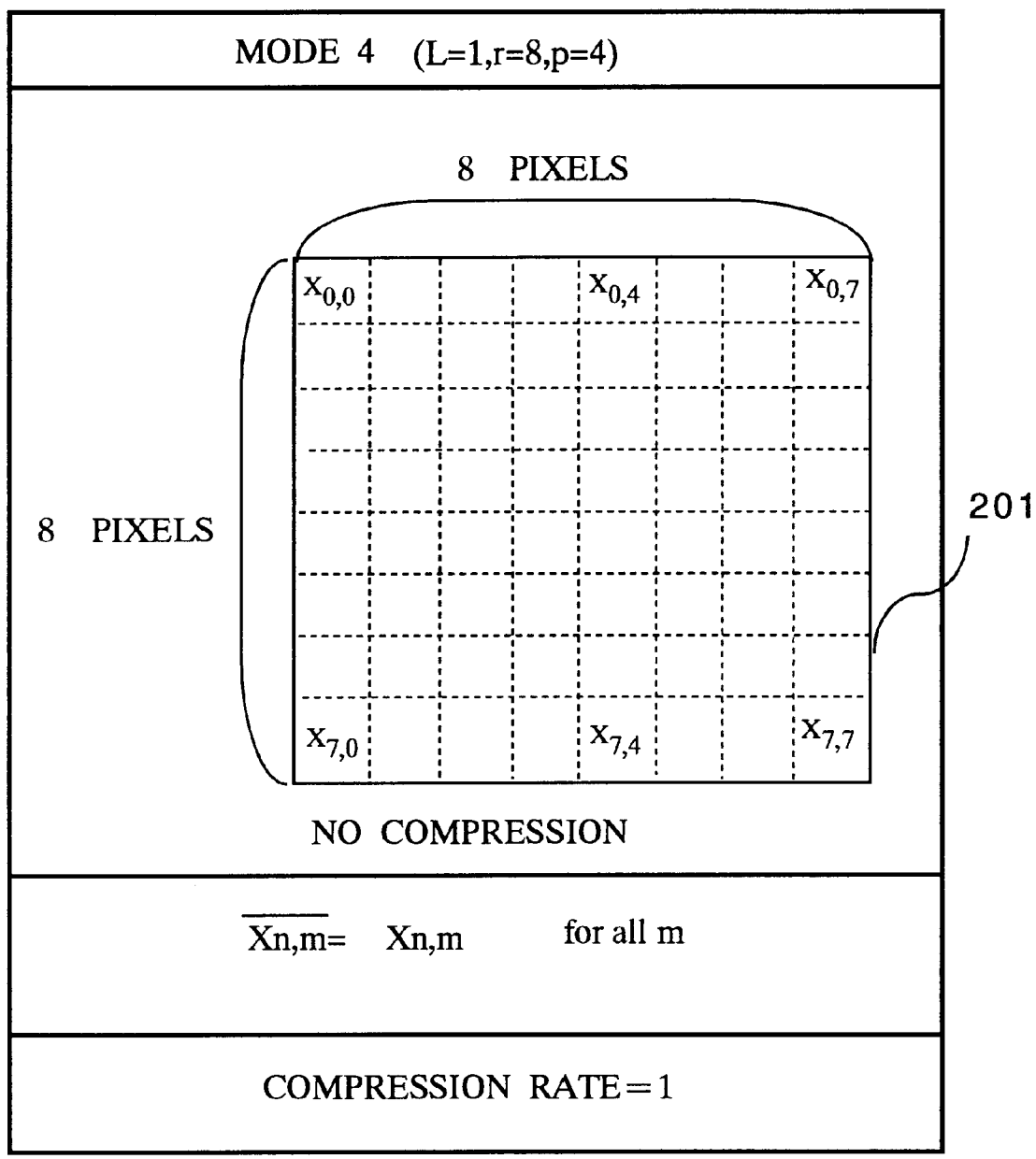
FIG. 23 shows yet another compression method implemented in the compressing section of the digital image decoding apparatus of FIG. 18.
Figure 24:
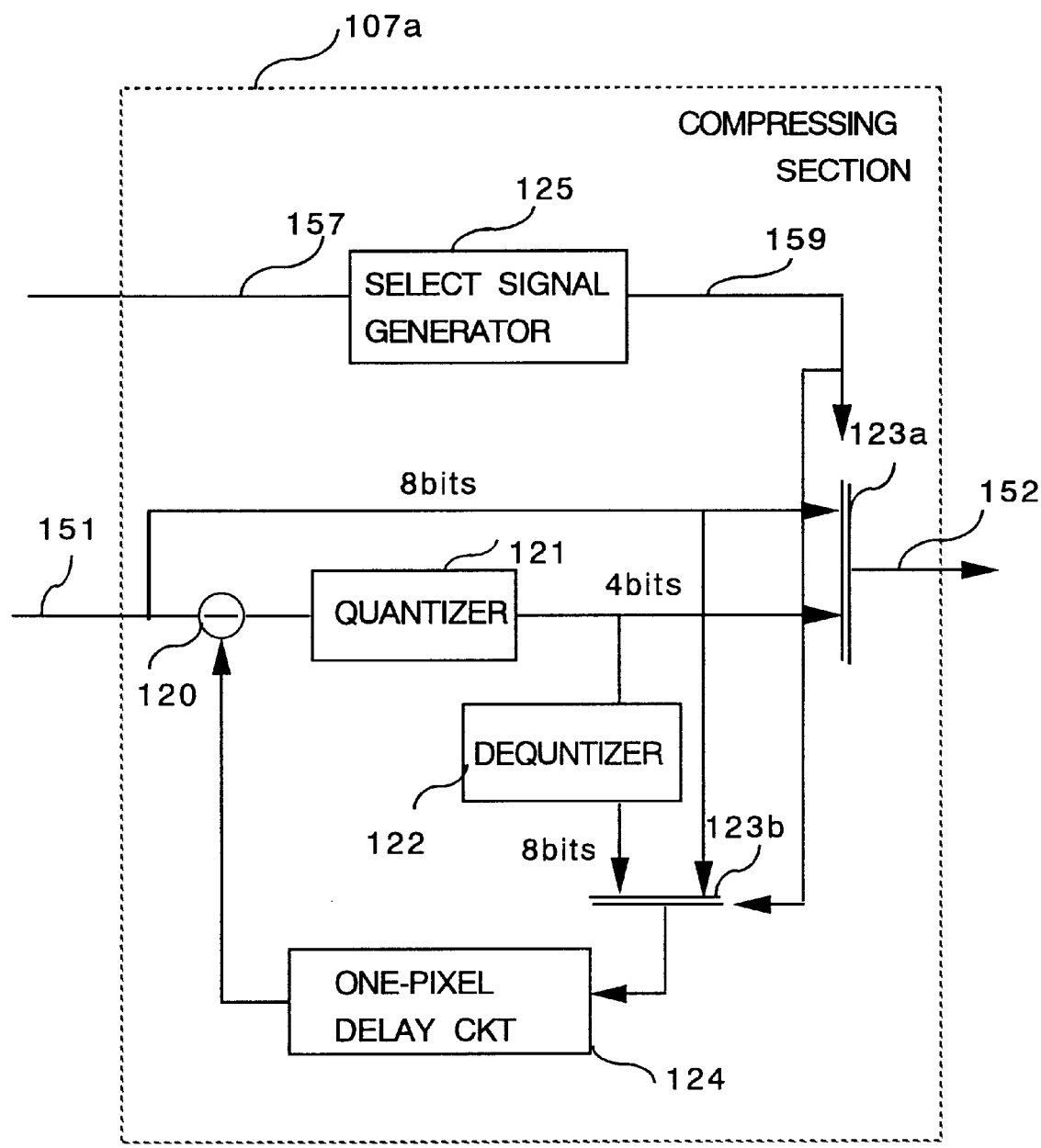
FIG. 24 shows a block diagram of the compressing section of the digital image decoding apparatus of FIG. 18.

FIG. 24 shows a block diagram of the compressing section 107a of the digital image decoding apparatus of FIG. 18. With the compressing section 107a, adaptive image compression is attained through a mode-based adaptive unit-by-unit processing control of image data based upon One Dimension-Differential Pulse Code Modulation (1D-DPCM) method. FIGS. 20 through 23 show different types of mode-based adaptive 1D-DPCM unit control implemented in the compressing section 107a. With the mode-based adaptive unit-by-unit control approach, the number of 1D-DPCM compression unit L of pixels is modified with a mode specified by the compression rate information 157, namely, eight pixels (L=8) with Mode 1 of FIG. 20, four pixels (L=4) with Mode 2 of FIG. 21, two pixels (L=2) with Mode 3 of FIG. 22 and one pixel (L=1) with Mode 4 of FIG. 23. In other words, image data in a block 201 of M×N pixels (M=8 pixels; N=8 pixels; r=8 bits/pixel) are subjected to fixed four-bit quantization (p=4) unit by unit with the DPCM compression unit L. Basically, a difference between adjacent two pixels in an adaptive DPCM unit L is quantized sequentially with the fixed quantum of four bits with a heading pixel in the unit left unquantized.

Figure 20:
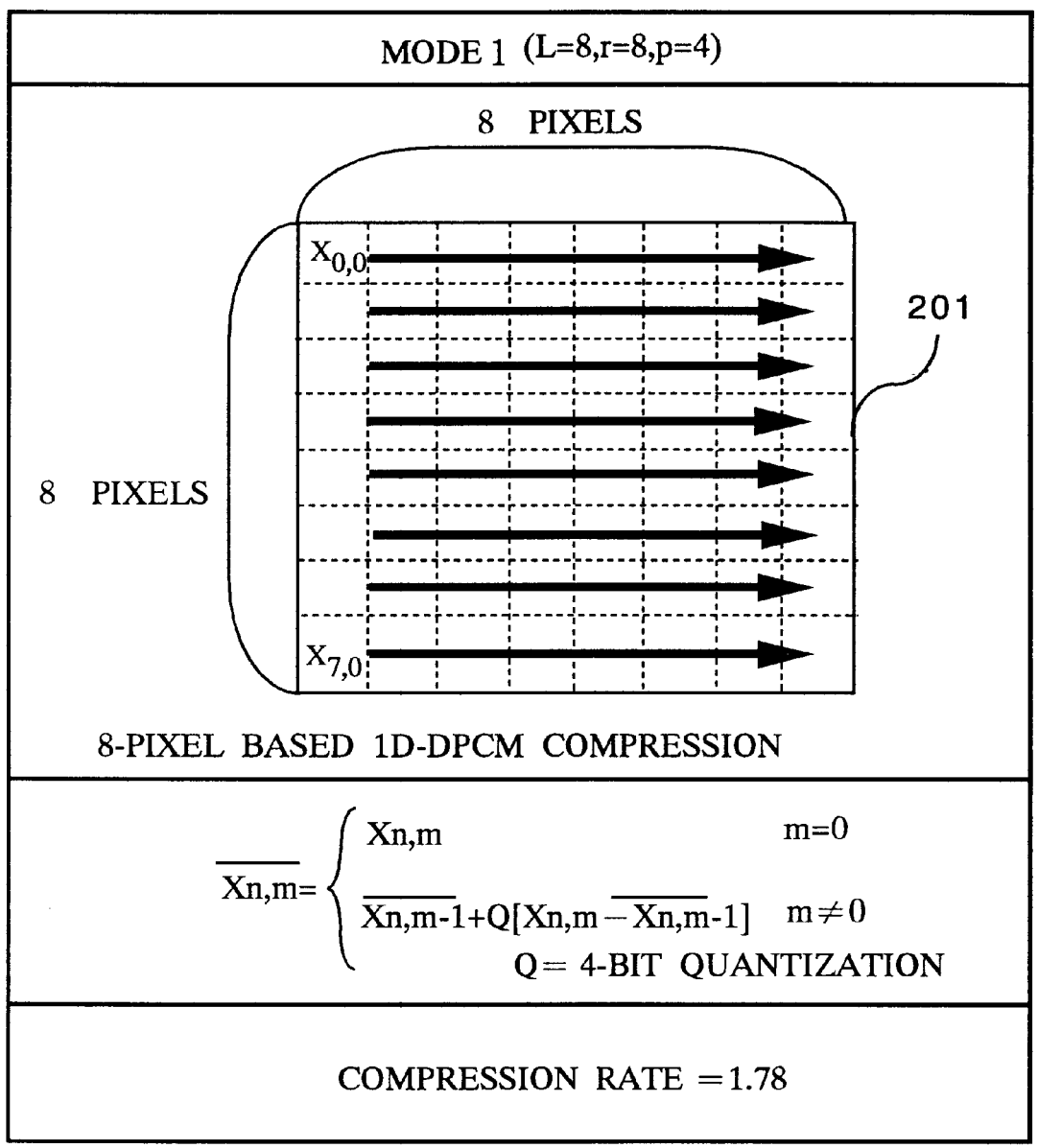
FIG. 20 shows a compression method implemented in a compressing section of the digital image decoding apparatus of FIG. 18.
Figure 21:
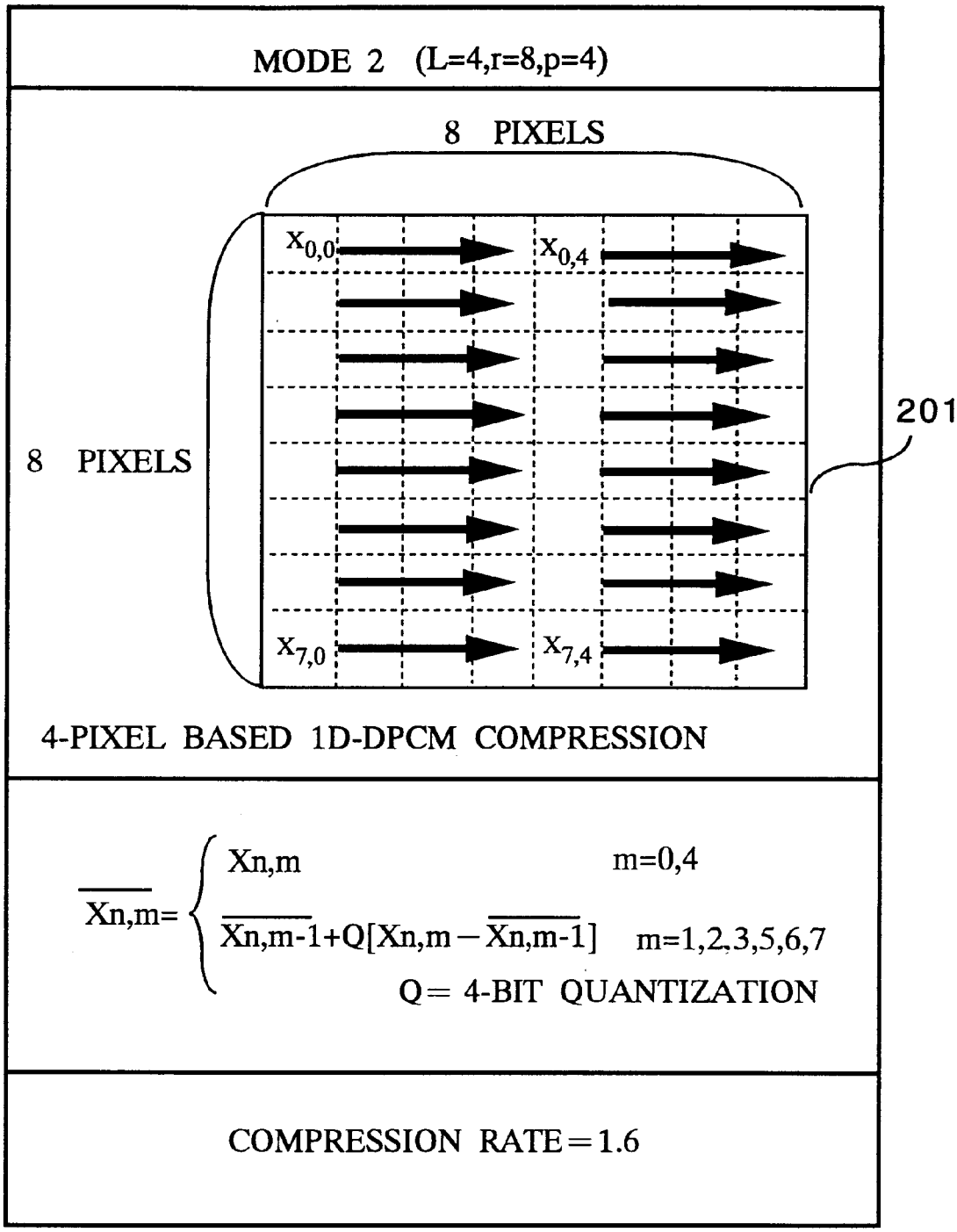
FIG. 21 shows another compression method implemented in the compressing section of the digital image decoding apparatus of FIG. 18.

FIG. 20 shows an eight-pixel based 1D-DPCM compression, Mode 1. According to this mode, seven consecutive eight-bit pixels following a heading eight-bit pixel are quantized sequentially with the fixed quantum of four bits. This reduces data bits from original eight bits to four bits per pixel, except for the heading eight bits, and therefore from original 8×8 bits to 8+4×7 bits in every eight pixels of the unit L. This is repeated seven more times in the 8×8 block 201 (N=8), which reduces data bits from original 8×8×8 bits to quantized (8+4×7)×8 bits per block with the rate of compression 1.78=(8×8×8)/((8+4×7)×8). FIG. 21 shows a four-pixel based 1D-DPCM compression, Mode 2. According to this mode, three consecutive eight-bit pixels following heading eight bits in the unit are quantized in the same manner, which reduces data bits from original 8×8 bits to 8+4×3 bits in every four pixels of the unit. This is repeated 15 more times in the 8×8 block 201 (N=8), which reduces data bits to (8+4×3)×16 bits per block with the rate of compression 1.6=(8×8×8)/((8+4×3)×16). FIG. 22 shows a two-pixel based 1D-DPCM compression, Mode 3. According to this mode, data bits are reduced to 8+4×1 bits in every two pixels of the unit in the same manner with the rate of compression 1.3=(8×8×8)/(8+4×1)×32. FIG. 23 shows a one-pixel based 1D-DPCM compression, Mode 4. This gives no quantization to data and no reduction of data bits with the rate of compression 1=(8×8×8)/(8×8×8).

Referring to FIG. 24, the compressing section 107a includes a subtractor 120, a quantizer 121, a dequantizer 122, selectors 123a and 123b, a one-pixel delay circuit 124, and a select signal generator 125. The compression rate information 157 corresponds to a mode implemented in the compressing section 107a. A general course of 1D-DPCM compression approach implemented in the compressing section 107a can be summarized as follows. With a mode specified by the compression rate information 157, a heading eight-bit pixel of a given number of pixels of the decoded data 151 is sent directly to the one-pixel delay circuit 124. The remaining eight-bit pixels in the unit L are subjected to subtraction in the subtractor 120 by an output from the one-pixel delay circuit 124. A subtracted result or difference is then subjected to four-bit quantization in the quantizer 121. A quantized result is outputted from the compressing section 107a as the compressed data 152, and at the same time sent to a local decoding loop where quantized four-bit data are decoded locally in the dequantizer 122 and sent to the one-pixel delay circuit 124.

Specifically, with Mode 1, the select signal generator 125 generates the select signal 159 for controlling the selector 123a to select eight bits in every eight eight-bit pixels of the decoded data 151. After the heading eight-bit pixel unquantized and outputted, the selector 123a selects seven consecutive four-bit quantized results of the remaining in the eight-pixel unit from the quantizers to be outputted. Similarly, with Mode 2, the selector 123a selects heading eight bits in the unit L of the decoded data 151 to be outputted directly in every four pixels, with Mode 3 in every two pixels, and with Mode 4 every time or every eight-bit pixel to be outputted.

There may be some variations of this embodiment available for 1D-DPCM compression methods. A heading eight-bit pixel in the compressing unit may not necessarily be left unquantized, but be quantized with a quantum of t bits (t≦r) before being outputted. The block 201 of M×N pixels may not necessarily be limited to 8×8 pixels, but be any number of pixels when M=N or M≠N. The horizontal approach with the 1D-DPCM compressing unit L (L≦N) may not necessarily be a must, but a vertical approach may be implemented, instead, in the digital image decoding apparatus of this embodiment.

The mode-based adaptive 1D-DPCM unit control approach implemented in the compressing section 107a can be summarized as follows. With a mode specified by the compression rate information 157, the number of 1D-DPCM unit L of pixels is modified optimally to the size of the image. A heading pixel in the unit L is quantized with a quantum of t bits (t≦r; r bits/pixel). Among the remaining pixels of the unit L, a difference between adjacent two pixels is subjected sequentially to quantization with a quantum of p-bit (p≦r). Thus, data bits of image data in a block of M×N pixels (L≦M or L≦N; L is a divisor common to M and N) are reduced adaptively based upon the compression rate information 157 with a rate modified optimally to the size of image to be compressed.

Figure 36:
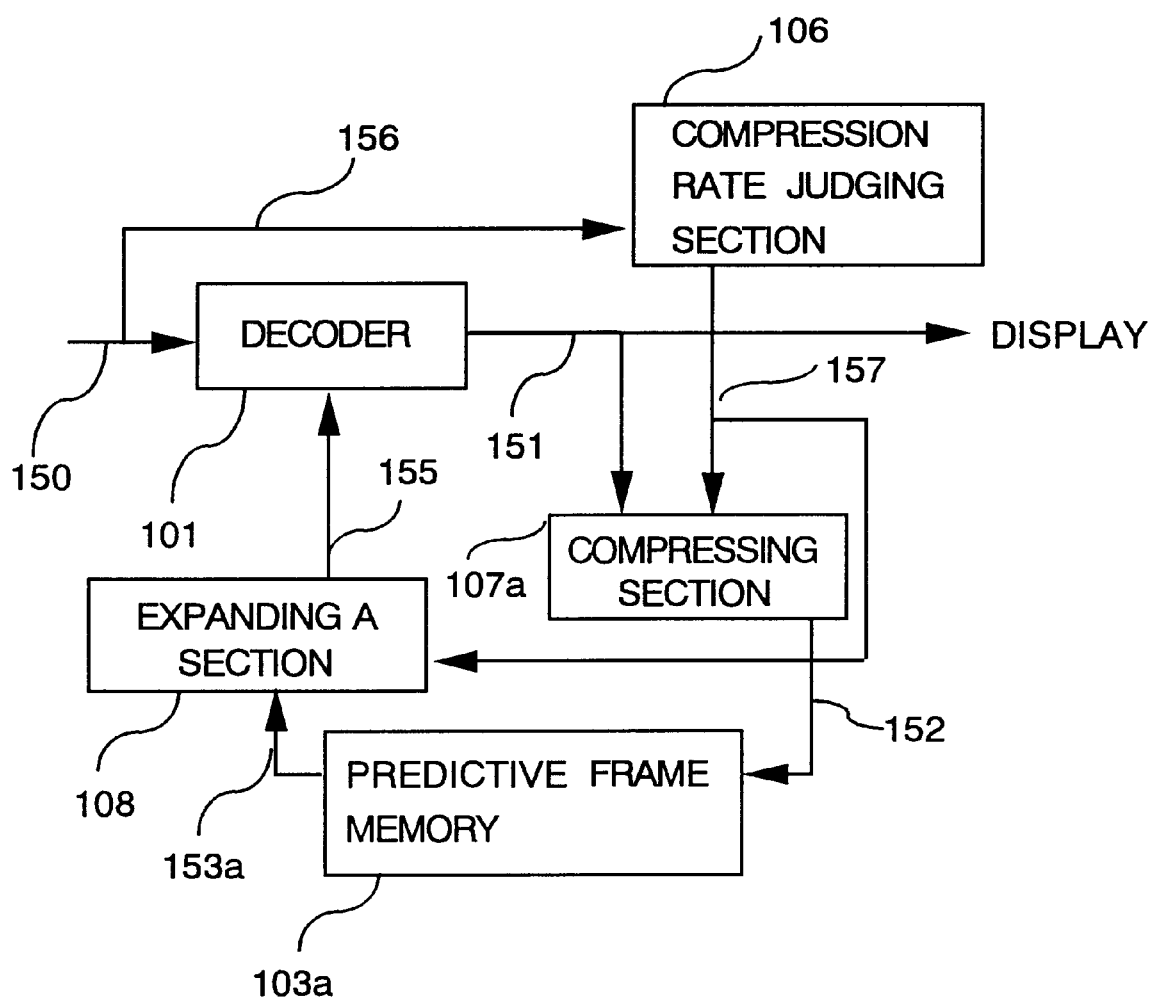
FIG. 36 shows a block diagram of a variation of the digital image decoding apparatus of FIG. 18.
Figure 37:
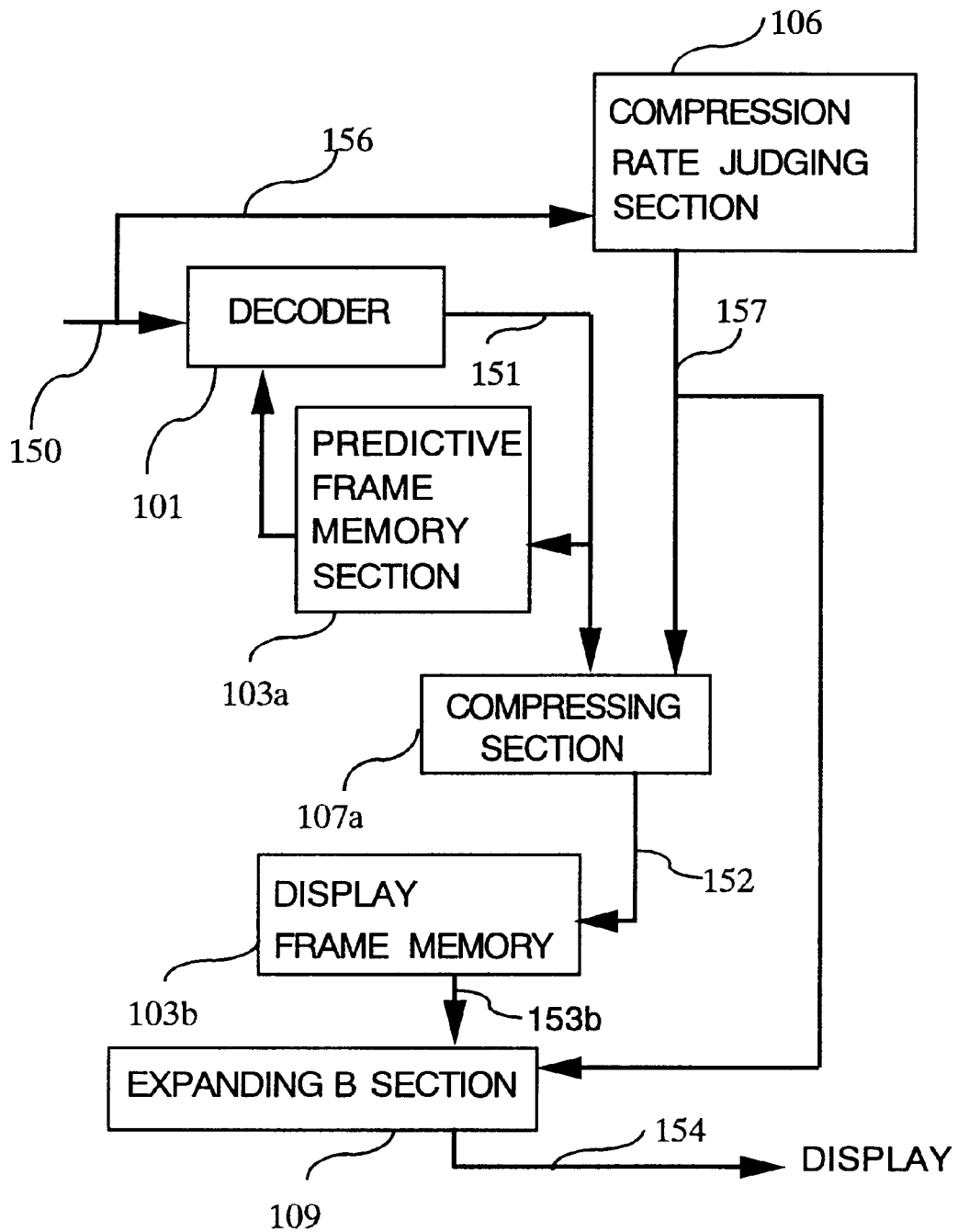
FIG. 37 shows a block diagram of another variation of the digital image decoding apparatus of FIG. 18.

FIGS. 36 and 37 show other variations of the digital image decoding apparatus according to this embodiment. FIG. 36 shows a predictive frame memory 103a as a replacement for the predictive/display frame memory 103 of FIG. 18. This variation has a display frame of the decoded data 151 to be left uncompressed for display and no display frame memory is therefore required. FIG. 37 shows separate frame memories of a display frame memory 103b for display and a predictive frame memory 103a for prediction as replacements for the predictive/display frame memory 103 of FIG. 18. This variation has the decoded data 151 to be left uncompressed for prediction. These two variations teach that decoded image data may not necessarily be compressed and subsequently expanded for both prediction and display.

Figure 28:
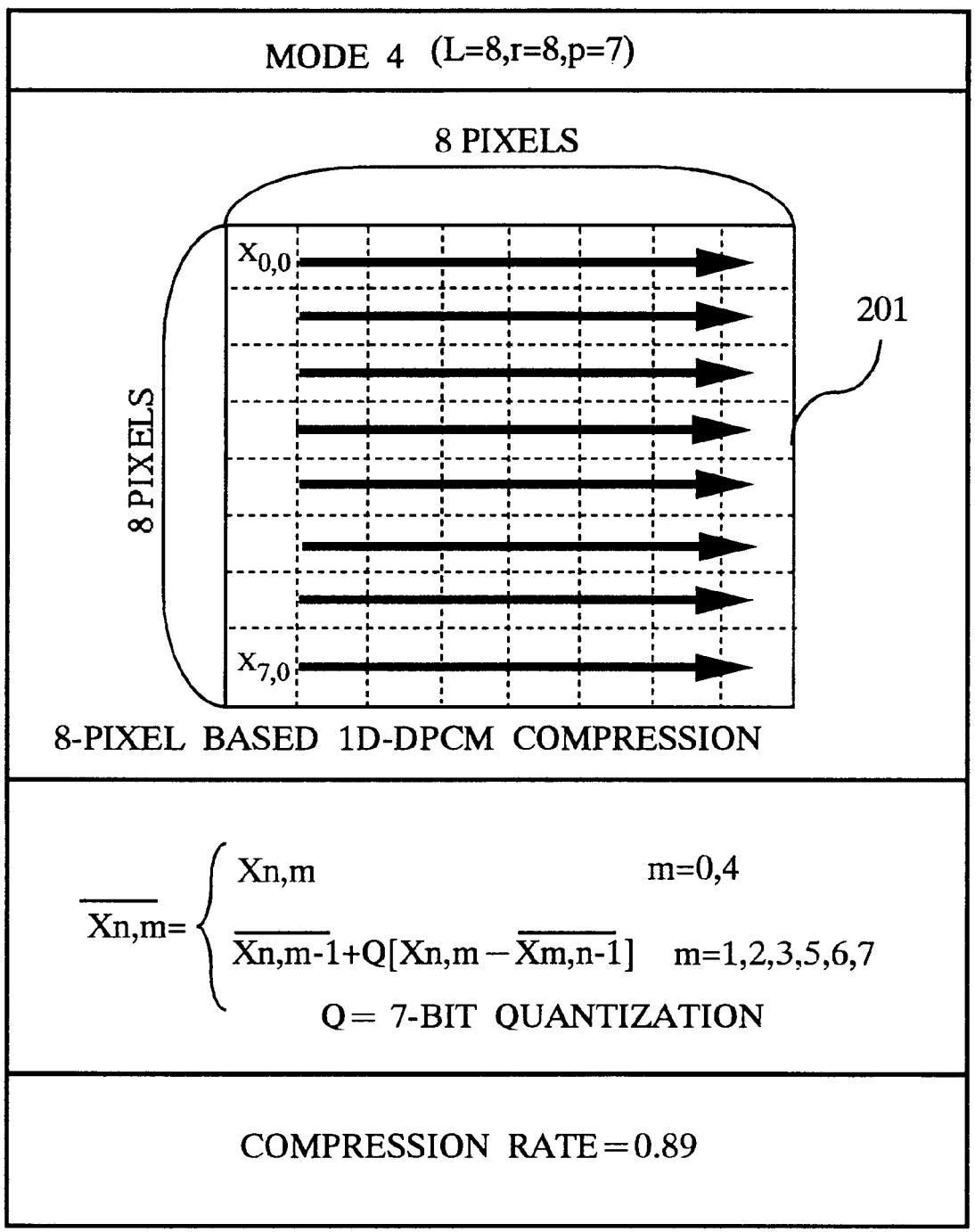
FIG. 28 shows yet another compression method implemented in the compressing section of the digital image decoding apparatus according to the present invention.
Figure 29:
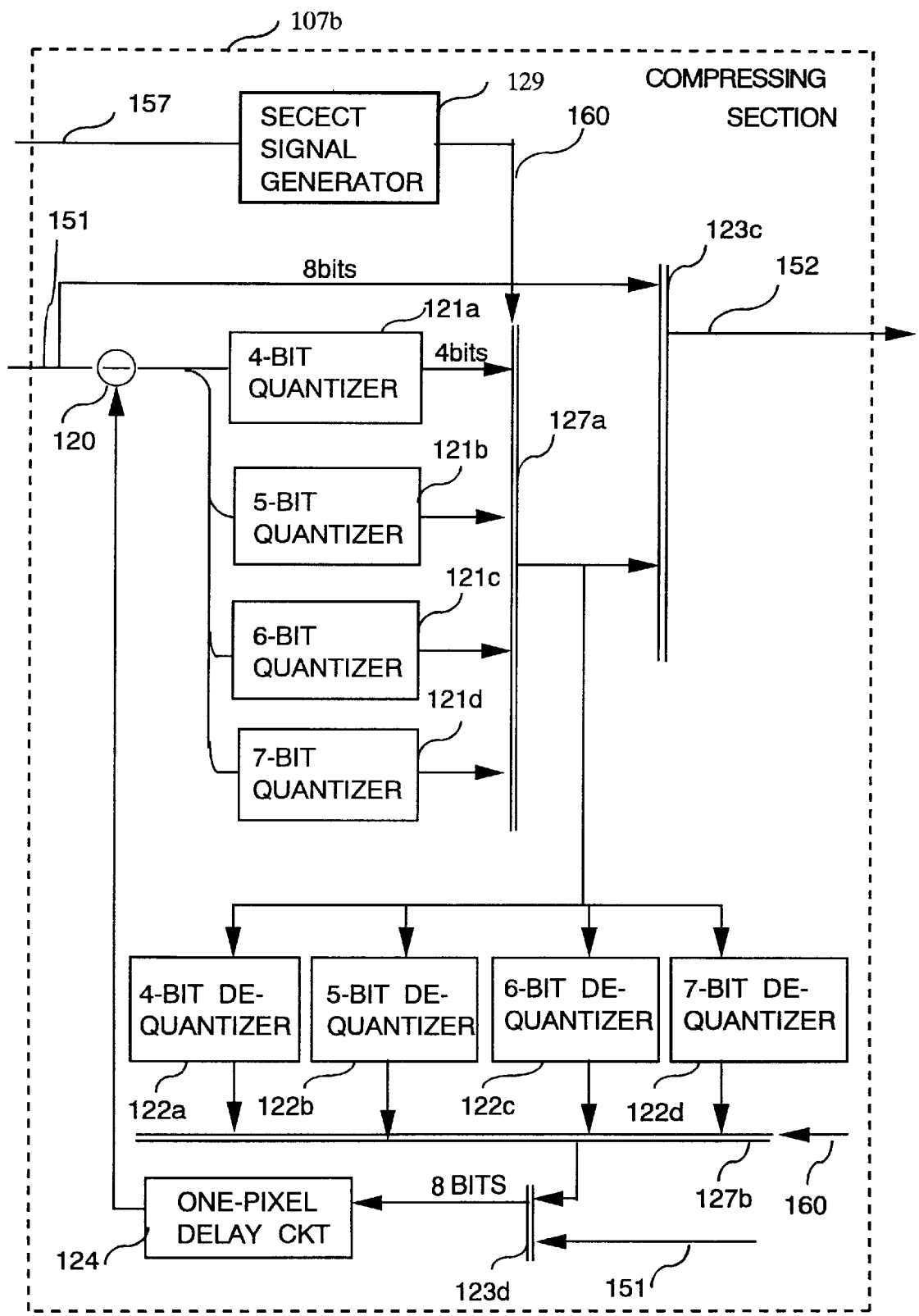
FIG. 29 shows a block diagram of the compressing section of the digital image decoding apparatus according to the present invention.

FIG. 29 shows a block diagram of an alternate compressing section 107b of the digital image decoding apparatus of the present invention. The compressing section 107b is a replacement of the compressing section 107a of FIG. 24 and may be implemented in the digital image decoding apparatus of FIG. 18. With the compressing section 107b, adaptive image compression is attained through a mode-based quantization control of image data based upon 1D-DPCM compression method. FIGS. 25 through 28 show different types of 1D-DPCM compression implemented in the compressing section 107b. With this mode-based quantization control approach, four different types of quantization are provided for compressing different images in size with a mode specified by the compression rate information 157, namely, four-bit quantization (p=4) with Mode 1, five-bit quantization (p=5) with Mode 2, six-bit quantization (p=6) with Mode 3, and seven-bit quantization (p=7) with Mode 1. In other words, image data in the block 201 of M×N pixels (M=8 pixels, N=8 pixels; r=8 bits/pixel) are subjected to a mode based quantization unit by unit with a fixed DPCM compression unit L of eight pixels (L=8). Basically, a difference between adjacent two pixels in the fixed DPCM compression unit L is quantized sequentially with an adaptive quantum modified optimally to the size of image.

Figure 25:
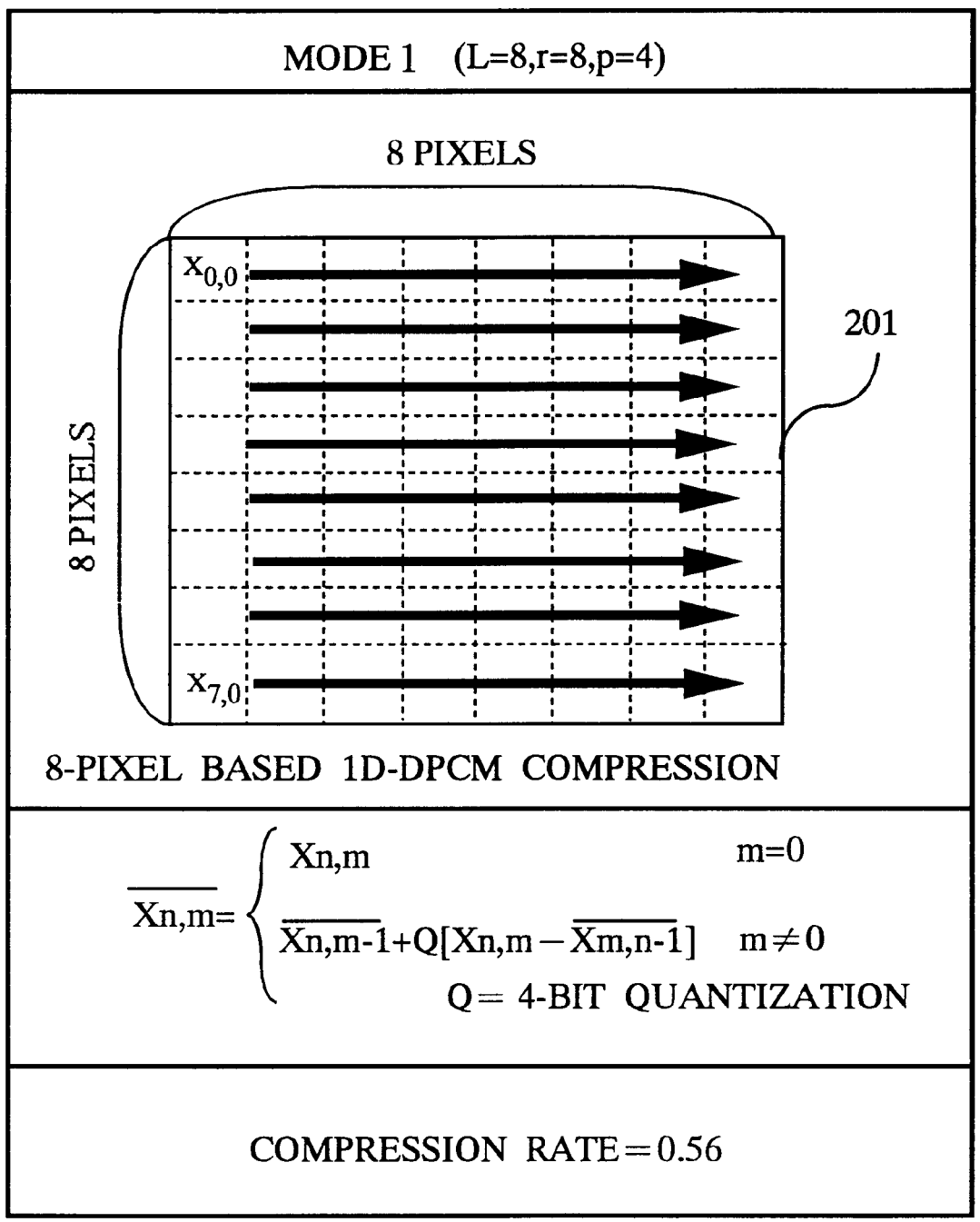
FIG. 25 shows a compression method implemented in an alternate compressing section of a digital image decoding apparatus according to the present invention.

FIG. 25 shows a four-bit quantization mode, Mode 1. with eight pixels (L=8) subjected to quantization with a quantum of four bits (p=4). This reduces data bits to (8+4×7)×8 bits from the original 8×8×8 bits, and in other words, the image is compressed with a rate of 1.78=(8×8×8)/(8+4×7)×8, according to the definition of the rate of compression: (pre-compressed data)/(post-compressed data).

Figure 26:
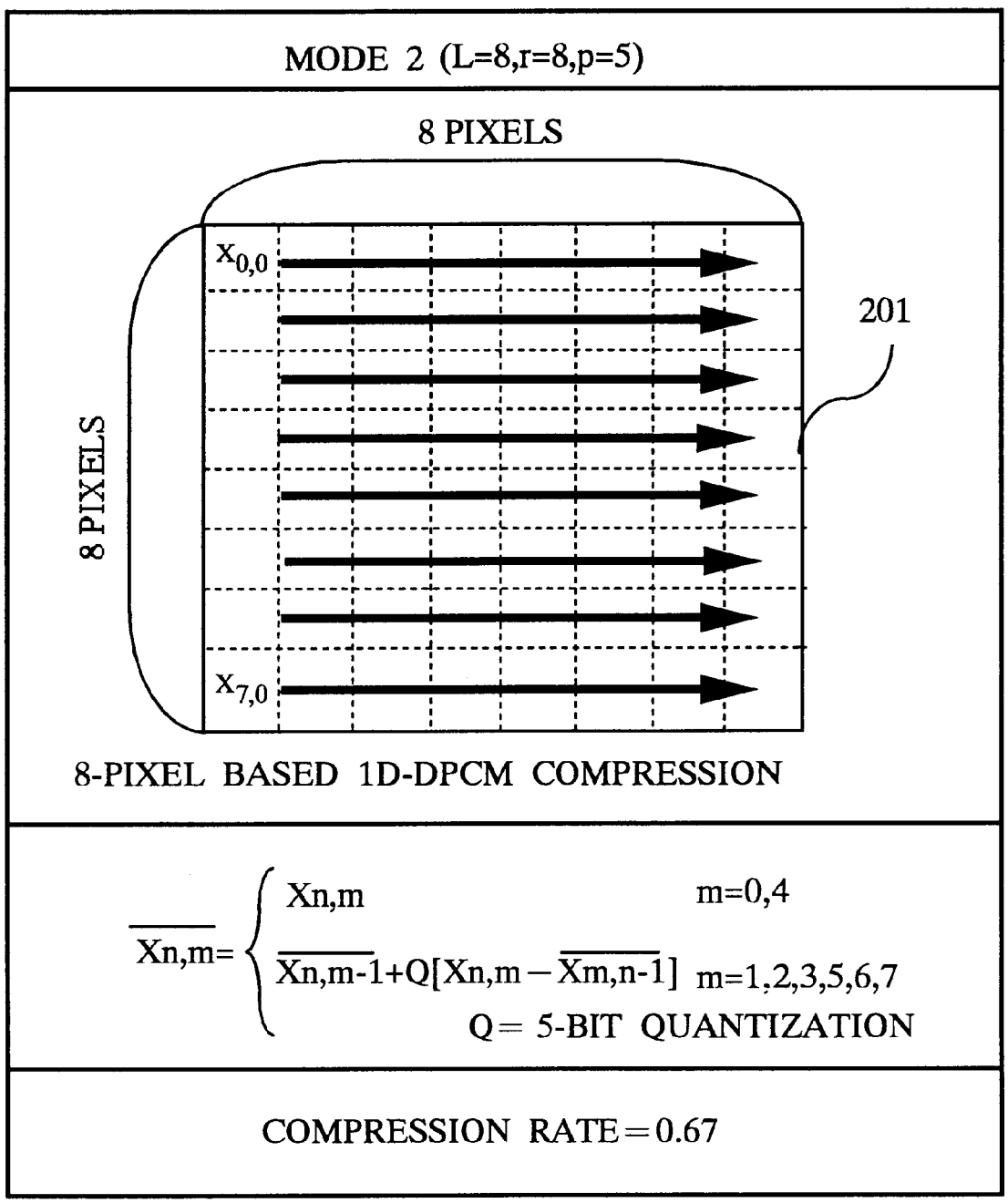
FIG. 26 shows another compression method implemented in the alternate compressing section of the digital image decoding apparatus according to the present invention.

FIG. 26 shows a five-bit quantization mode, Mode 2, with eight pixels subjected to quantization with a quantum of five bits (p=5). Similarly, this compresses the image with a rate of approximately 1.49=(8×8×8)/(8+5×7)×8.

Figure 27:
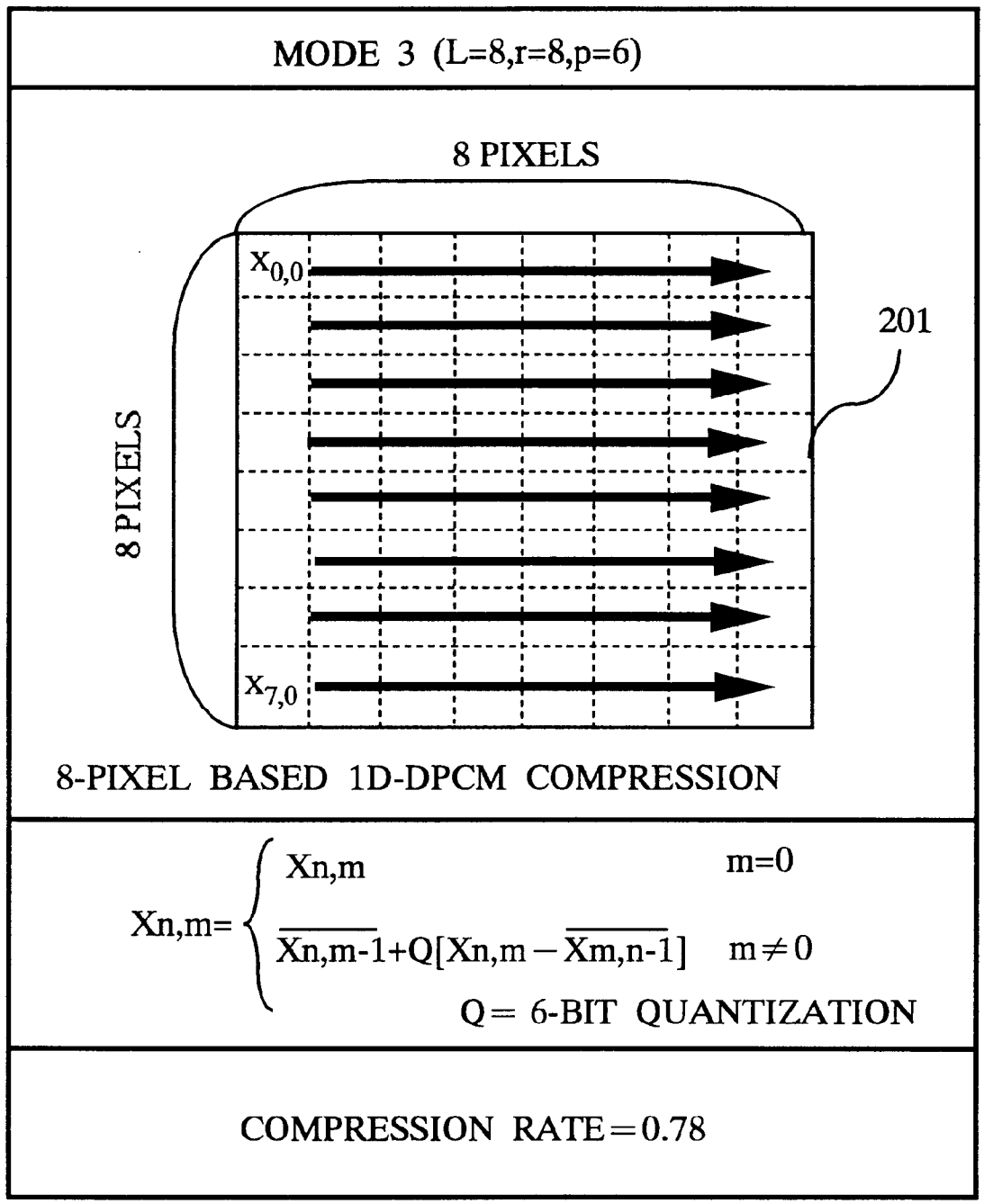
FIG. 27 shows yet another compression method implemented in the alternate compressing section of the digital image decoding apparatus according to the present invention.

FIG. 27 shows a six-bit quantization mode, Mode 3, which compresses the image with a rate of 1.28=(8×8×8)/(8+6×7)×81. FIG. 28 shows a seven-bit quantization mode, Mode 4, which compresses the image with a rate of approximately 1.12=(8×8×8)/(8+7×7)×8.

The compressing section 107b includes a plurality of quantizers 121a through 121d, and corresponding dequantizers 122a through 122d which replace the quantizer 121 and dequantizer 122 of the compressing section 107a. Subsequently, selectors 127a and 127b are provided for selecting one of quantized and dequantised results, respectively, upon reception of a select signal 160 generated by a select signal generator 129 based upon the compression rate information 157. Selectors 123c and 123d replace the selectors 123a and 123b of FIG. 24, respectively.

Referring to FIG. 29, a heading eight-bit pixel in the eight pixels of the decoded data 151 is directly outputted as the compressed data 152, and at the same time, sent to the one-pixel delay circuit 124. A next and following consecutive seven eight-bit pixels in the unit of the decoded data 151 are subjected to subtraction in the subtractor 120 by an output from the one-pixel delay circuit 124. A subtracted result or difference from the subtractor 120 can be quantized through four different types of quantization in the quantizers. Quantized results from the four quantizers are subjected to a mode-based selection upon reception of the select signal 160 at the selector 127a. A selected quantized result is outputted as the compressed data 152 through the selector 123c and also inputted to the four quantizers for different types of dequantization. Dequantized results from the four dequantizers are subjected to a mode-based selection using the select signal 160 at the selector 127b. A selected dequantized or locally decoded result is sent to the one-pixel delay circuit 124 through the selector 123d.

Specifically, the selectors 127a and 127b select outputs from the four-bit quantizer 121a and dequantizer 122a, respectively, with Mode 1 upon reception of the select signal 160 based upon the compression rate information 157. Similarly, outputs from the five-bit quantizer 121b and dequantizer 122b are selected with Mode 2, outputs from the six-bit quantizer 121c and dequantizer 122c are selected with Mode 3, and outputs from the seven-bit quantizer 121d and dequantizer 122d are selected with Mode 4 by the selectors.

The general approach of 1D-DPCM compression implemented in the compressing section can be summarized as follows. DPCM compression unit L is fixed for compressing image data in a block of M×N pixels (L≦N or L≦N; L is a common divisor of M or N). A heading pixel of L number of pixels is quantized with an adaptive quantum of t bits (t≦r). With the remaining pixels in the unit L, a difference between adjacent two pixels is quantized sequentially with an adaptive quantum of p bits. The value of the adaptive quantum of t or p bits may be modified based upon the rate of compression, which reduces data bits in a block of M×N pixels optimally to the size of image.

With further reference to the compressing section 107b, the selector 127a may also be placed before the quantizers, which selects a quantizer from among the plurality of quantizers to have an exclusive result of quantization with a mode specified by the select signal 160. If the quantizers are directly connected to the corresponding dequantizers and the dequantizers are configured to start operation only upon reception of a quantized result, then the selector 127b may not be needed.

Figure 30:
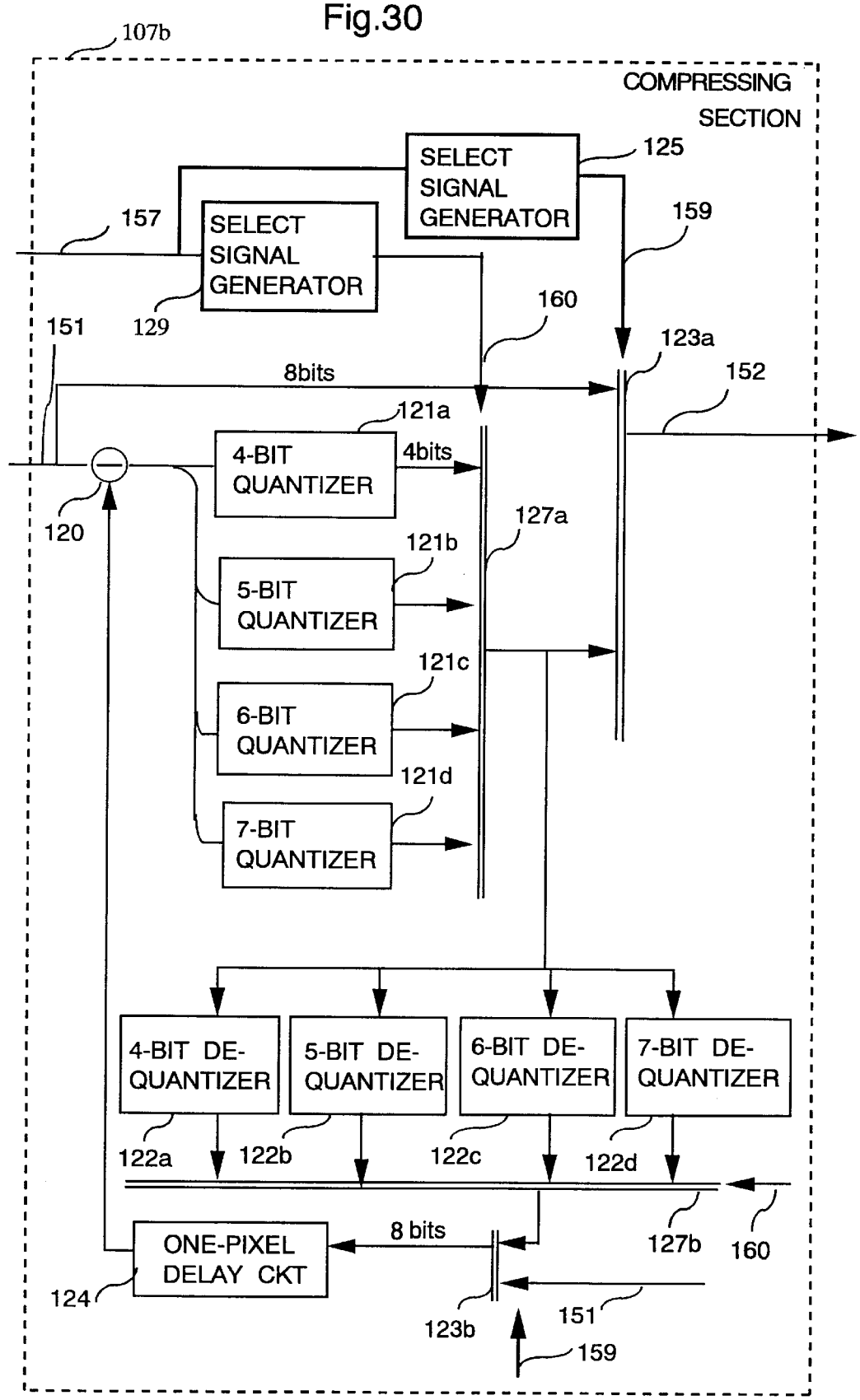
FIG. 30 shows a block diagram of another alternate compressing section of a digital image decoding apparatus according to the present invention.

FIG. 30 shows a block diagram of another alternate compressing section 107c of a digital image decoding apparatus. The compressing section 107c is a combination of the compressing section 107a of FIG. 24 and the compressing section 107b of FIG. 29. The compressing section 107c may be implemented in the digital image decoding apparatus of FIG. 18 and the like. Functional elements of the compressing section 107c of FIG. 30 correspond to those having the same reference numerals of the compressing sections 107a of FIG. 24 and 107b of FIG. 29. With this combination, image data is compressed through mode-based double control of DPCM compression unit and quantization based upon the compression rate information 157.

Referring to the compressing section 107c of FIG. 30, a heading eight-bit pixel in a mode-based adaptive 1D-DPCM unit L of pixels of the decoded data 151 is subjected to a mode-based selection at the selector 123a upon reception of the select signal 159 and outputted as the compressed data 152. The heading eight-bit pixel is also sent directly to the one-pixel delay circuit 124 through the selector 123b. A next and following eight-bit pixels in the unit L are subjected to subtraction at the subtractor 120 by an output from the one-pixel delay circuit 124. A subtracted result or difference is then subjected to different types of quantization in the quantizers 121a through 121d. Quantized results are subjected to a mode-based selection at the selector 127a with the select signal 160. A selected quantized result is outputted as the compressed data 152 through the selector 123a with the select signal 159 or subjected to different types of dequantization in the dequantizers 122a through 122d for local decoding. Dequantized results are subjected to a mode-based selection with the select signal 160 at the selector 127b. A selected quantized or locally decoded result is subjected to a mode-based selection with the select signal 159 at the selector 123b and inputted to the one-pixel delay circuit 124.

Specifically with the mode-based quantization control, the selector 127a/127b selects a quantized/dequantized result outputted from the four-bit quantizer 121a/dequantizer 122a with Mode 1. With Mode 2, an output from the five-bit quantizer 121b/dequantizer 122b is selected, with Mode 3, an output from the six-bit quantizer 121c/dequantizer 122c is selected, and with Mode 4, an output from the seven-bit quantizer 121d/dequantizer 122d is selected by the selector 127a/127b upon reception of the select signal 160.

With the mode-based control, the selector 123a/123b selects either one of a heading eight-bit pixel left unquantized of the decoded data 151 and a quantized/dequantized result from the selector 127a/127b upon reception of the select signal 159 from the select signal generator 125. The select signal generator 125 selects the number of 1D-DPCM unit L of pixels, namely eight with Mode 1, four with Mode 2, two with Mode 3 or one with Mode 4, with a mode based upon the compression rate information 157. This will result in a smooth quantization result from the compressing section 107c.

The general approach of the compressing section 107c characterized by the mode-based adaptive 1D-DPCM unit and quantization control can be summarized as follows. Decoded data in a block of M×N pixels are compressed unit-by-unit with an adaptive number of 1D-DPCM unit L of pixels (L≦M or L≦N; L is a common divisor of M or N) with an optimal mode corresponding to the size of image based upon the compression rate information 157. A heading pixel in a given number of pixels is quantized with an adaptive quantum of t bits (t≦r). With the remaining pixels in the compressing unit, a difference between adjacent two pixels is quantized sequentially with an adaptive quantum of p bits. The value t or p of the adaptive quantum may be modified based upon the rate of compression. This contributes greatly to reduction of compression-related deterioration of image to a minimum.

With further reference to the mode-based quantization control with the select signal in the compressing section, the selector 127a may be placed before the quantizers, which selects a quantizer to operate and output a quantized result optimal to the size of image. If the respective quantizers are directly connected with the corresponding dequantizers, and the dequantizers are conditioned to start its operation only upon reception of a quantized result, then the selector 127b may not be needed.

Figure 31:
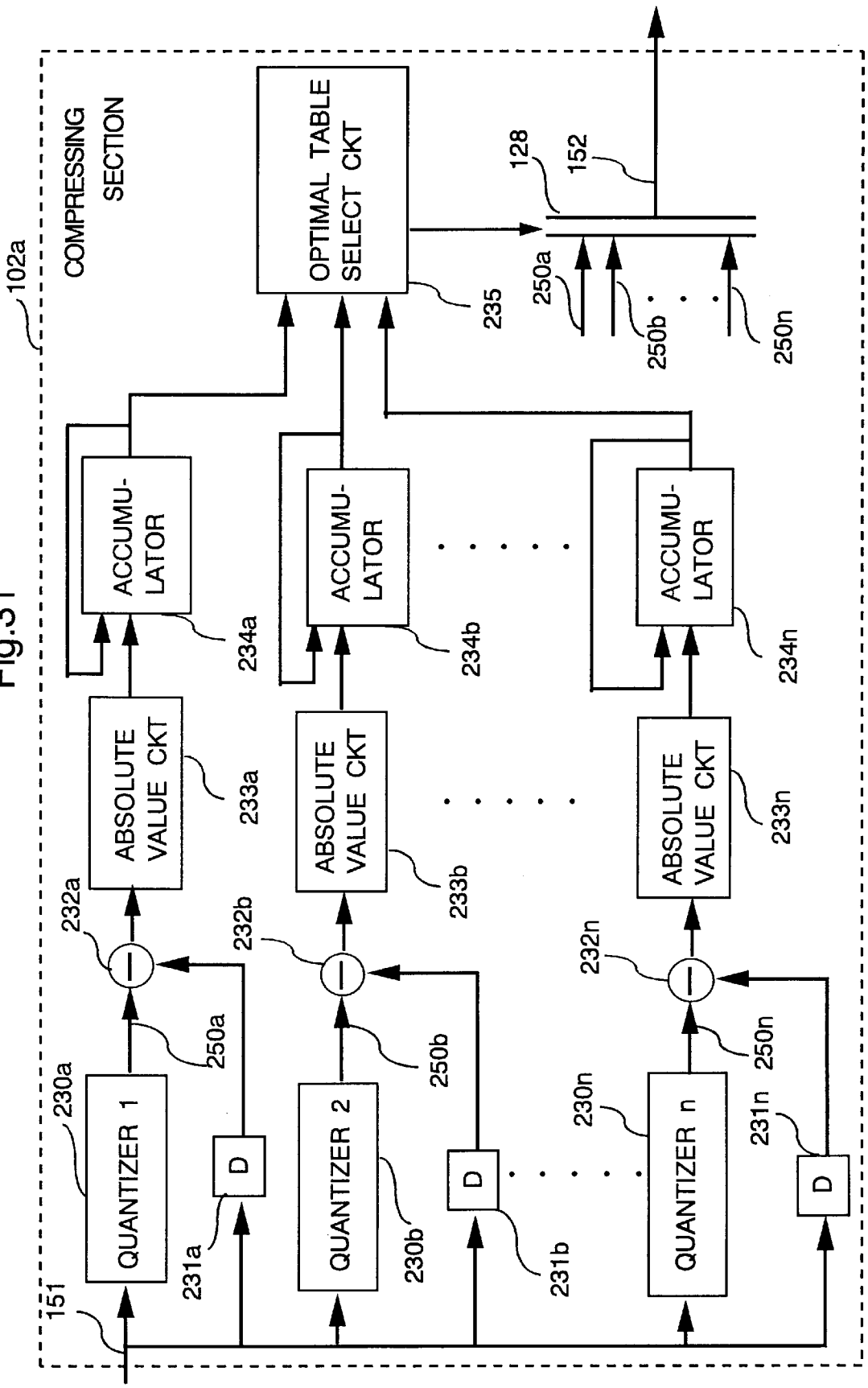
FIG. 31 shows a block diagram of another alternate compressing section of a digital image decoding apparatus according to the present invention.

FIG. 31 shows a block diagram of another alternate compressing section 102a according to the present invention. The compressing section 102a may be implemented in the digital image decoding apparatus of FIG. 1 as a replacement for the compressing section 102. The compressing section 102a illustrates quantizers having quantization tables and an optimal table select circuit for selecting an optimal quantization table from among the quantization tables of the quantizers. With the compression section 102a, the compression rate judging section 106 is not required.

The compressing section 102a includes n number of quantizers 230a through 230n having n number of different quantization tables, respectively, delay circuits 231a through 231n, subtractors 232a through 232n, absolute-value circuits 233a through 233n, accumulators 234a through 234n, an optimal table select circuit 235, and a selector 128. The optimal table select circuit 235 compares quantized results from the quantizers 230a through 230n, to select an optimal quantization table from among the plurality of quantization tables in the quantizers. The selector 128 selects an output from a quantizer whose quantization table has been selected by the optimal table select circuit 235.

An operation of the compressing section 102a is now described.

The decoded data 151 outputted from the decoder 101 is quantized in the quantizers 230a through 230n. If e-bit allocation distinguishes n number of quantization tables, there are no more than $2^e$ number (n≦$2^e$) of quantization tables provided.

Pre-quantized data of the decoded data 151 are inputted to the quantizers 230a through 230n to be quantized. Quantized results of quantized data 250a through 250n from the quantizers are subtracted by the pre-quantized data of the decoded data 151 in the subtractors 232a through 232n, respectively. Subtracted results are processed through the absolute-value circuits 233a through 233n and accumulators 234a through 234n to become summated absolute values of difference on a 1D-DPCM compression unit L basis.

The optimal table select circuit 235 selects a quantized data having the least value of a summed absolute difference on a block basis. This allows the selection of optimal quantization table on a DPCM unit L basis for the least damage of compression-related deterioration of image among the plurality of quantization tables.

Embodiment 3.

Figure 32:
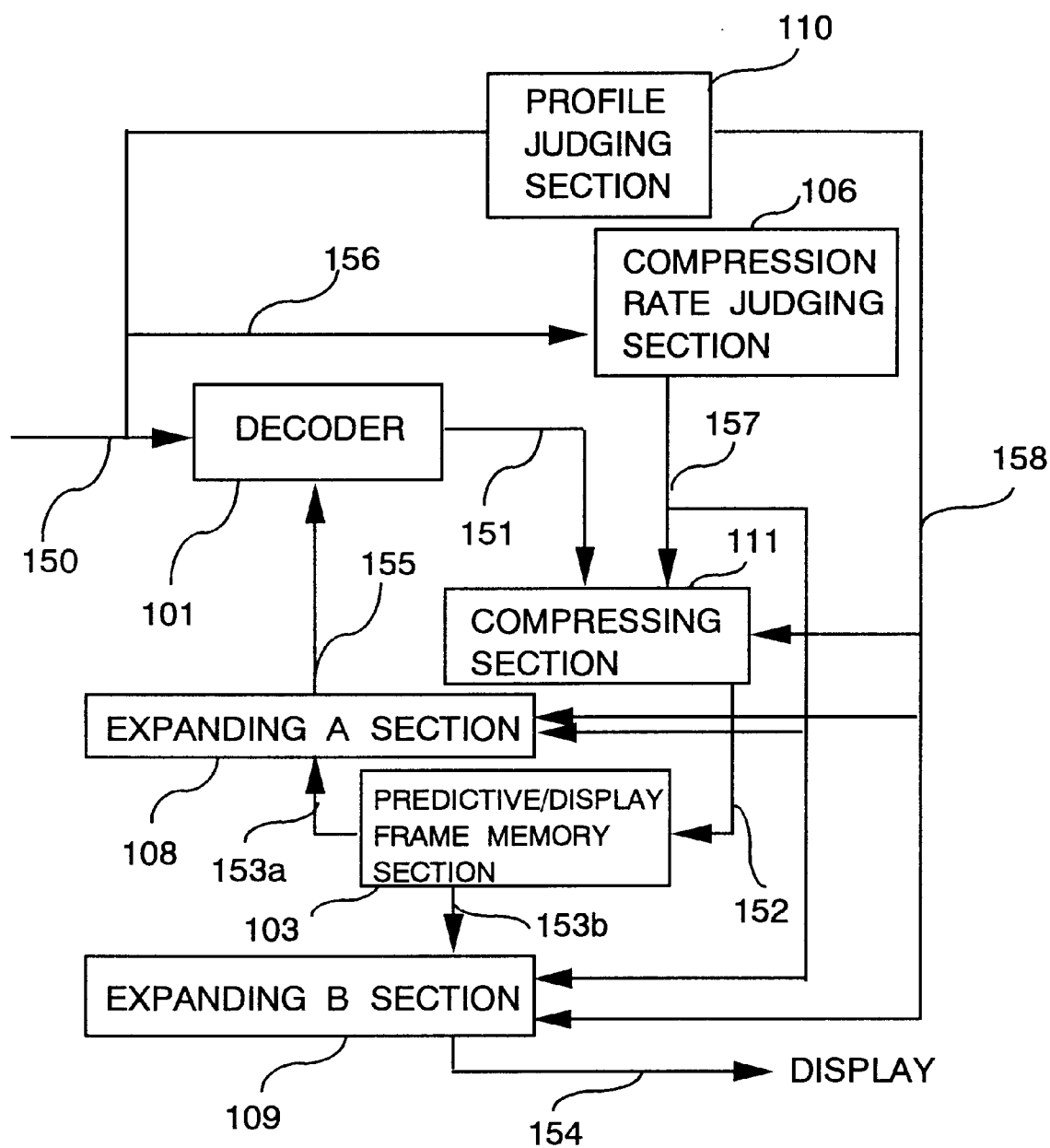
FIG. 32 shows a block diagram of a digital image decoding apparatus according to a third embodiment of the present invention.

FIG. 32 shows a block diagram of a digital image decoding apparatus according to a third embodiment of the present invention. A profile judging section 110 receives the encoded data, judges a coding method and issues profile information 158 for identifying the coding method. A compressing section 111 modifies its compressing approach depending upon a coded method judged by the profile judging section 110. The profile judging section 110 judges whether a coded method used in the encoded data is a bidirectional prediction inter-frame coding method or a forward prediction inter-frame coding method. The bidirectional prediction inter-frame coding method uses both past frames and future frames for prediction, whereas the forward prediction inter-frame coding method uses past frames only. The compressing section 111 imposes higher rate of compression on the decoded data 151 with a bidirectional prediction inter-frame coding method than the decoded data 151 with a forward prediction inter-frame coding method. Other functional elements of FIG. 32 correspond to those of FIG. 18 having the same reference numerals.

Figure 33:
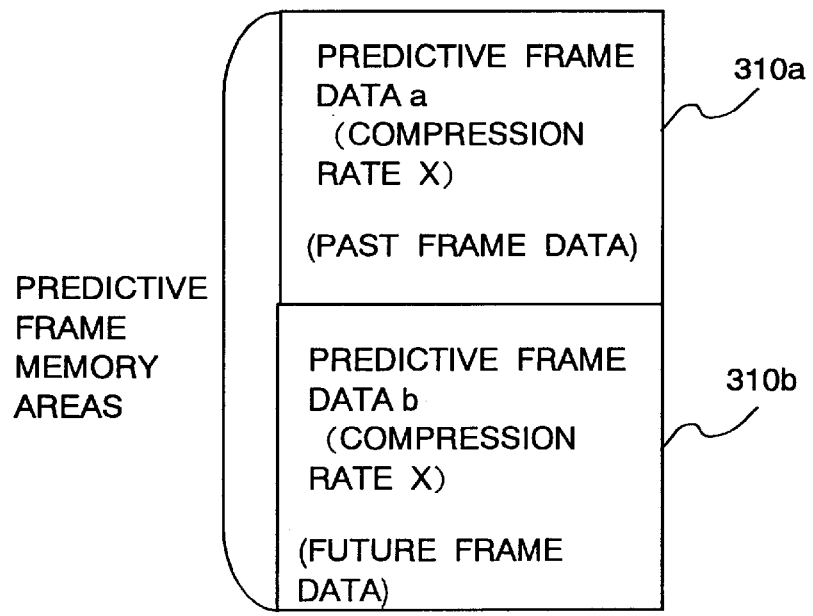
FIG. 33 shows a memory map of a bidirectional predictive frame memory in the digital image decoding apparatus of FIG. 32.
Figure 34:
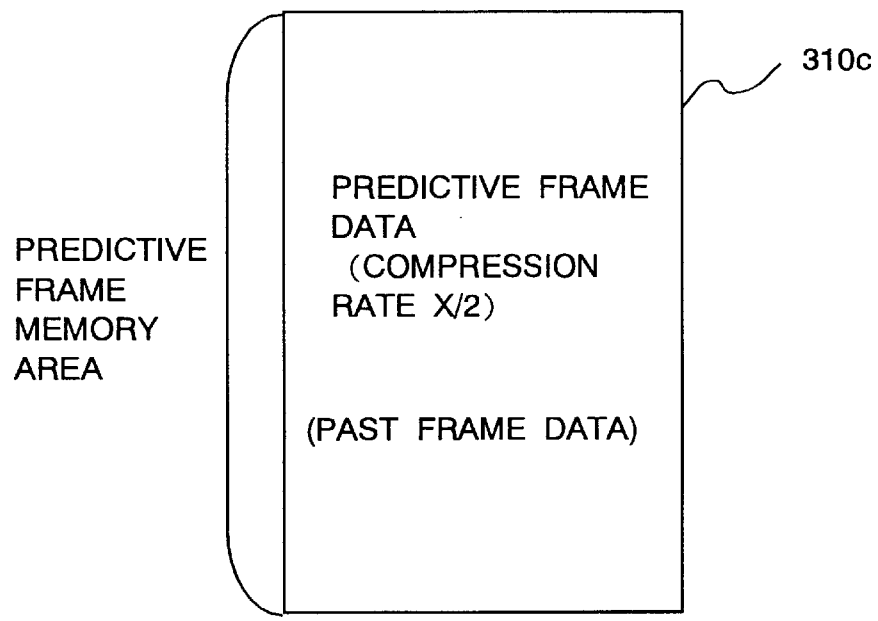
FIG. 34 shows a memory map of a forward predictive frame memory in the digital image decoding apparatus of FIG. 32.

FIGS. 33 and 34 show memory maps of a predictive frame memory used for bidirectional and forward prediction, respectively, of the digital image decoding apparatus of this embodiment.

Figure 35:
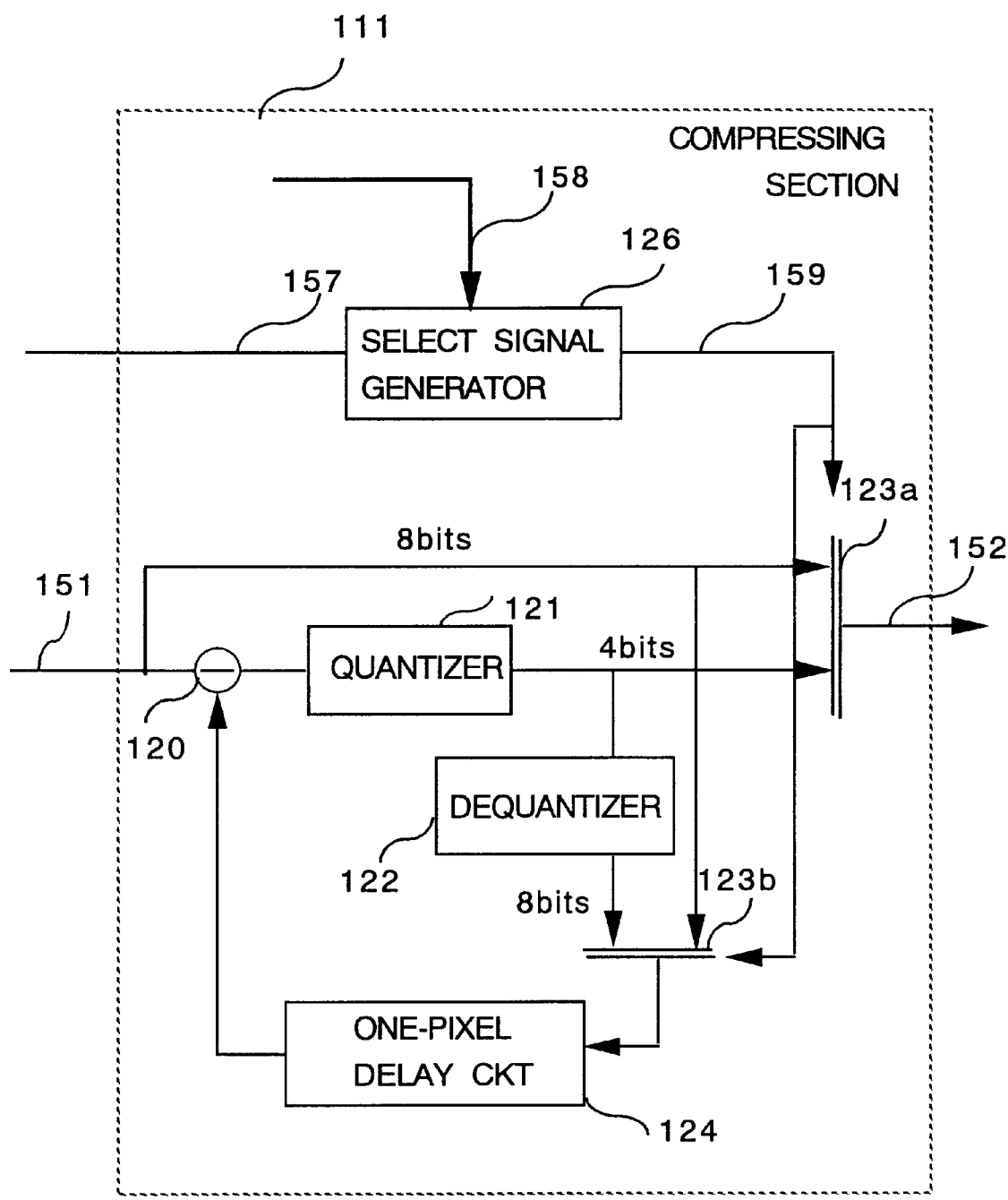
FIG. 35 shows a block diagram of a compressing section of the digital image decoding apparatus of FIG. 32.

FIG. 35 shows a block diagram of the compressing section 111 of the digital image decoding apparatus of this embodiment in detail. A select signal generator 126 is a different type from that of FIG. 24.

An operation of the compressing section 111 is now described.

The decoding section 101 decodes the encoded data 150 with reference to the expanded predictive data 155. The compression rate judging section 106 judges an optimal rate of compression in connection with the size of the predictive/display frame memory 103 based upon the image size information 156 included in the encoded data 150. The optimal rate of compression is selected from among n number of values $l_1$ through $l_n$ (n: natural number, $l_m$≧1, 1≦m≦n). For example, the least value from among a plurality of values $l_m$ in T×U×r/$l_m$≦Z is selected for an optimal rate of compression with an image frame having the size of T×U pixels and r bits per pixel, and with the predictive/display frame memory 103 having the storage capacity of Z bits per frame memory.

The profile judging section 110 judges whether the encoded data 150 was encoded through forward prediction inter-frame coding using only past frames or through bidirectional prediction inter-frame coding using both past frames and future frames. The profile judging section 110 sends the profile information 158 to the compressing section 111.

The compressing section 111 compresses the decoded data 151 from the decoding section 101 to reduce data bits based upon the profile information 158 from the profile judging section 110 and the compression rate information 157 from the compression rate judging section 106. With the same method of compression as that of the second embodiment, for example, the select signal generator 126 sets up 1D-DPCM compression unit based upon the compression rate information 157 and the profile information 158.

With reference to the schematic diagrams of forward/bidirectional prediction of FIGS. 14 and 15, respectively, the bidirectional prediction uses past frames and future frames which requires two memory areas for two types of frames to be stored, whereas the forward prediction uses past frames only, which requires one memory area for one type of frames to be stored.

In other words, with forward prediction indicated by the profile information 158, twice as large a predictive frame memory area 310c of FIG. 33 is available as a predictive frame memory area 310a or 310b of FIG. 34 with bidirectional prediction. Therefore, with forward prediction, image are allowed to be compressed by half the rate (X/2) of compression of a rate (X) of the same image in size with bidirectional prediction.

With bidirectional predictive image data having the rate of compression two or less to be stored in the predictive/display frame memory, the size-equivalent forward predictive image data may be allowed no compression in connection with the storage capacity of the predictive/display frame memory. The compressed data 152 compressed in the compressing section 111 are written in the predictive/display frame memory 103 for being used as predictive data for a frame to be decoded.

Thus, it is one of the characteristics of the compressing section of this embodiment that encoded data purely through forward prediction are compressed with a lower rate of compression (or no compression) than that of the same image in size through bidirectional prediction.

The compressed data 152 written in the frame memory are expanded in the expanding B section 109 and read out in accordance with the raster display order. Expansion of the expanding B section 109 is based upon the compression rate information 157 from the compression rate judging section 106.

When the expanded predictive data 155 is required in the decoding section 101, the expanding A section 108 accesses the predictive/display frame memory 103 for data required and expands the compressed predictive data 153a to provide the expanded predictive data 155 to the decoder 101. Similarly to the expansion of the expanding B section 109, expansion in the expanding A section 108 is based upon the compression rate information 157 from the compression rate judging section 106.

Thus, the predictive/display frame memory 103 is allowed through image compression to become smaller in capacity than the original amount of image data to be stored. With an adaptive rate of compression modified optimally to the size of encoded image, reduction of compression-related deterioration of image data is reduced to a minimum.

With further reference to the digital image decoding apparatus of FIG. 32, the compression rate judging section 106 may not necessarily be required in the system. The decoded data 151 may be compressed based only upon the profile information 158 in the compressing section 111 upon reception of no data of the compression rate judging section 106, which also contributes to the reduction of compression-related deterioration of image.

Embodiment 4.

Figure 38:
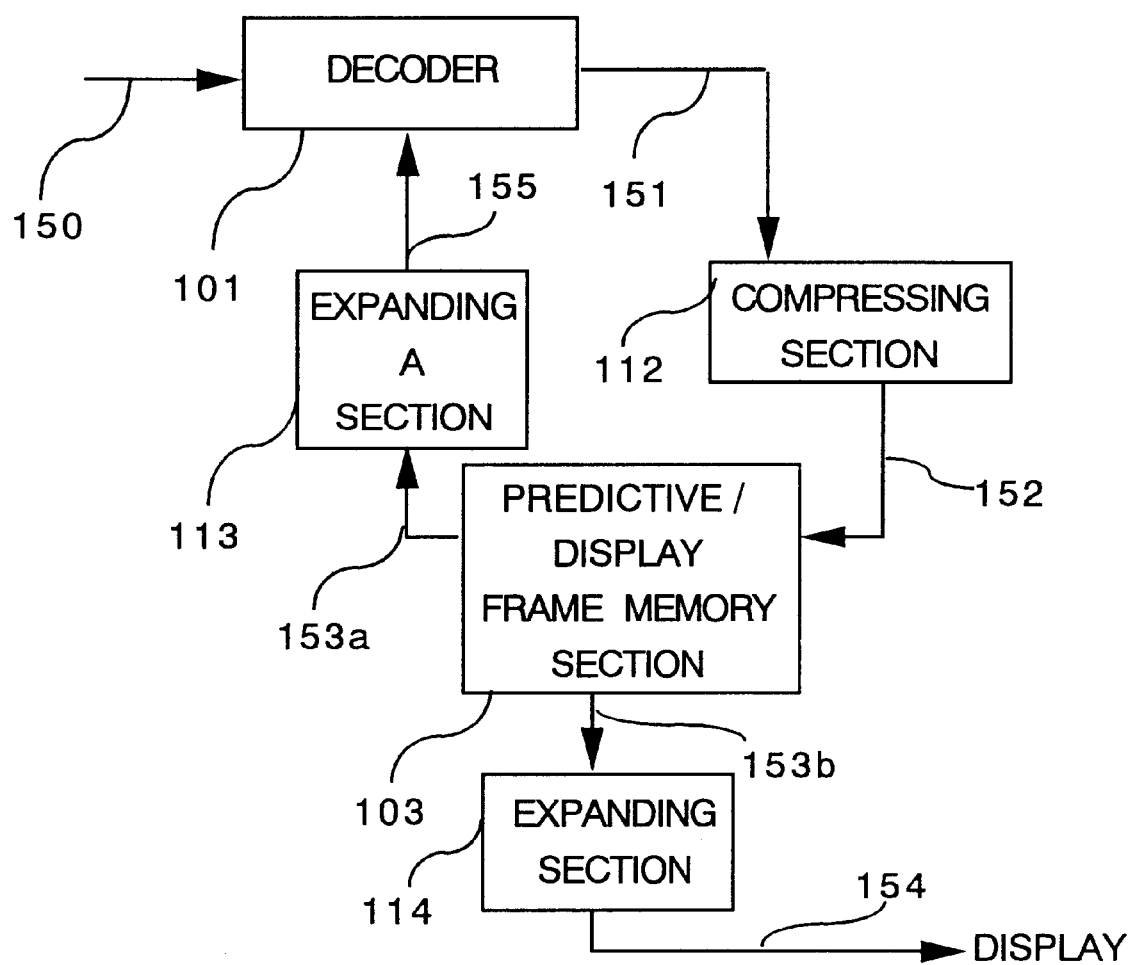
FIG. 38 shows a block diagram of a digital image decoding apparatus according to a fourth embodiment of the present invention.

FIG. 38 shows a block diagram of a digital image decoding apparatus according to a fourth embodiment of the present invention.

The digital image decoding apparatus of FIG. 38 includes a compressing section 112, an expanding A section 113, and an expanding B section 114, which distinguishes this embodiment from the first embodiment.

Figure 39:
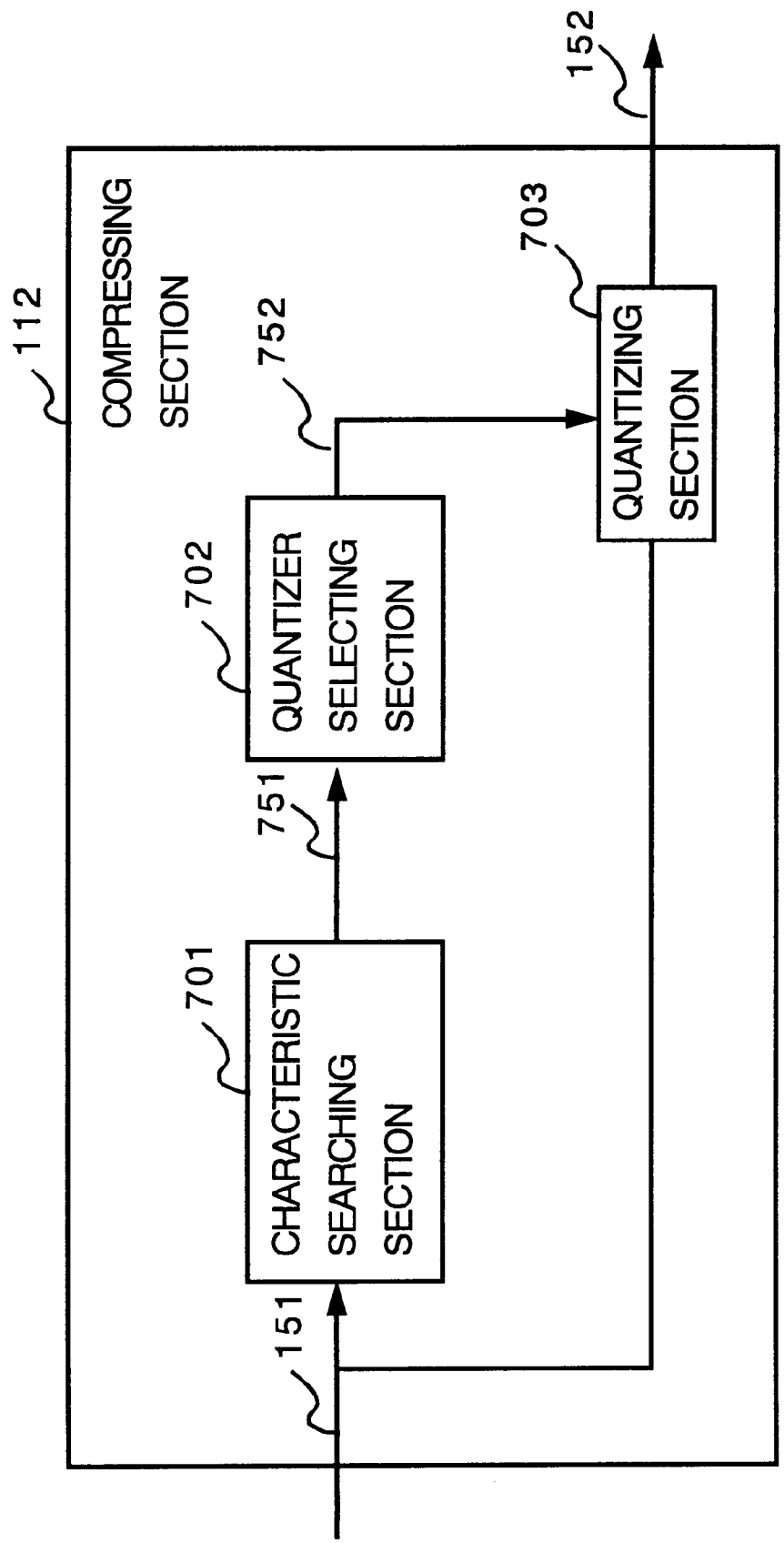
FIG. 39 shows a block diagram of the compressing section of FIG. 38 in detail.

FIG. 39 shows a block diagram of the compressing section 112 in detail.

A quantizing section 703 includes a plurality of quantizers, each being assigned a different quantization characteristic. A characteristic searching section 701 receives the decoded data 151 and searches the maximum and minimum values of difference between adjacent two pixels in a block of M×N pixels of the decoded data as a given characteristic of the decoded data. Upon reception of a characteristic signal 751 for indicating the given characteristic of the maximum and minimum values outputted from the characteristic searching section 701, a quantizer selecting section 702 selects a quantizer optimal to the given characteristic of the decoded data from among the quantizers in the quantizing section 703 and outputs a select signal 752.

Figure 40:
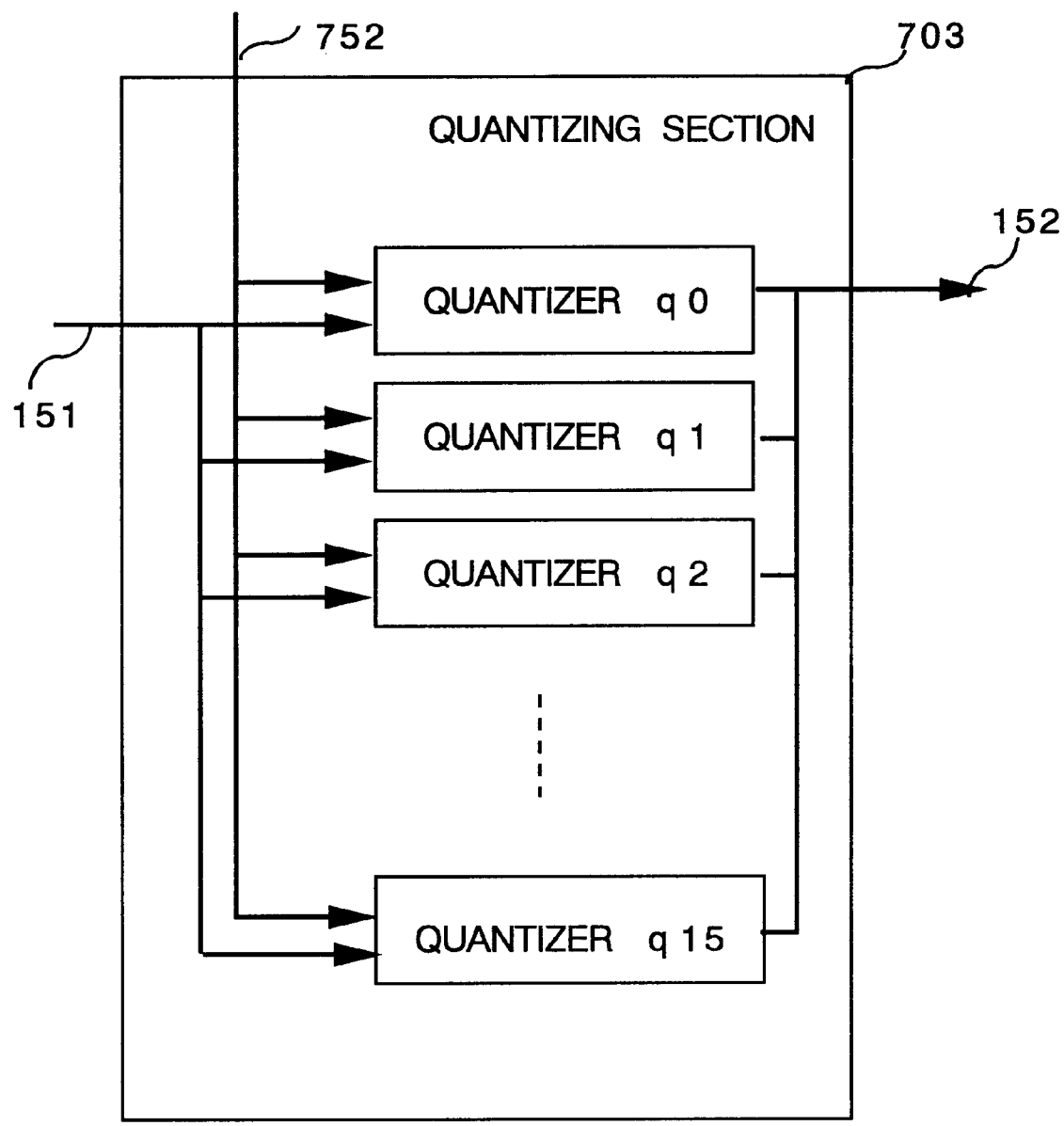
FIG. 40 shows a block diagram of the quantizing section of FIG. 39 in detail.

FIG. 40 shows a block diagram of the quantizing section 703 in detail.

The quantizing section 703 includes 16 quantizers q0 through q15. The respective quantizers are assigned a unique data range of quantization as shown in a chart of FIG. 41. For example, the quantizer q2 is assigned a data range of values 0 and 255 for quantization. A range data of values −255 and +255 is assigned to the quantizer q15 for quantization.

Figure 42:
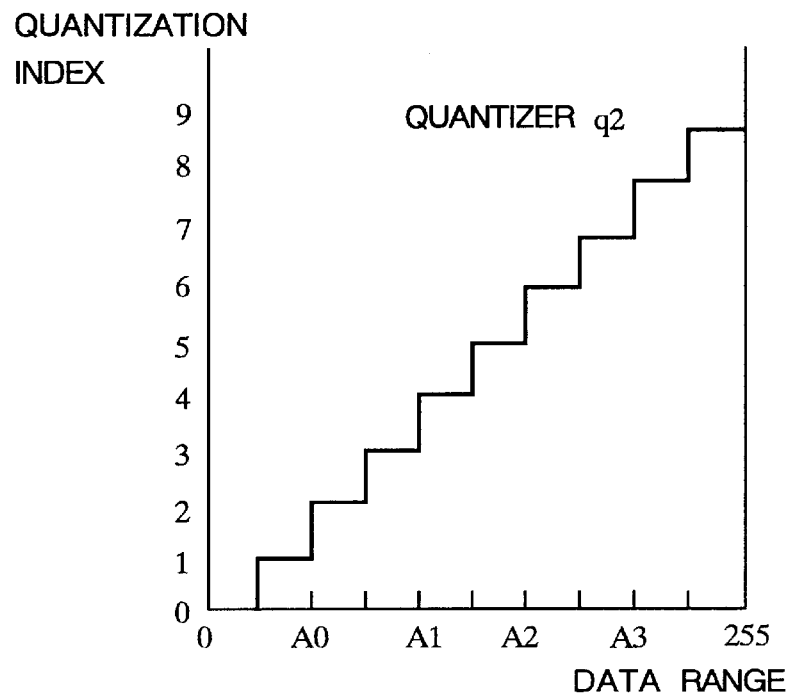
FIG. 42 shows a chart illustrating the quantization characteristic of a quantizer q2 according to the present invention.

FIG. 42 shows a chart illustrating the quantization characteristic of the quantizer q2.

The quantizer q2 quantizes data in a range of values 0 and 255 into ten steps 0 through 9.

Figure 43:
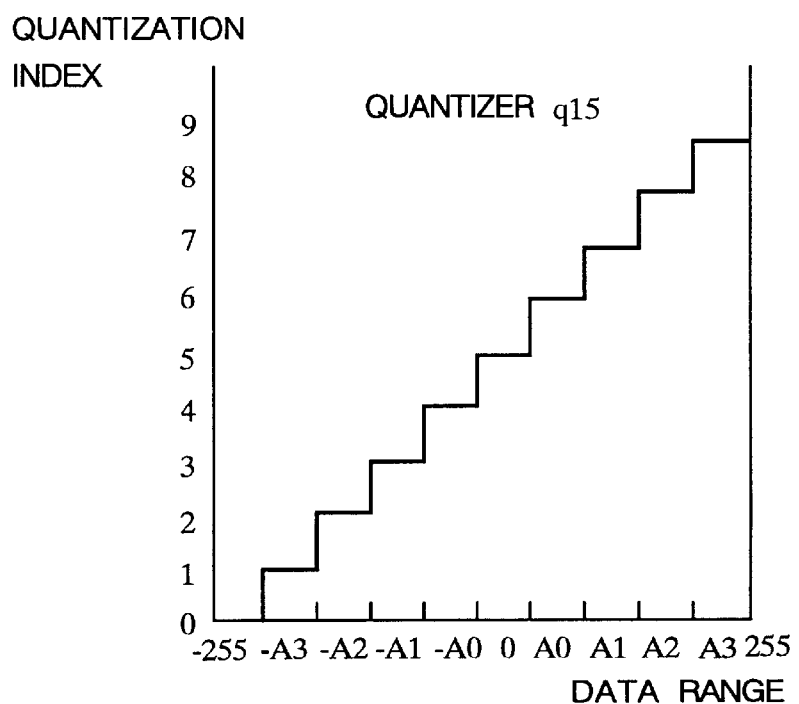
FIG. 43 shows a chart illustrating the quantization characteristic of a quantizer q15 of the present invention.

FIG. 43 shows a chart of the quantization characteristic of the quantizer q15.

The quantizer q15 has its own data range of values −255 and +255 for quantization into ten steps 0 through 9.

As a comparison of the charts of FIGS. 42 and 43 clearly shows, the quantizer q2 is twice as high in performance of quantization as that of the quantizer q15.

Figure 41:
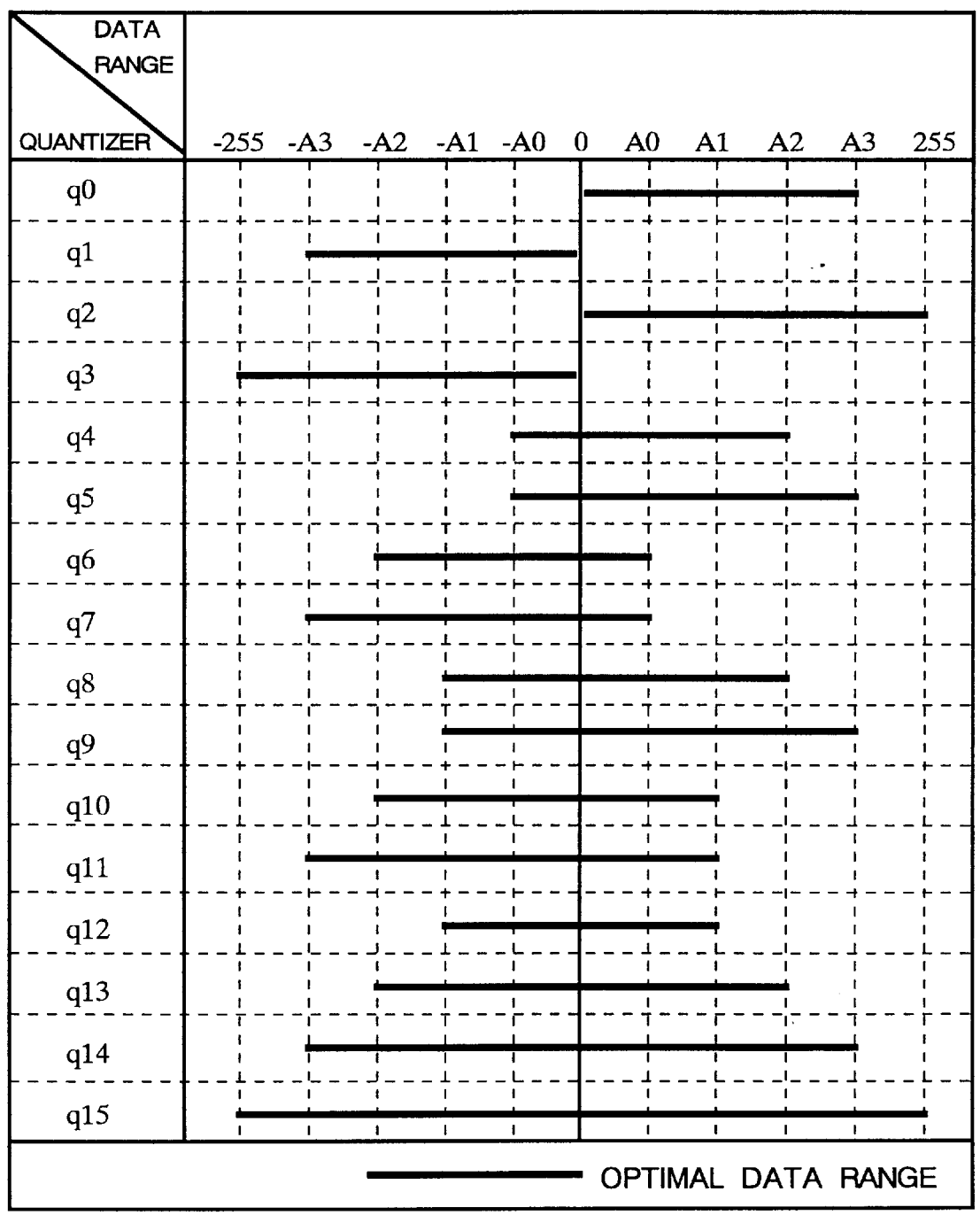
FIG. 41 shows a chart illustrating the quantization characteristics of the quantizer shown in FIG. 39.

Thus, the respective quantizers q0 through q15 of FIG. 40 are assigned a predetermined unique quantization characteristic as shown in FIG. 41. When the compressing section 112 compresses a block of M×N pixels (8×8 pixels for example) of the decoded data 151, the compressing section 112 selects a quantizer from among the plurality of quantizers in the quantizing section 703.

Figure 44:
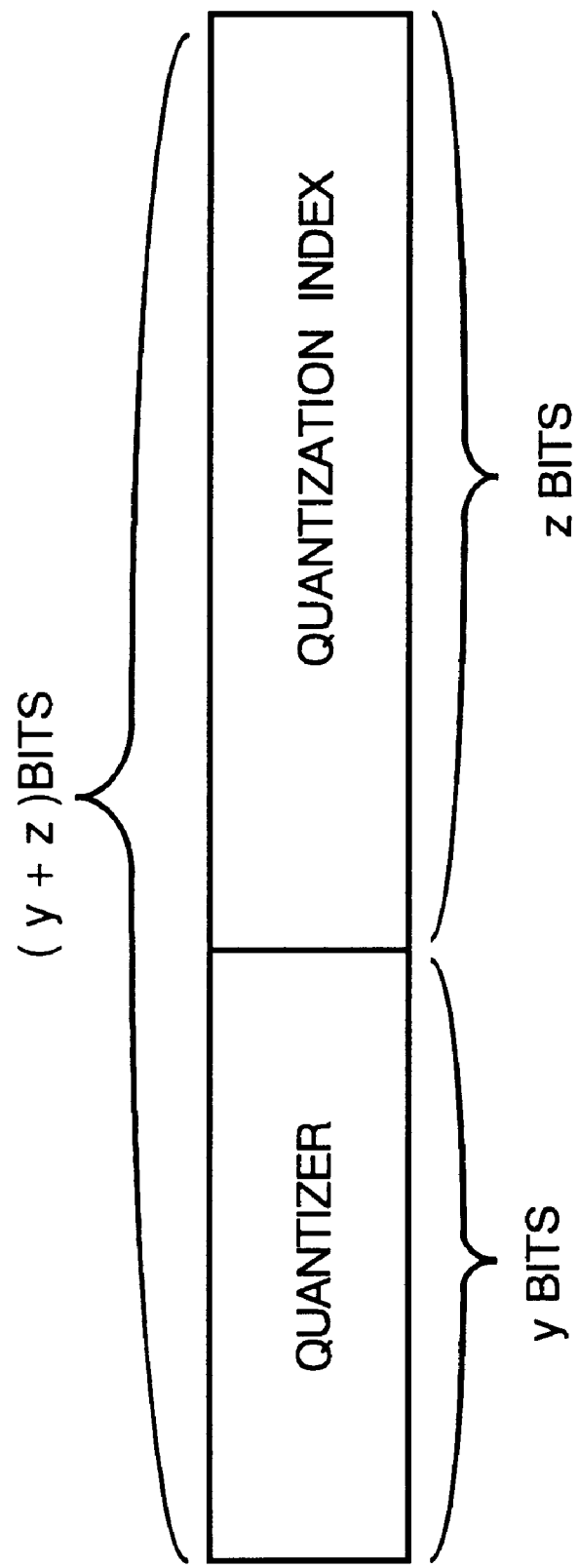
FIG. 44 shows a per-pixel information of compressed data of the present invention.

FIG. 44 shows a compressed data format of the compressed data 152 outputted from the quantizing section 703.

The compressed data format of FIG. 44 shows compressed data per pixel of the compressed data. The compressed data format of FIG. 44 is used commonly to all of the 16 quantizers. The data format indicates a quantizer for an exclusive quantization among the plurality of quantizers in the quantizing section 703 with y bits. Four bits are enough for y bits for distinguishing each one of the 16 quantizers of this embodiment. The data format has a quantization index with z bits for indicating a quantized result per pixel. With ten steps of quantization of FIGS. 42 and 43, four bits are enough for z bits. Thus, a set of y bits for indicating a quantizer and z bits for indicating a quantization index is outputted as per-pixel information of compressed data.

The selection of the exclusive quantizer is made through the following method.

Figure 45:
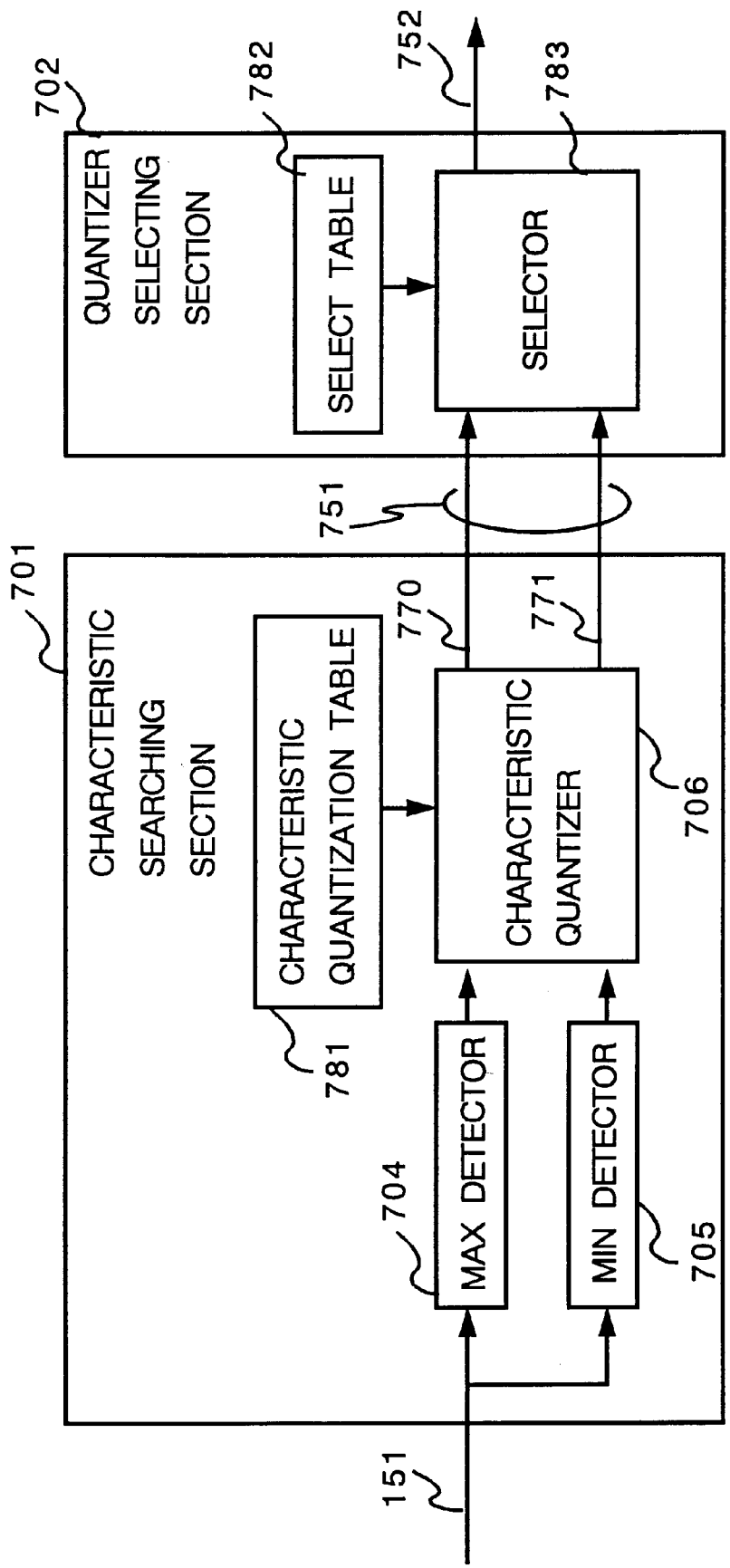
FIG. 45 shows block diagrams of the characteristic searching section and the quantizer selecting section of FIG. 39 in detail.

FIG. 45 shows a block diagram of the characteristic searching section 701 and the quantizer selecting section 702 in detail.

A maximum value detector 704 receives M×N pixels of the decoded data 151 and detects a maximum value of difference between adjacent two pixels. A minimum value detector 705 receives M×N pixels of the decoded data 151 and detects a minimum value of difference between adjacent two pixels. A characteristic quantizer 706 receives the maximum value detected in the maximum value detector 704 and the minimum value detected in the minimum value detector 705, quantizes the maximum and minimum values, respectively, with reference to a characteristic quantization table 781.

FIG. 46 shows a characteristic quantization table 781.

The table of FIG. 46 is provided for decoded data in a data range of values −255 and +255 (with nine bits) to be quantized into ten steps of quantization. When $A2 \leq n < A3$ and $(-A2) \leq m < (-A1)$, with n designated as a maximum value outputted from the maximum value detector 704 and m designated as a minimum value outputted from the minimum value detector 705, AD8 is assigned as a representing maximum value of quantization and S8 is assigned as a maximum quantized value 770. Similarly, AD2 is assigned as a representing minimum value of quantization and S2 is assigned as a minimum quantized value 771.

Thus, the characteristic quantizer 706 quantizes the maximum and minimum values n and m with reference to the characteristic quantization table 781, and outputs the quantized maximum and minimum values 770 and 771 as characteristic signals 751, respectively.

In the quantizer selecting section 702, the selector 783 inputs the characteristic signals 751 and selects an optimal quantizer with reference to a select table 782.

FIG. 47 shows an example of the select table 782.

The select table 782 of FIG. 47 is arranged based upon the characteristics of the respective quantizers of FIG. 41. With S8 of the quantized maximum value 770 and S2 of the quantized minimum value 771, for example, the quantizer q14 is selected according to the table of FIG. 47. With the quantizer q14, a data range for quantization extends from values −A3 to A3 according to FIG. 41. With S9 of the quantized maximum value 770 and S5 of the quantized minimum value 771, the quantizer q2 is selected. The select table 782 indicates a quantizer, which gives an optimal quantization to data identified by the maximum and minimum values of 770 and 771, among the 16 quantizers, each of which having a unique quantization characteristic. The selector 783 outputs a select signal 752 for specifying a quantizer to be selected. The select signal 752, as shown in FIG. 40, is inputted to the quantizing section 703, where a selected quantizer by the select signal is exclusively activated. Non-selected quantizers do not operate. The quantizing section 703, in this manner, inputs the decoded data 151 and outputs the compressed data 152.

Figure 48:
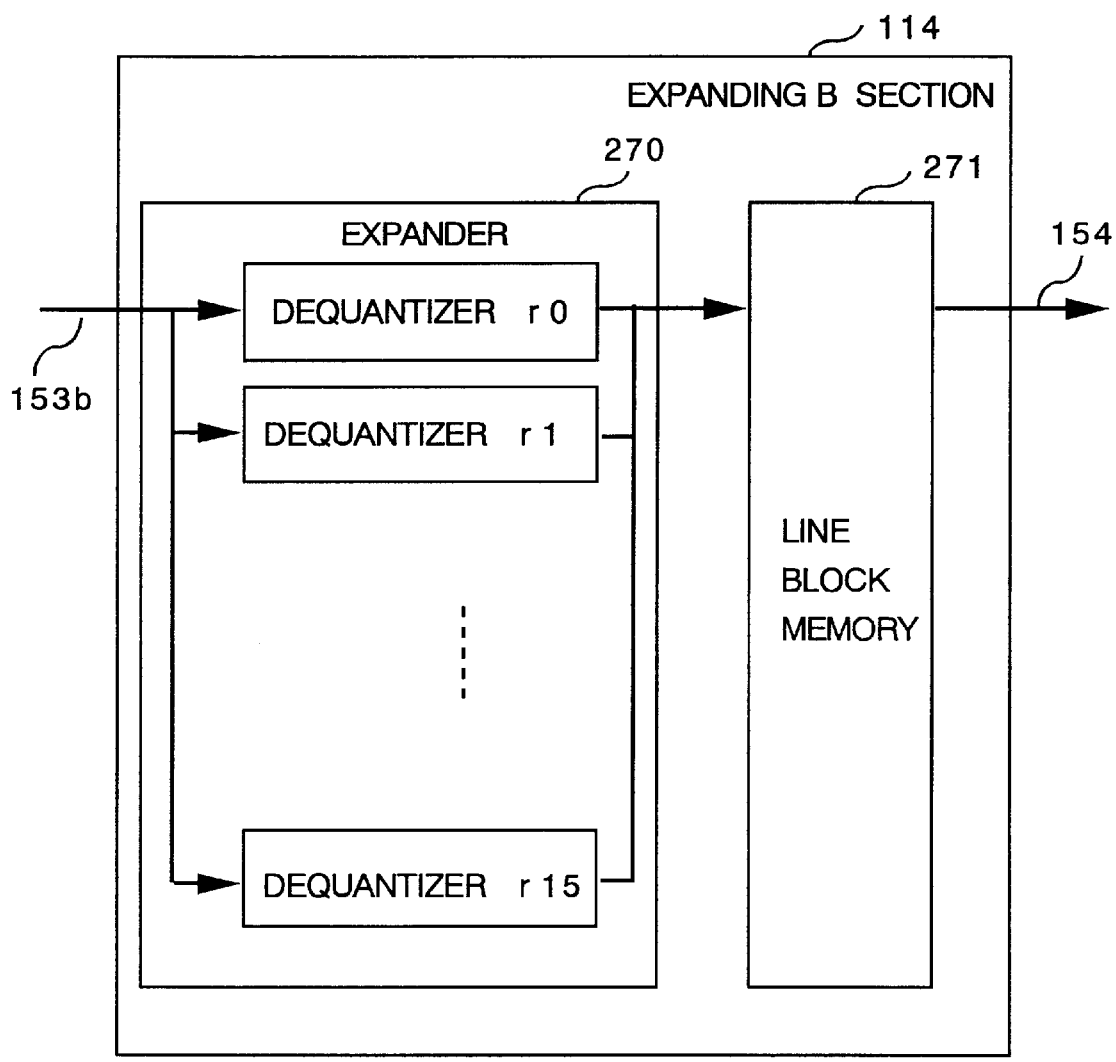
FIG. 48 shows a block diagram of the expanding B section of FIG. 38 in detail.

FIG. 48 shows a block diagram of the expanding B section 114 in detail.

The expanding B section 114 includes an expander 270 and a line block memory 271. The expander 270 is provided with dequantizers r0 through r15. The dequantizers r0 through r15 correspond to the quantizers q0 through q15. In other words, the dequantizers r0 through r15 perform dequantization, respectively, in a data range corresponding to that of the respective quantizers shown in FIG. 41. For example with the dequantizer r0, corresponding to the quantizer q0, receives the compressed data 153b, dequantizes the compressed data, and outputs decoded data in a range of values 0 and A3. Specifically, the expander 270, upon reception of the compressed data of FIG. 44, activates a dequantizer corresponding to a quantizer specified by y bits and dequantizes the compressed data represented by the quantization index specified by z bits. Other dequantizers than the dequantizer corresponding to the quantizer specified by y bits do not operate. After being expanded in the expander 270, decoded data are inputted to the line block memory 271. The following course of operations of digital image decoding equals to that described in the first embodiment, and therefore will not be reiterated here. The expanding A section 113 (not shown with a detailed figure) is provided with the same type of expander as that of the expander 270 of FIG. 48. In the expander, one of a plurality of dequantizers decodes the compressed data.

As discussed above, image data are compressed to be stored in a frame memory, which allows the predictive/display frame memory 103 to become smaller in storage capacity than the original amount of image data to be stored.

The characteristic of data is calculated on a compressing unit basis and quantization is given to the data by a quantizer optimal to the characteristic. This achieves optimal compression of data to be written into the predictive/display frame memory 103. This allows the predictive/display frame memory 103 to reduce its storage capacity much smaller than the original amount of image data. Further, this effects reduction of compression-related deterioration of image to a minimum.

In addition to the reduction of storage capacity, reducing the size of the predictive/display frame memory 103 may bring about reduction of address space and data bit width for reading/writing from/to the memory. Above all, this contributes greatly to reducing the size of the digital image decoding apparatus and also to lowering cost of manufacturing.

Embodiment 5.

Figure 49:
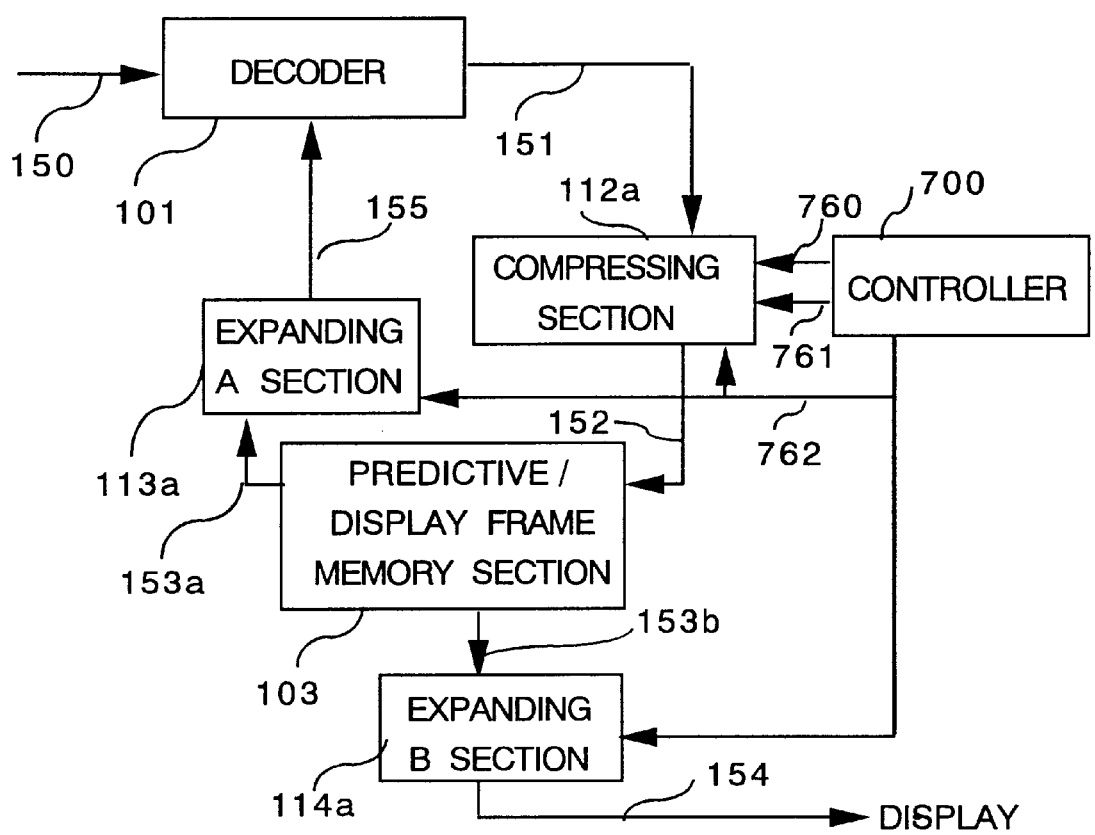
FIG. 49 shows a block diagram of a digital image decoding apparatus according to a fifth embodiment of the present invention.

FIG. 49 shows a block diagram of a digital image decoding apparatus according to a fifth embodiment of the present invention.

The digital image decoding apparatus of FIG. 49 includes a controller 700, which distinguishes this embodiment from the digital image decoding apparatus of FIG. 38. The controller 700 controls the quantization characteristic of a compressing section 112a. The controller 700 controls the dequantization characteristics of expanding A and B sections 113a and 114a.

Figure 50:
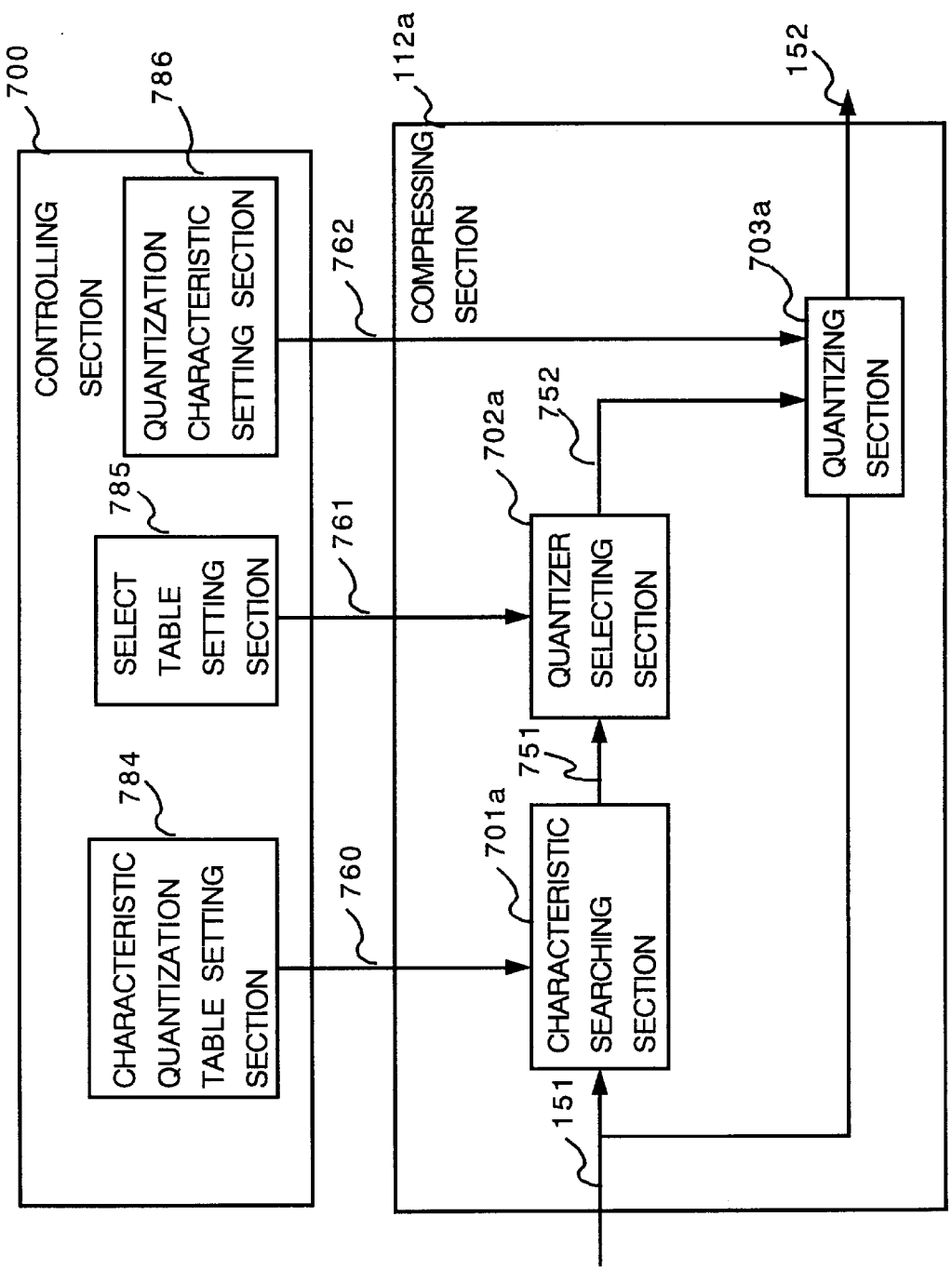
FIG. 50 shows block diagrams of a controlling section and a compression section of FIG. 49 in detail.

FIG. 50 shows block diagrams of the controlling section 700 and the compressing section 112a in detail.

Figure 51:
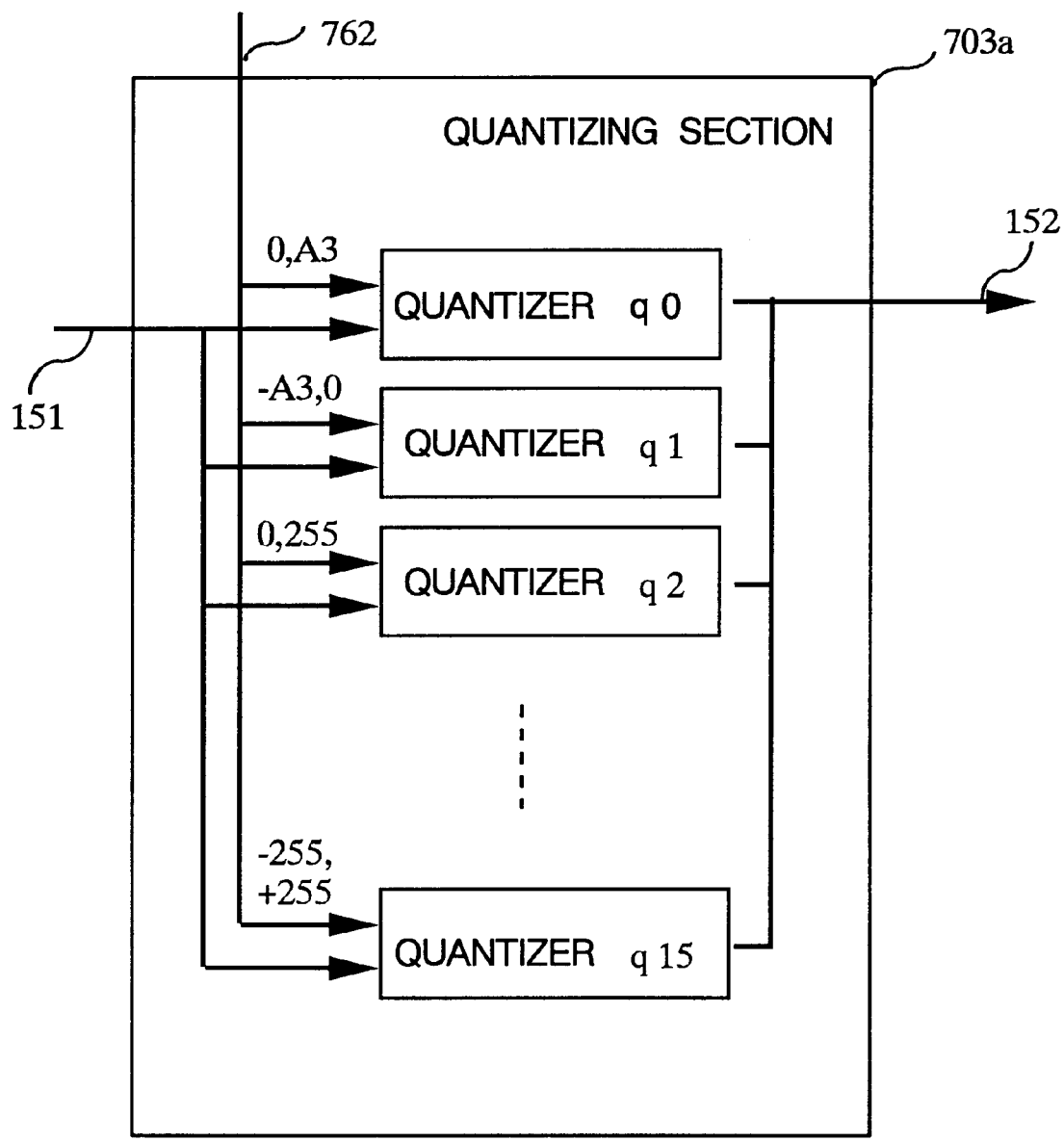
FIG. 51 shows a block diagram of a quantizing section of FIG. 50 in detail.

FIG. 51 shows a block diagram of a quantizing section 703a in detail.

Figure 52:
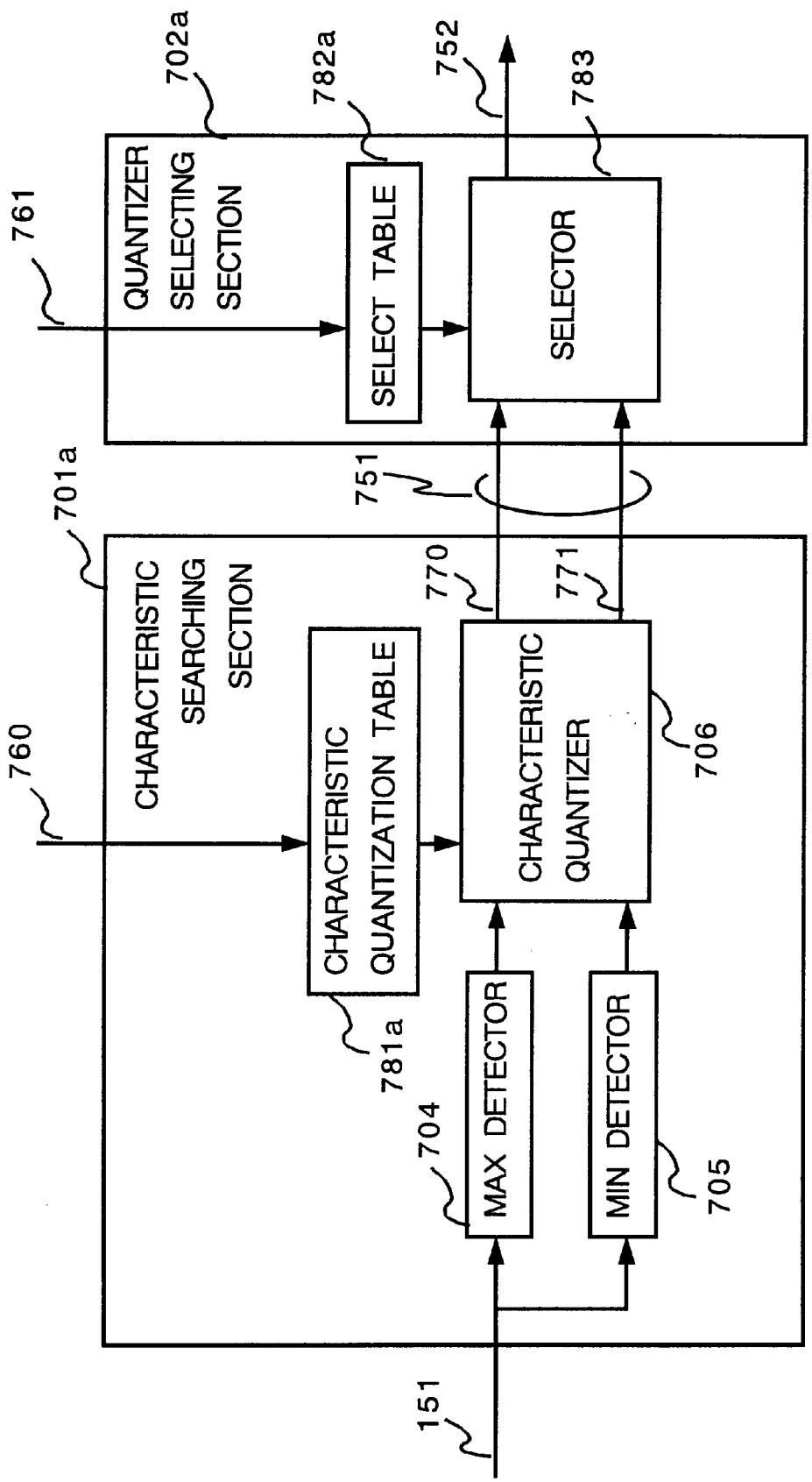
FIG. 52 shows block diagrams of a characteristic searching section and a quantizer selecting section of FIG. 50 in detail.

FIG. 52 shows a block diagram of a characteristic searching section 701a and a qjuantizer selector 702a in detail.

Referring to FIG. 50, the controlling section 700 includes a characteristic quantization table setting section 784, a select table setting section 785, and a quantization characteristic setting section 786. The characteristic quantization table setting section 784 sets up a characteristic quantization table 781a in the characteristic searching section 701a via a control line 760 as shown in FIG. 52. The select table setting section 785 sets up a select table 782a in the quantizer selector 702a via a control line 761. The quantization characteristic setting section 786 sets up a data range of quantization in the respective quantizers of the quantizing section 703a via a control line 762. The quantizers q0 through q15 are capable of modifying their quantization characteristics based upon a designated data range via the control line 762. Referring to FIG. 51, the quantization characteristic setting section 786 assigns the quantizer q0, for example, a data range of values 0 and A3 for quantization via the control line 762. With the quantizer q1, a data range of values −A3 and 0 is assigned for quantization.

Figure 53:
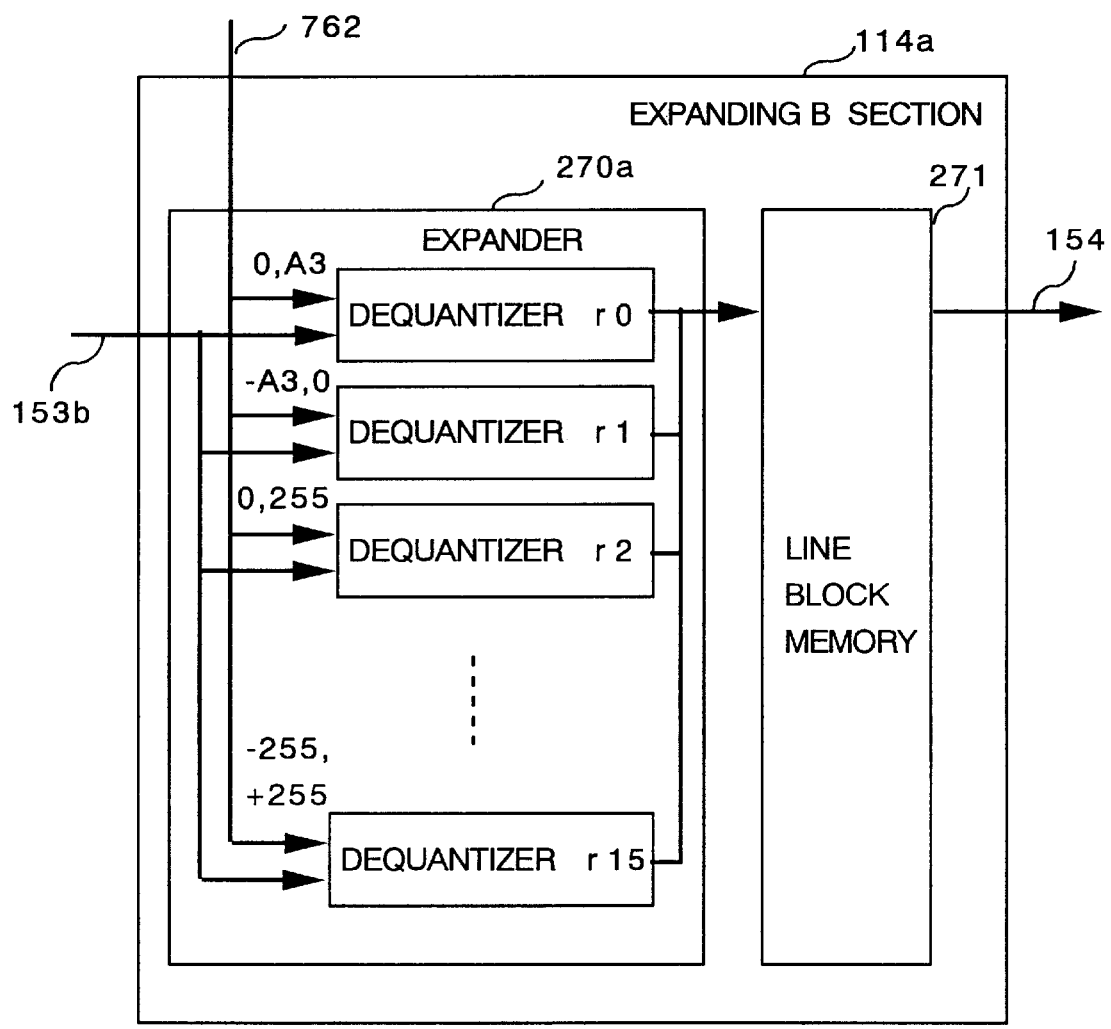
FIG. 53 shows a block diagram of the expanding B section of FIG. 49 in detail.
Figure 54:
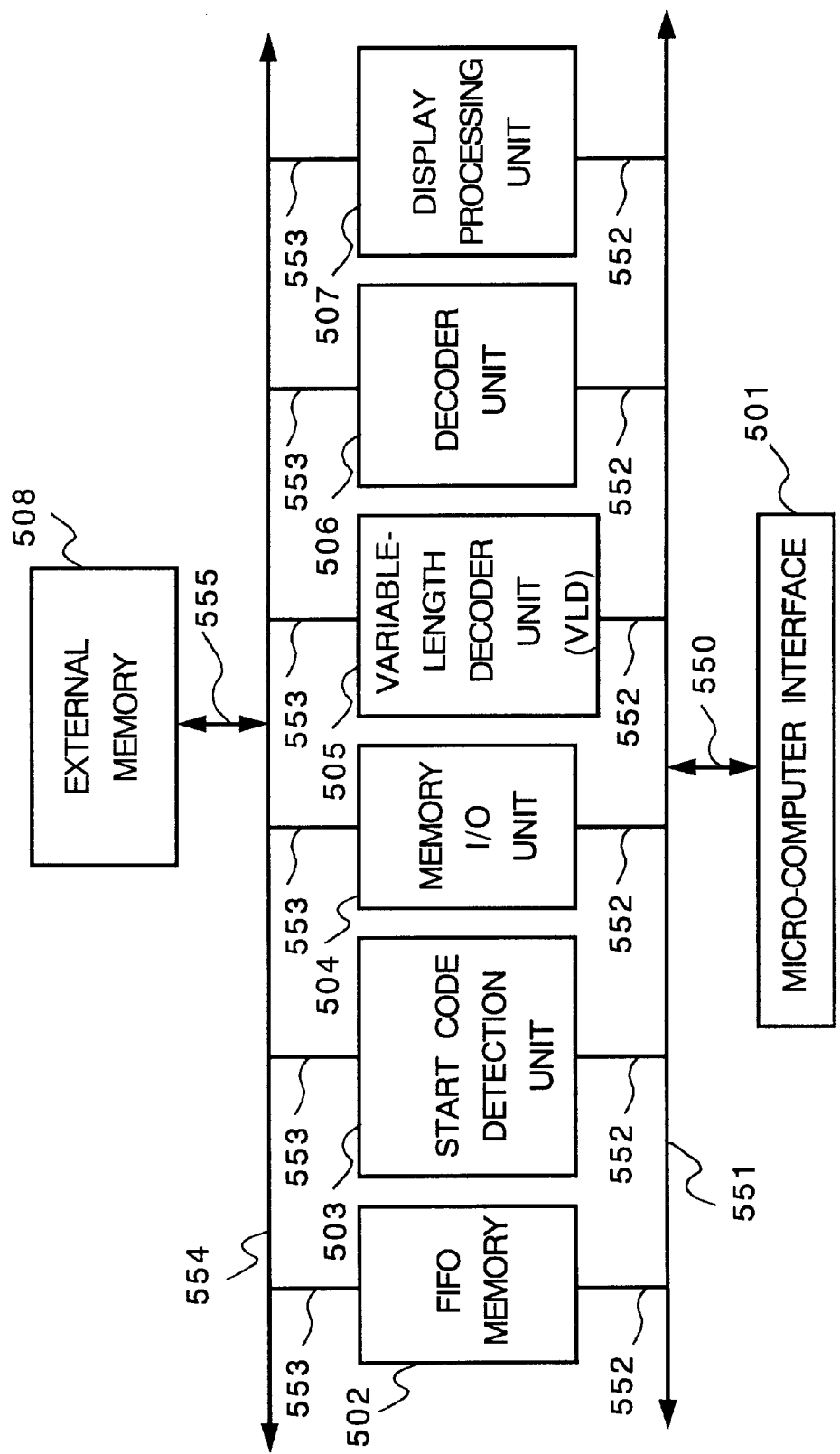
FIG. 54 is a block diagram of a digital image decoding apparatus constructed in accordance with the prior art.
Figure 55:
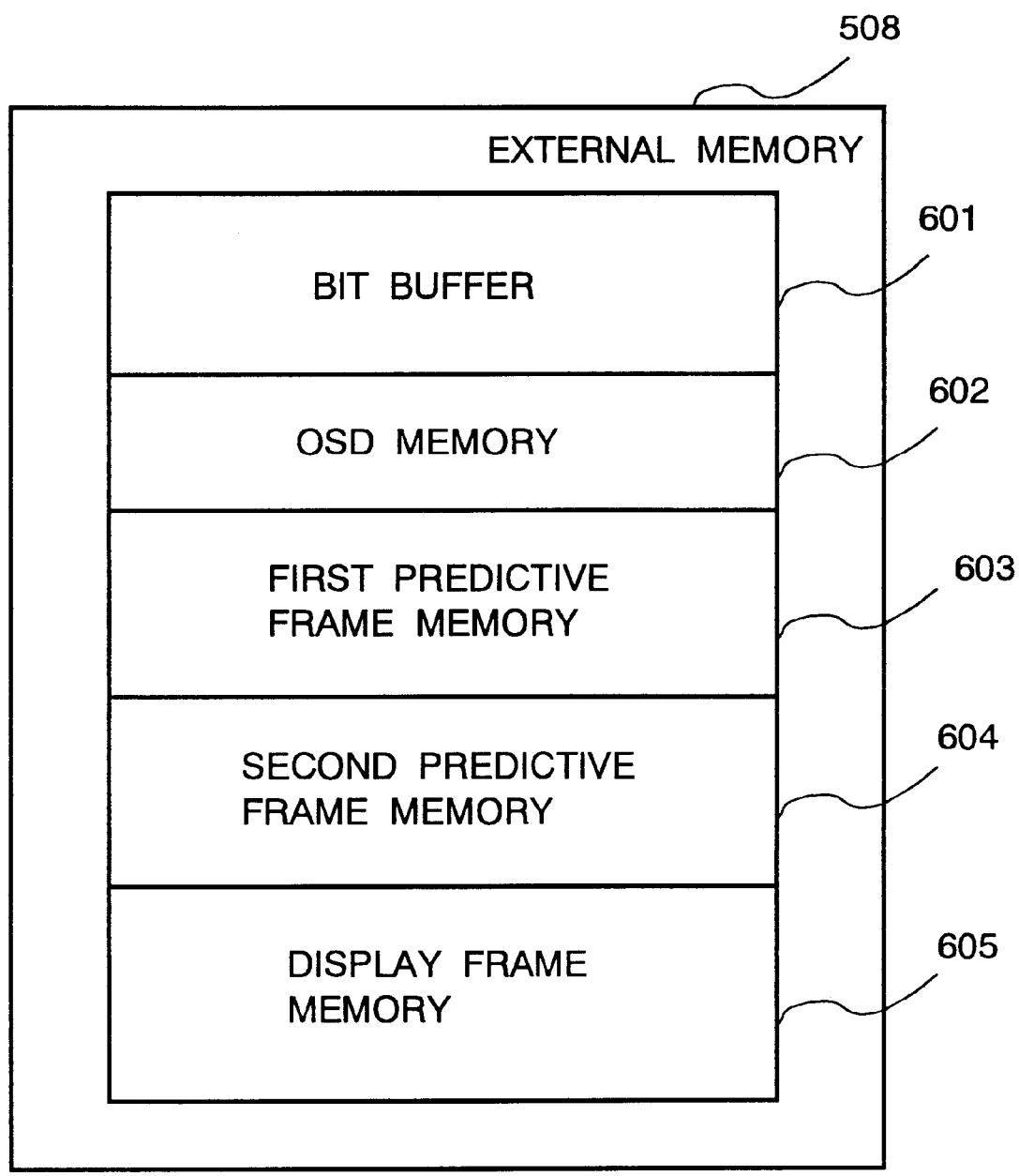
FIG. 55 is a bit map of the prior art frame memory.

FIG. 53 shows a block diagram of the expanding B section 114a in detail.

An expander 270a of the expanding B section 114a is provided with a plurality of dequantizers. The dequantizers inputs a data range for dequantization, respectively, via the control line 762 in the same manner as that stated with reference to FIG. 51. In this manner, the dequantizers are provided correspondingly to the quantizers.

With further reference to the fourth and fifth embodiments of the present invention, the digital image decoding apparatus may be based upon 1D- or 2D-DPCM compression method.

With further reference to the second and third embodiments of the present invention, the digital image decoding apparatus may be based upon 2D-DPCM compression method or other methods of compression instead of 1D-DPCM compression method.

With further reference to the first through fourth embodiments of the present invention, the encoded data may not necessarily be encoded through the inter-frame coding method, but through a method of intra-frame coding for achieving as high performance as ever for reducing the size of a frame memory and reduction of compression-related deterioration of image to a minimum.

Having thus described several particular embodiments of the invention, various alternatives, alterations, modifications, and improvements will readily occur to those skilled in the art. Such alternatives, alterations, modifications, arid improvements are intended to be part of the present invention, and therefore fall within the spirit and scope of the invention. Accordingly, the foregoing description is by way of example only, and is not intended to be limiting. The invention is limited only as defined in the following claims and the equivalents thereto.

What is claimed is:

1. A digital image decoding apparatus for decoding encoded data of an image with a given size, said digital image decoding apparatus comprising:

a frame memory having a capacity for storing data on a frame basis;

a decoding section for inputting the encoded data which is encoded in accordance with an inter/intra-frame coding in a digital image coding apparatus and decoding the encoded data in accordance with an inter/intra-frame decoding on the frame basis and outputting decoded data;

a compressing section, locating between the frame memory and the decoding section, for inputting the decoded data outputted from the decoding section, compressing the decoded data in accordance with a non-inter/intra-frame coding and outputting compressed data to the frame memory so as to store the compressed data to the frame memory; and an expanding section, locating between the frame memory and the decoding section, for reading out and expanding the compressed data stored in the frame memory and in accordance with a non-inter/intra-frame decoding and outputting expanded data to the decoding section, wherein said frame memory includes a predictive frame memory for storing the encoded data of a predictive frame to be used for predictive decoding the encoded data in said decoding section, and a display frame memory for storing the encoded data of a display frame to be used for display;

wherein said compressing section compresses the decoded data of the predictive frame to be stored in said predictive frame memory as compressed predictive data, and the decoded data of the display frame to be stored in said display frame memory as compressed display data; and wherein said expanding section includes a predictive data expanding section for expanding the compressed data of the predictive frame stored in said predictive frame memory and outputting expanded predictive data, and a display data expanding section for expanding the compressed data of the display frame stored in said display frame memory and outputting the expanded display data for display.

2. A digital image decoding apparatus for decoding encoded data of an image with a given size, said digital image decoding apparatus comprising:

a frame memory having a capacity for storing data on a frame basis;

a decoding section for inputting the encoded data which is encoded in accordance with an inter/intra-frame coding in a digital image coding apparatus and decoding the encoded data in accordance with an inter/intra-frame decoding on the frame basis and outputting decoded data;

a compressing section, locating between the frame memory and the decoding section, for inputting the decoded data outputted from the decoding section, compressing the decoded data in accordance with a non-inter/intra-frame coding and outputting compressed data to the frame memory so as to store the compressed data to the frame memory; and an expanding section, locating between the frame memory and the decoding section, for reading out and expanding the compressed data stored in the frame memory and in accordance with a non-inter/intra-frame decoding and outputting expanded data to the decoding section, wherein said decoding section decodes the encoded data sequentially on a block basis and outputs block-based decoded data; and wherein said compressing section compresses the block-based decoded data in a period shorter than a period for decoding the block-based encoded data in said decoding section.

3. A digital image decoding apparatus for decoding encoded data of an image with a given size, said digital image decoding apparatus comprising:

a frame memory having a capacity for storing data on a frame basis;

a decoding section for inputting the encoded data which is encoded in accordance with an inter/intra-frame coding in a digital image coding apparatus and decoding the encoded data in accordance with an inter/intra-frame decoding on the frame basis and outputting decoded data;

a compressing section, locating between the frame memory and the decoding section, for inputting the decoded data outputted from the decoding section, compressing the decoded data in accordance with a non-inter/intra-frame coding and outputting compressed data to the frame memory so as to store the compressed data to the frame memory;

an expanding section, locating between the frame memory and the decoding section, for reading out and expanding the compressed data stored in the frame memory and in accordance with a non-inter/intra-frame decoding and outputting expanded data to the decoding section, wherein said decoding section decodes the encoded data including profile information of a coding method for the encoded data; and a profile judging section for receiving the encoded data and judging the profile of the coding method;

wherein said compressing section, including a plurality of modes of compression, receives the profile information and selects one of the plurality of modes optimal to the coding method.

4. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

wherein said decoding section decodes the encoded data on a block basis and outputs a block of M pixels×N pixels×r bits of the decoded data;

wherein said compressing section compresses the block-based decoded data to the block-based compressed data through a conversion method, which calculates a coefficient of image quality of the block-based decoded data, and allocates a longer bit-length to the block-based decoded data for a coefficient highly influential on image quality, and a shorter bit-length to the decoded data for a less influential coefficient; and wherein said compressing section converts the block-based decoded data into a fixed bit-length of the block-based compressed data.

5. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

wherein said frame memory includes a predictive frame memory for storing the encoded data of a predictive frame to be used for predictive decoding the encoded data in said decoding section, and a display frame memory for storing the encoded data of a display frame to be used for display;

wherein said compressing section compresses the decoded data of the predictive frame to be stored in said predictive frame memory as compressed predictive data, and the decoded data of the display frame to be stored in said display frame memory as compressed display data;

wherein said expanding section includes, a predictive data expanding section for expanding the compressed data of the predictive frame stored in said predictive frame memory and outputting expanded predictive data, and a display data expanding section for expanding the compressed data of the display frame stored in said display frame memory and outputting the expanded display data for display;

wherein said compressing section compresses the frame-based decoded predictive data on a block basis and outputs the compressed data on the block basis;

wherein said predictive data expanding section reads out a block of the compressed predictive data on the block basis including at least a part of a block data of K pixels×L lines required by said decoding section, the required block data being a part of a predictive frame stored in said predictive frame memory, expands the read out block of the block-based compressed predictive data, and outputs the block-based expanded predictive data of the read out block including the required block data of K pixels×L lines to said decoding section;

wherein said predictive data expanding section includes a block memory for storing the block-based expanded predictive data of the read out block from said predictive frame memory, and wherein said block memory is updated on a block basis each time block data required by said decoding section is renewed.

6. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

wherein said frame memory includes a predictive frame memory for storing the encoded data of a predictive frame to be used for predictive decoding the encoded data in said decoding section, and a display frame memory for storing the encoded data of a display frame to be used for display;

wherein said compressing section compresses the decoded data of the predictive frame to be stored in said predictive frame memory as compressed predictive data, and the decoded data of the display frame to be stored in said display frame memory as compressed display data;

wherein said expanding section includes, a predictive data expanding section for expanding the compressed data of the predictive frame stored in said predictive frame memory and outputting expanded predictive data, and a display data expanding section for expanding the compressed data of the display frame stored in said display frame memory and outputting the expanded display data for display;

wherein said compressing section compresses the frame-based decoded display data on a block basis and outputs the compressed display data on the block basis;

wherein said display data expanding section reads out the compressed display data stored in said display frame memory on the block basis, expands the read out block-based compressed display data, and outputs the block-based expanded display data sequentially in a horizontal scanning direction;

wherein said display data expanding section includes, a block memory for storing the read out block of the block-based expanded display data sequentially with a width and direction in accordance with the horizontal scanning direction; and wherein said display data expanding section outputs the block-based expanded display data read out from said display memory in response to an image display scan line.

7. A digital image decoding apparatus for decoding encoded data of an image with a given size, said digital image decoding apparatus comprising:

a frame memory having a capacity for storing data on a frame basis;

a decoding section for inputting the encoded data which is encoded in accordance with an inter/intra-frame coding in a digital image coding apparatus and decoding the encoded data in accordance with an inter/intra-frame decoding on the frame basis and outputting decoded data;

a compressing section, locating between the frame memory and the decoding section, for inputting the decoded data outputted from the decoding section, compressing the decoded data in accordance with a non-inter/intra-frame coding and outputting compressed data to the frame memory so as to store the compressed data to the frame memory;

an expanding section, locating between the frame memory and the decoding section, for reading out and expanding the compressed data stored in the frame memory and in accordance with a non-inter/intra-frame decoding and outputting expanded data to the decoding section, wherein said compressing section includes a plurality of quantizers, each of which has a table for a unique quantization and outputs a unique quantized result of the decoded data, an optimal table selector for comparing the unique quantized results for selecting a table optimal to the decoded data from among the plurality of tables, and a selector for selecting an output from one of the plurality of quantizers having the optimal table selected by said optimal table selector.

8. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

a compression rate judging section for receiving image size information for indicating the given size of the image and judging a rate of compression for the compressed data to be stored in said frame memory based upon the given size of the image and a capacity of said frame memory;

wherein said compressing section compresses the decoded data based upon the rate of compression and outputs the compressed data to said frame memory; and wherein said expanding section reads out the compressed data from said frame memory and expands the compressed data based upon the rate of compression.

9. The digital image decoding apparatus of claim 8, wherein the encoded data includes image size information; and wherein said compression rate judging section receives the encoded data and extracts the image size information from the encoded data.

10. The digital image decoding apparatus of claim 8, wherein said compressing section is provided with a plurality of modes of compression; and wherein said compressing section selects one mode from among the plurality of modes, the selected mode producing an amount of compressed data less than the capacity of said frame memory.

11. The digital image decoding apparatus of claim 10, wherein said compressing section compresses the decoded data on a block basis of M pixels×N pixels×r bits through a quantization based upon a One Detention Differential Pulse Code Modulation (1D-DPCM) method;

wherein said compressing section quantizes a heading pixel of a given L number of pixels (L≦M) with a quantum of t bits (t≦r), and a difference between adjacent two pixels of remaining pixels of the given L pixels with a quantum of p bits (p≦r); and wherein said compressing section modifies at least one of values of L, p, and t adaptively for providing a plurality of the modes of compression.

12. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

wherein said decoding section decodes the encoded data including profile information of a coding method for the encoded data;

said digital image decoding apparatus further comprising: a profile judging section for receiving the encoded data and judging the profile of the coding method; and wherein said compressing section, including a plurality of modes of compression, receives the profile information and selects one of the plurality of modes optimal to the coding method;

wherein said profile judging section judges the coding method at least one of a bidirectional prediction inter-frame coding method for predicting a frame based upon past and future frames and of a forward prediction inter-frame coding method based upon a past frame; and wherein said compressing section compresses the decoded data including bidirectional prediction inter-frame encoding method and does not compress the decoded data including the forward prediction inter-frame encoding method.

13. A digital image decoding apparatus for decoding encoded data of an image with a given size, said digital image decoding apparatus comprising:

a frame memory having a capacity for storing data on a frame basis;

a decoding section for inputting the encoded data which is encoded in accordance with an inter/intra-frame coding in a digital image coding apparatus and decoding the encoded data in accordance with an inter/intra-frame decoding on the frame basis and outputting decoded data;

a compressing section, locating between the frame memory and the decoding section, for inputting the decoded data outputted from the decoding section, compressing the decoded data in accordance with a non-inter/intra-frame coding and outputting compressed data to the frame memory so as to store the compressed data to the frame memory;

an expanding section, locating between the frame memory and the decoding section, for reading out and expanding the compressed data stored in the frame memory and in accordance with a non-inter/intra-frame decoding and outputting expanded data to the decoding section, wherein said compressing section includes a quantizing section for quantizing the decoded data on a block basis of M×N pixels to output the block-based compressed data; and wherein said expanding section includes an expander for dequantizing the block-based compressed data and outputting the expanded data on the block basis of M×N pixels.

14. A digital image decoding apparatus for decoding encoded data of an image with a given size, said digital image decoding apparatus comprising:

a frame memory having a capacity for storing the encoded data on a frame basis;

a decoding section for decoding the encoded data on the frame basis and outputting decoded data;

a compressing section for compressing the decoded data and outputting compressed data; and an expanding section for reading out and expanding the compressed data stored in the frame memory and outputting expanded data;

wherein said compressing section includes a quantizing section for quantizing the decoded data on a block basis of M×N pixels to output the block-based compressed data;

wherein said expanding section includes an expander for dequantizing the block-based compressed data and outputting the expanded data on the block basis of M×N pixels;

wherein said quantizing section includes a plurality of quantizers, each of which has a unique characteristic of quantization, wherein said compressing section includes, a characteristic searching section for searching a characteristic of the block-based decoded data of M×N pixels, and a quantizer selector for selecting one of the plurality of quantizers in said quantizing section based upon the characteristic searched by said characteristic searching section, and activating a selected quantizer exclusively for quantizing the block-based decoded data of M×N pixels, wherein said quantizer selector includes, a maximum value detector for receiving the block-based decoded data of M×N pixels, and calculating a maximum value of a difference between adjacent pixels and outputting a maximum value as a first characteristic, a minimum value detector for receiving the block-based decoded data of M×N pixels, and calculating a minimum value of the difference between adjacent pixels and outputting a minimum value as a second characteristic, a characteristic quantization table for quantizing the first characteristic of the maximum value and the second characteristic of the minimum value, respectively, a characteristic quantizer for receiving and quantizing the maximum and minimum values with reference to the characteristic quantization table, and outputting maximum and minimum quantized values, respectively, a select table for selecting one of the plurality of quantizers in said quantizing section based upon the maximum and minimum quantized values, and a selector for selecting one of the plurality of quantizers optimal to the decoded data based upon said select table.

15. The digital image decoding apparatus of claim 14, wherein said expanding section includes a plurality of dequantizers, each of which has a unique characteristic of dequantization corresponding to a respective unique characteristic of quantization of said plurality of quantizers in said quantizing section.

16. The digital image decoding apparatus of claim 15, further comprising:

a controlling section for controlling the unique characteristics of quantization of the plurality of quantizers in said compressing section and the unique characteristics of dequantization of the plurality of dequantizers in said expanding section.

17. The digital image decoding apparatus of claim 16, wherein respective quantizers in the quantizing section modifies the characteristic of quantization adaptively;

wherein the respective dequantizers in said expanding section modify the characteristic of dequantization correspondingly to the modification of the characteristic of quantization;

wherein said controlling section includes, a quantization/dequantization characteristic setting section for setting the respective quantizers to modify the unique characteristic of quantization and setting the respective dequantizers to modify the unique characteristic of dequantization, a select table setting section for setting the quantizer selector to refer to the select table in accordance with the setting of the unique characteristics of quantization/dequantization, and a characteristic quantization table setting section for setting said characteristic quantizer to refer to the characteristic quantization table in accordance with the setting of the unique characteristics of quantization/dequantization.

18. A method for digital image decoding, the method comprising the steps of:

inputting encoded data through an inter-/intra-frame coding on a block basis of M×N pixels;

after the inputting step, decoding the encoded data through an inter/intra-frame decoding on a block basis of M×N pixels;

after the decoding step, compressing the block-based decoded data of M×N pixels through quantization, not through an inter/intra-frame coding, and outputting block-based compressed data;

after the compressing step, storing a predictive frame of the block-based compressed data on a frame basis in a predictive frame memory of a frame memory, the predictive frame being used to decode the encoded data through inter-/intra- frame coding;

after the compressing step, storing a display frame of the block-based compressed data in a display frame memory of the frame memory, the display frame being used to display an image;

after the predictive frame storing step, expanding the compressed predictive frame data read out from the predictive frame memory through a dequantization, not through an inter/intra-frame decoding, of the compressed predictive frame data, and supplying an expanded predictive frame data to said decoding step;

after the display frame storing step, expanding the compressed display data read out from the display frame memory, through a dequantization, not through an inter/intra-frame decoding, of the compressed display frame data, and outputting an expanded display frame data as image display data; and judging a rate of compression of the block-based decoded data based upon a size of image judged by the encoded data in connection with a storage capacity of the frame memory and providing said compressing step with the rate of compression as compression rate information.

19. The method of claim 18, further comprising the step of:

controlling a setting and modifying of a quantization characteristic for quantization in said compressing step and a setting and modifying of a dequantization characteristic for the dequantization in said expanding steps.

* * * * *